US007343027B2

(12) United States Patent
Kondo et al.

(10) Patent No.: US 7,343,027 B2
(45) Date of Patent: *Mar. 11, 2008

(54) IMAGE PROCESSING APPARATUS, IMAGE SIGNAL GENERATION METHOD, INFORMATION RECORDING MEDIUM, AND IMAGE PROCESSING PROGRAM

(75) Inventors: Tetsujiro Kondo, Tokyo (JP); Yuji Okumura, Kanagawa (JP); Tetsushi Kokubo, Chiba (JP); Daisuke Kikuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,907

(22) Filed: Oct. 23, 2006

(65) Prior Publication Data

US 2007/0154070 A1 Jul. 5, 2007

Related U.S. Application Data

(62) Division of application No. 10/203,707, filed as application No. PCT/JP01/11049 on Dec. 17, 2001, now Pat. No. 7,146,023.

(30) Foreign Application Priority Data

| Dec. 15, 2000 | (JP) | ............................ 2000-382369 |
| Aug. 6, 2001 | (JP) | ............................ 2001-238208 |

(51) Int. Cl.
*G06K 9/00* (2006.01)

(52) U.S. Cl. ............................ 382/107; 345/474; 396/153

(58) Field of Classification Search ................ 382/103, 382/107, 236; 345/31, 85, 474, 638, 652, 345/663, 668, 678; 396/153, 492

See application file for complete search history.

(56) References Cited

U.S. PATENT DOCUMENTS 6,057,847 A * 5/2000 Jenkins ........................ 345/422
6,078,701 A * 6/2000 Hsu et al. .................... 382/294

FOREIGN PATENT DOCUMENTS

| JP | 1-231474 | 9/1989 |
| JP | 11-168756 | 6/1999 |

OTHER PUBLICATIONS

J. M. Rehg, S. B. Kang, T. J. Cham: "Video Editing Using Figure Tracking and Image-Based Rendering" Cambridge Research Laboratory, Technical Report Series, [Online] Dec. 1999, pp. 1-20, XP002382981 Cambridge Retrieved from the Internet: URL:http://www.hpl.hp.com/techreports/Compaq-DEC/CRL-99-8.pdf> [retrieved on May 26, 2006].

(Continued)

*Primary Examiner*—Samir Ahmed
*Assistant Examiner*—Abolfazl Tabatabai
(74) *Attorney, Agent, or Firm*—Frommer Lawrence & Haug LLP

(57) ABSTRACT

By using input image signals of a plurality of frames, the motions of prescribed areas within an image based on the input image signals are detected, and then a layering is performed. An image signal of a peripheral image which occurs at the same time as an objective frame in the input image signals, and is different in view angle from the image of the objective frame is generated using the input image signals of the plurality of the frames based on the detected motions and the layering.

47 Claims, 38 Drawing Sheets

OTHER PUBLICATIONS

Szeliski R: "Prediction error as a quality metric for motion and stero" Computer Vision, 1999. The Proceedings of the Seventh IEEE International Conference on Kerkyra, Greece Sep. 20-27, 1999, Los Alamitos, CA, USA, IEEE Comput. Soc, US, vol. 2, Sep. 20, 1999, pp. 781-788, XP010350511 ISBN: 0-7695-0164-8.

Sommerer C et al.: "Time-lapse: an immersive interactive environment based on historic stereo images" Systems, Man, and Cybernetics, 1999. IEEE SMC '99 Conference Proceedings. 1999 IEEE International Conference on Tokyo, Japan Oct. 12-15, 1999, Piscataway, NJ, USA, IEEE, US, vol. 6, Oct. 12, 1999, pp. 19-24, XP010363178 ISBN: 0-7803-5731-0.

* cited by examiner

FIG. 5A
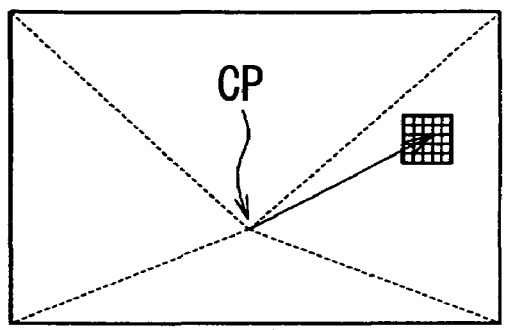
FIG. 5B
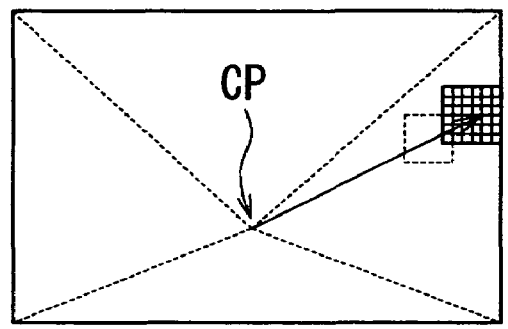
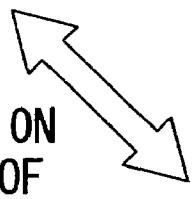
CALCULATION FOR SUM OF DIFFERENCE
(1/Z)
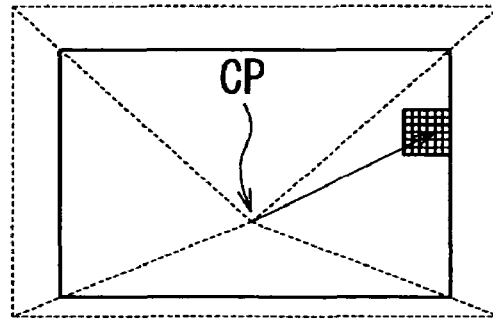
FIG. 5C

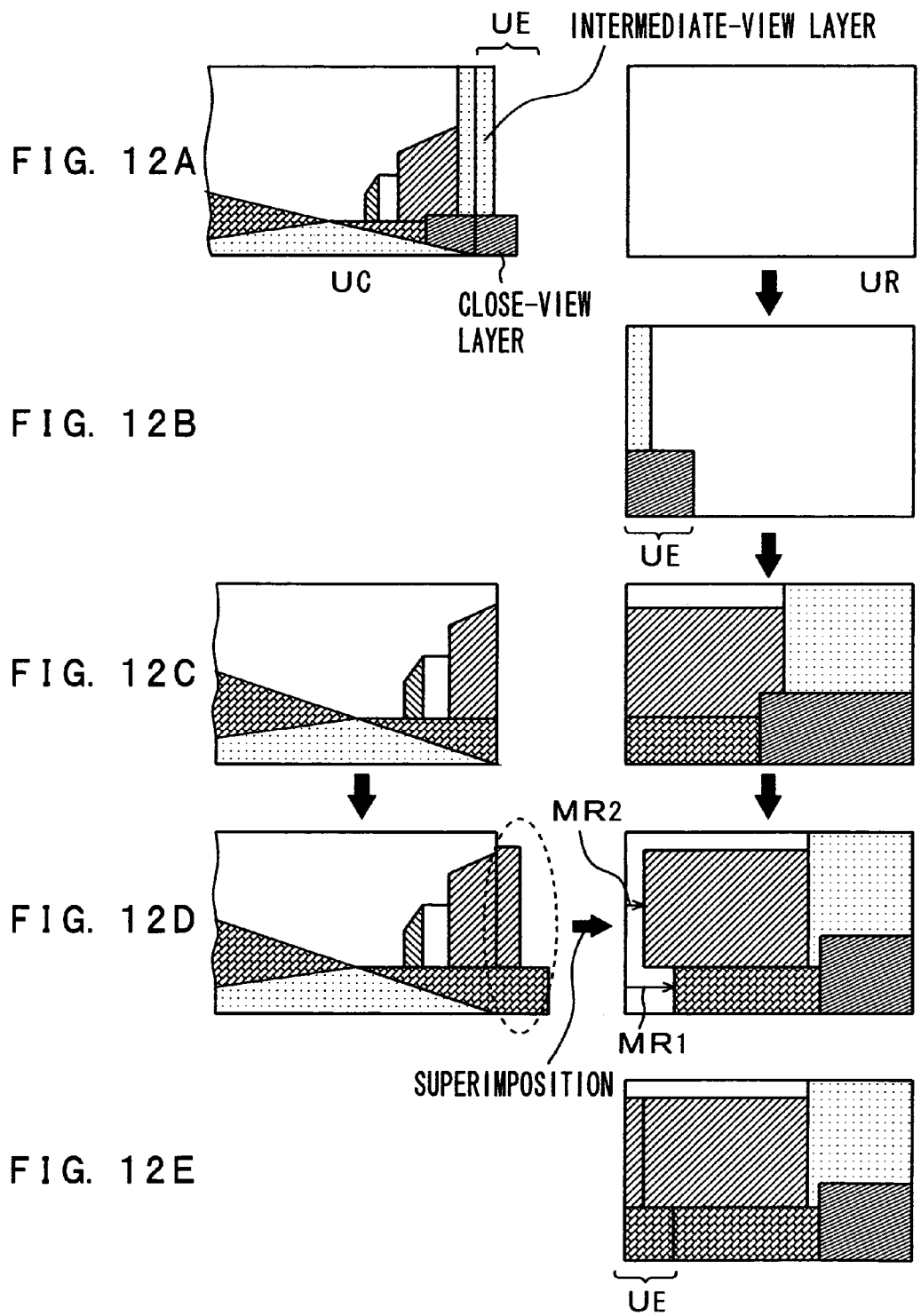

FIG. 13B LAYER-BY-LAYER MOVEMENT
INTERPOLATION PROCESSING
FIG. 13C EXTENSION (STRAIGHT FORWARD MOTION)

(LEFT TURN)

(BACKWARD MOTION)

(CROSSING)

(PASSING)

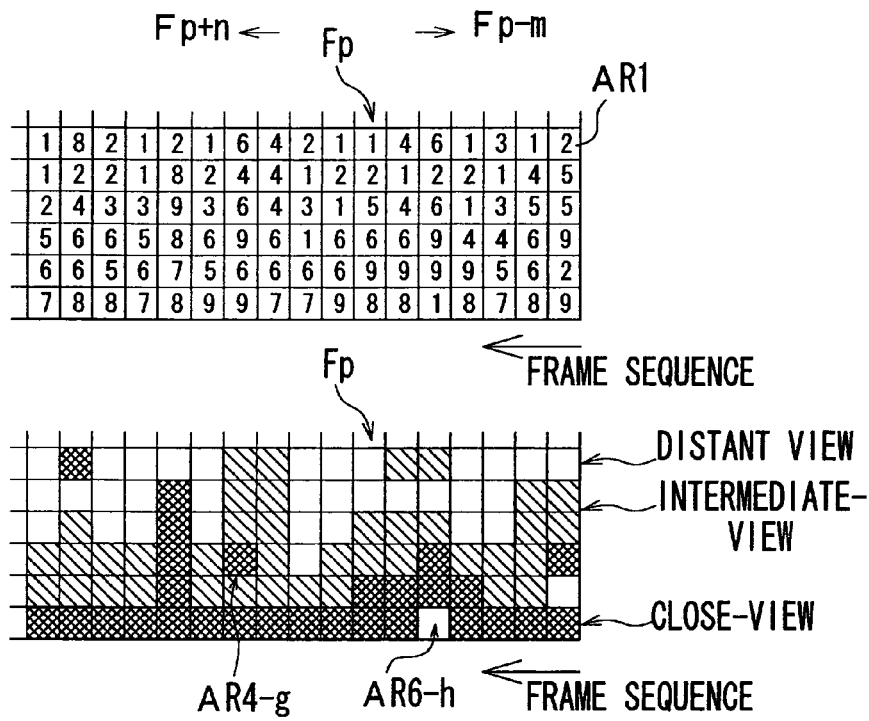
FIG. 26A
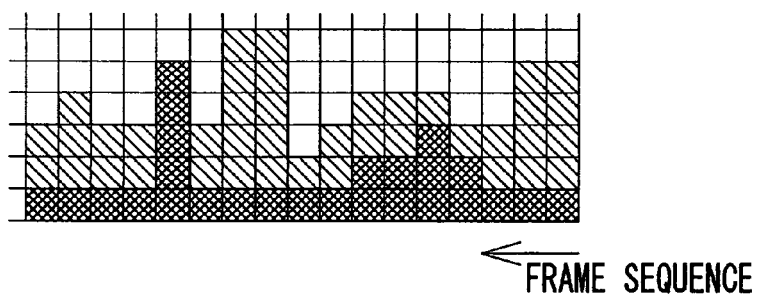
FIG. 26B
FIG. 26C
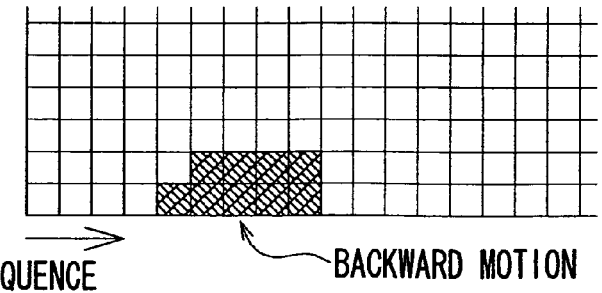
FIG. 26D

DISTANT-VIEW LAYER

PORTIONS WITHOUT IMAGE

INTERMEDIATE-VIEW LAYER

CLOSE-VIEW LAYER

READ DIRECTION    STARTING POSITION

DISTANT-VIEW LAYER

PORTIONS WITHOUT IMAGE

INTERMEDIATE-VIEW LAYER

CLOSE-VIEW LAYER

READ DIRECTION    STARTING POSITION

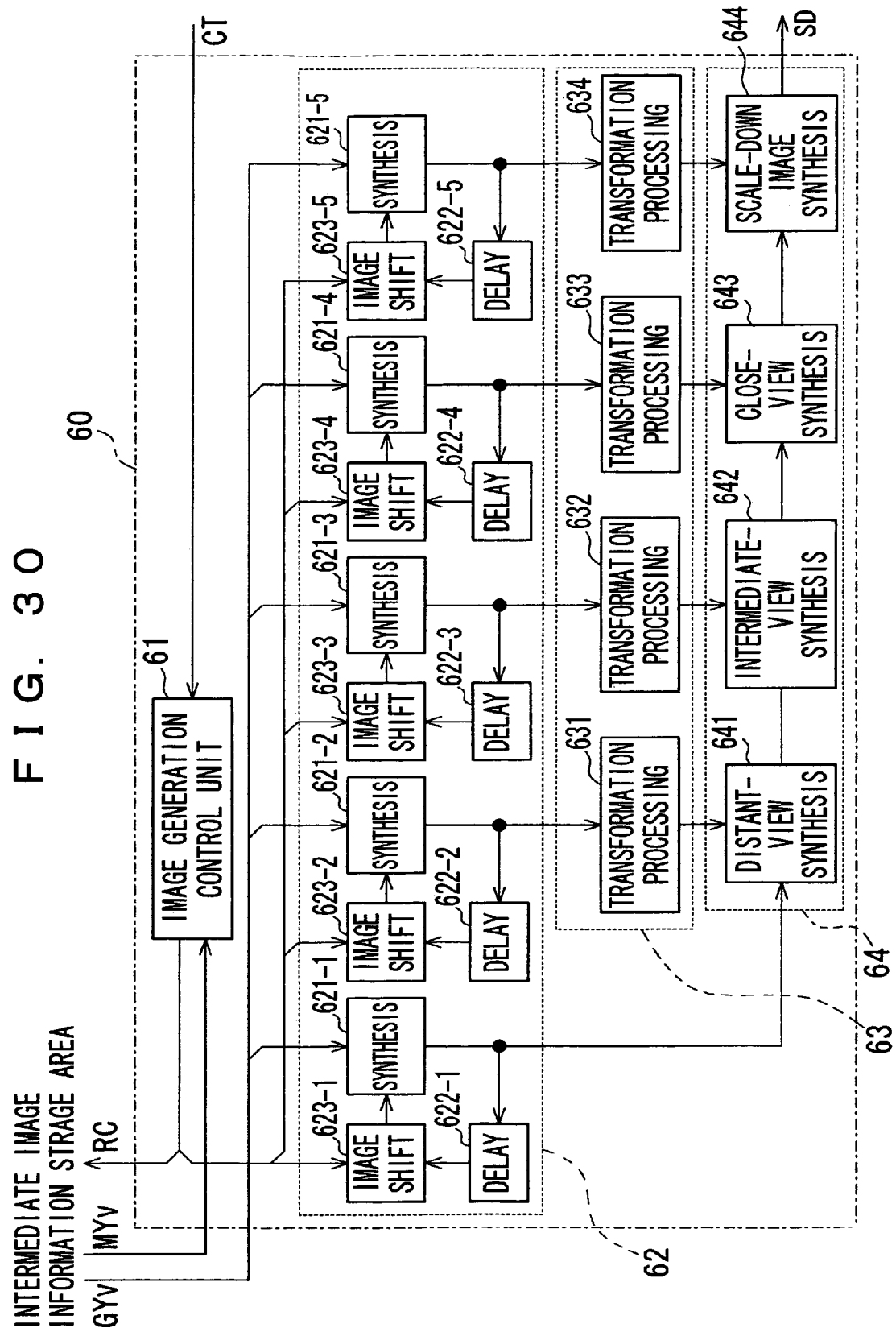

MOTION IDENTIFICATION
IMAGE Up

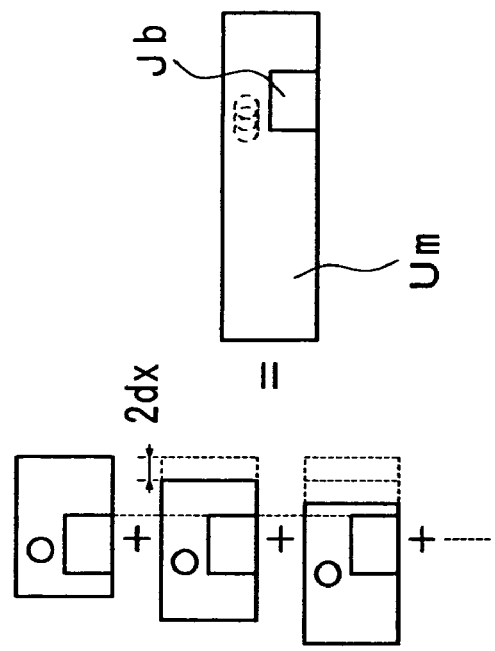
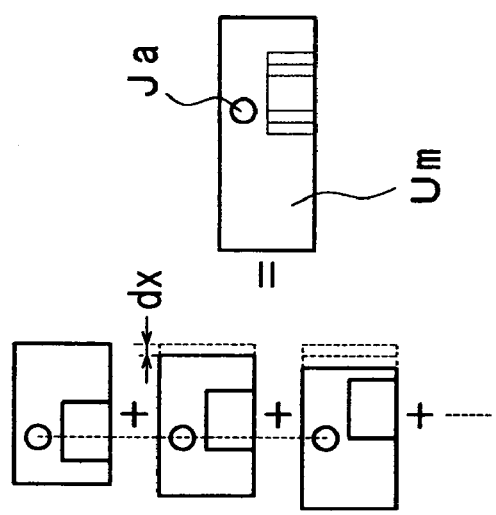
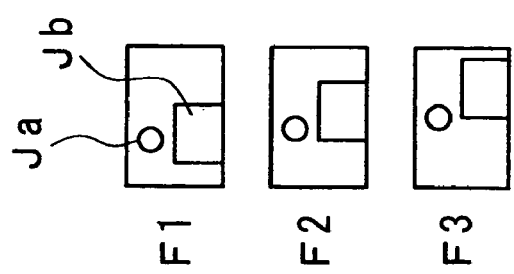
FIG. 38A  FIG. 38B  FIG. 38C  FIG. 38D  FIG. 38E

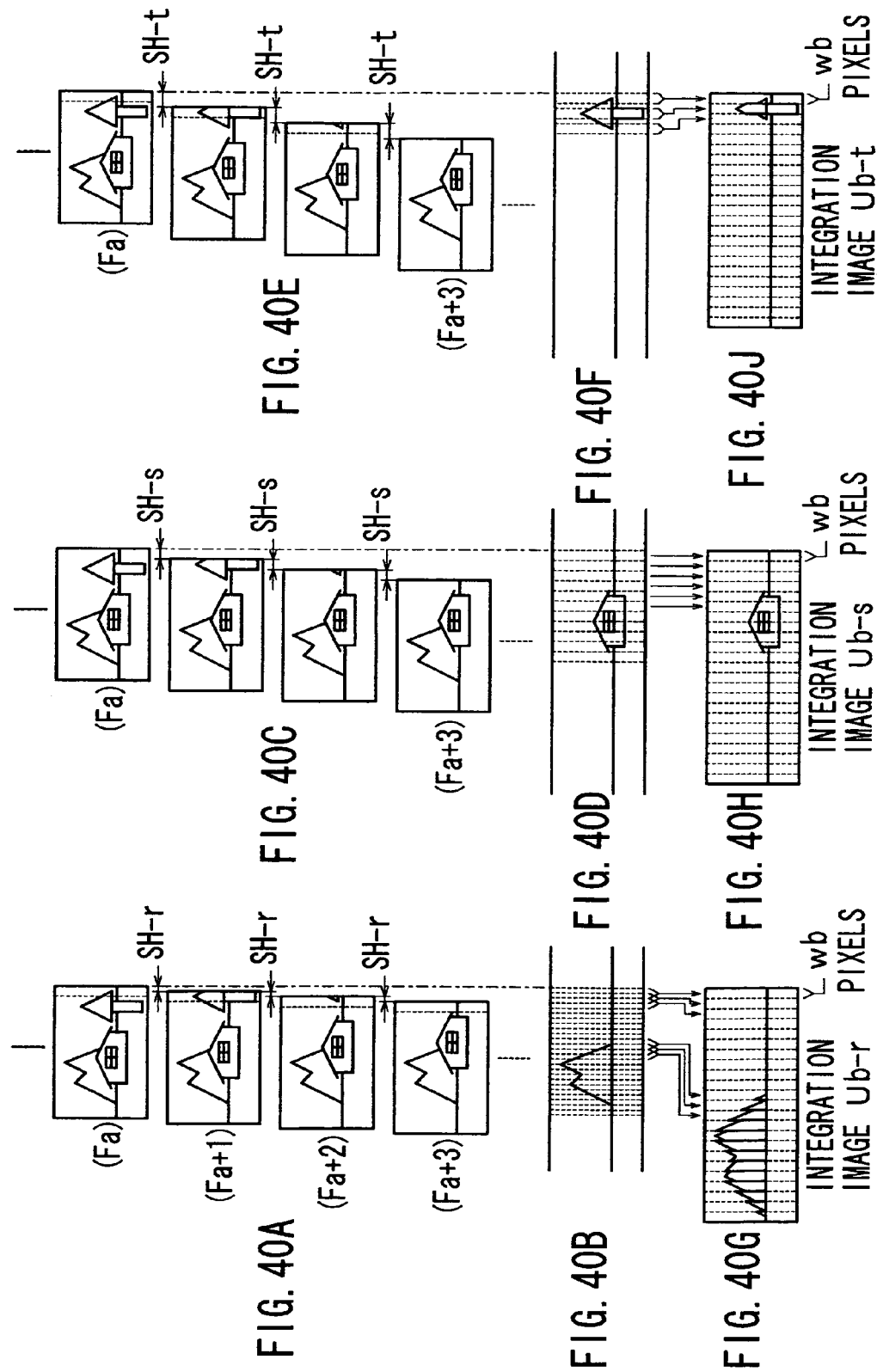

MOTION
IDENTIFICATION
IMAGE wa (=wb)
PIXELS

INTEGRATION IMAGE
Ub-r
(FOR AN IMAGE SHIFT
AMOUNT OF SH-r)

wb (=wa)
PIXELS

INTEGRATION IMAGE
Ub-s
(FOR AN IMAGE SHIFT
AMOUNT OF SH-s)

INTEGRATION IMAGE
Ub-t
(FOR AN IMAGE SHIFT
AMOUNT OF SH-t)

⟵
FRAME SEQUENCE

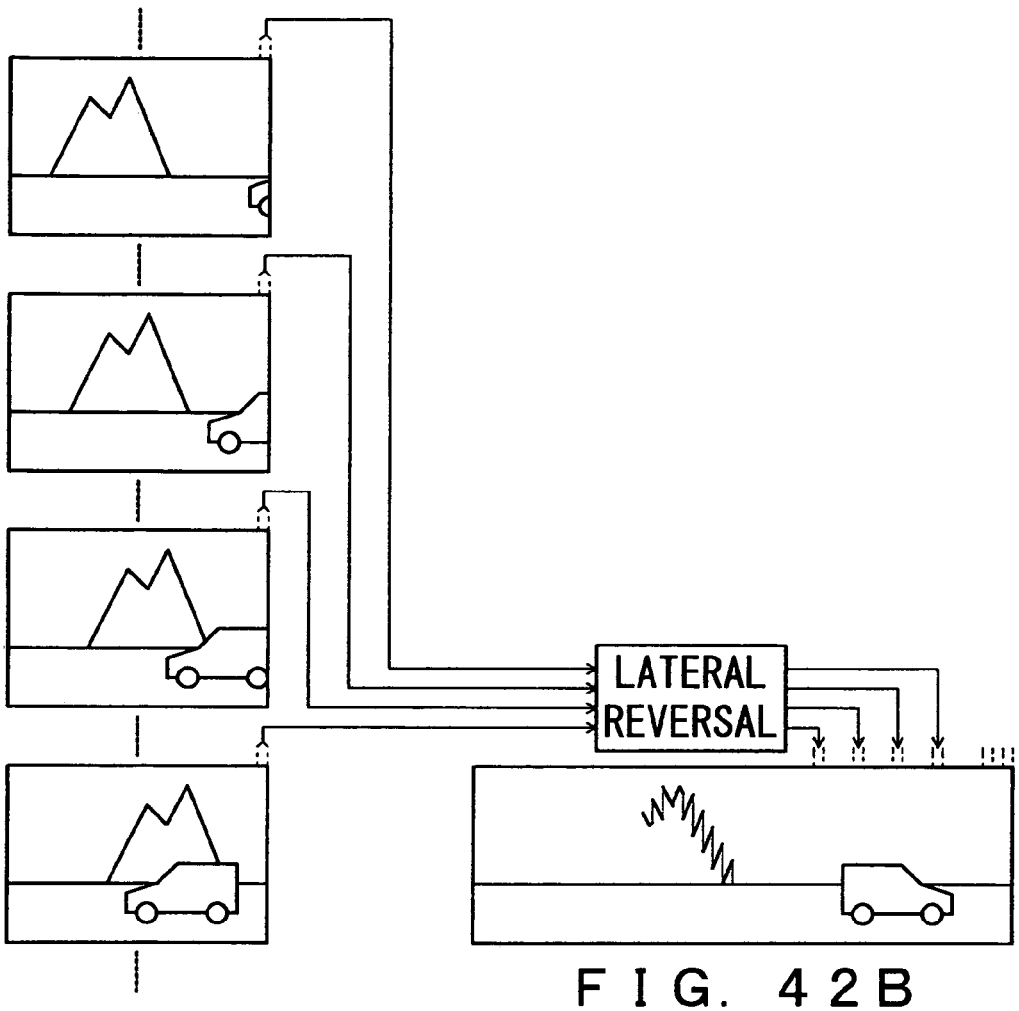
FIG. 42A
FIG. 42B
MOTION IDENTIFICATION IMAGE Up
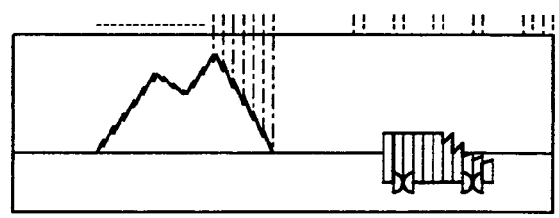
FIG. 42C
MOTION IDENTIFICATION IMAGE Up
(WHEN LATERAL REVERSAL
IS NOT PERFORMED)

PROJECTION PLANE    GENERATED IMAGE
IMAGE UI                   URI

F I G. 4 5 A     F I G. 4 5 B

IMAGE PROCESSING APPARATUS, IMAGE
SIGNAL GENERATION METHOD,
INFORMATION RECORDING MEDIUM,
AND IMAGE PROCESSING PROGRAM

This application is a Division of U.S. application Ser. No. 10/203,707 filed Dec. 9, 2002, now U.S. Pat. No. 7,146,023 issued Dec. 5, 2006, which is a 371 of PCT/JP01/11049 filed Dec. 17, 2001, which claims the benefit of Japanese Applications Japan 2000-382369 filed Dec. 15, 2000 and Japan 2001-238208 filed Aug. 6, 2001 which are all hereby incorporated by reference in their entirety herein.

TECHNICAL FIELD

The present invention relates to an image processing apparatus, an image signal generation method, an image processing program, and an information recording medium. More particularly, it relates to a technology for generating, based on input image signals of a plurality of frames, an image signal of a peripheral image which corresponds to the time of an objective frame in the input image signals, and is different in view angle from the image of the objective frame, by an image processing apparatus and a computer.

BACKGROUND ART

In recent years, a multi-screen display system, a curved face display, a wide view angle display, a head mount display, or the like has gone into actual use for performing image display with enhanced reality.

Herein, in order to perform image display with enhanced reality using the displays as described above, a three-dimensional virtual space is illustratively constructed by a computer graphics. Whereas, the following display procedure is also carried out. By using a large number of video cameras, or mounting a wide-angle lens on a video camera, a wide range of space is photographed. The photographed image is then transformed to the flat or curved image adaptable to the multi-screen display, the head mount display, or the like for display.

Incidentally, when the moving image display with enhanced reality is performed by using the multi-screen display, the wide-angle display, or the like in this manner, an arithmetic operation is required to be performed using a high-speed computer device in order to construct a three-dimensional virtual space with a computer graphics. This requires excessive cost and time, and results in an image with less reality and sense of realness as compared with a real picture image.

Further, using a real picture image requires that the overall range of a space to be presented be photographed closely throughout the space in order to present a wide range of space. For this reason, a hefty image pick-up apparatus including a large number of video cameras, a video camera mounting a special lens, and the like become necessary, incurring a heavy cost.

Further, when the image contents photographed by a general video camera have been already present, unless the same scene as the image contents is photographed again by a plurality of video cameras, it is impossible to present a wide range of image.

Under such circumstances, it is therefore an object of this invention to provide an image processing apparatus capable of presenting a wide view angle image with ease without using a plurality of vide cameras, or a video camera using a special lens, and an image signal generation method, an information recording medium, and an image processing program therefor.

DISCLOSURE OF THE INVENTION

In this invention, the motion of each prescribed area in an image formed on a specific plane is detected using input image signal of a plurality of frames. Then, based on the detected motion and the input image signal of the plurality of the frames, an image signal of a peripheral image which corresponds to the time of an objective frame in the input image signal, and is different in view angle from the image of the objective frame is generated.

Further, by using input image signal of a plurality of frames, the motion of each prescribed area in an image of an objective frame in the input image signal is detected. The layer of the prescribed area is determined on the basis of the detected motion to generate layer information. By using the layer information and the input image signal, the input image signal of the plurality of the frames is synthesized layer by layer to generate an image signal of a peripheral image which corresponds to the time of an objective frame in the input image signal, and is different in view angle from the image of the objective frame.

Still further, input image signal of a plurality of frames is projection-transformed onto a specific plane to generate image signal of a projection image. The motion of each prescribed area in the projection image is detected using the image signal of the projection image. The layer of the prescribed area is determined based on the detected motion to generate layer information. By using the layer information and the image signal of the projection image, the image signal of the projection image of the plurality of the frames is synthesized layer by layer to generate an image signal of a peripheral image which corresponds to the time of an objective frame in the input image signal, and is different in view angle from the image of the objective frame.

BRIEF DESCRIPTION OF THE DRAWINGS

FIGS. 5A to 5C are diagrams each for illustrating a calculation method of a moving amount;

FIGS. 12A to 12E are diagrams each for illustrating the operation of generating a right side moving image;

FIGS. 13A to 13C are diagrams each for illustrating the occurrence of a gap area and an interpolation processing;

FIGS. 26A to 26D are diagrams each for illustrating the operation for generating layer classification information;

FIG. 30 is a chart showing a configuration of a peripheral image signal generation block;

FIGS. 38A to 38E are diagrams each for illustrating the principle of an identification operation of a moving amount;

FIGS. 40A to 40H and 40J are diagrams each for illustrating the operation of the integration image generating unit.

FIGS. 42A to 42C are diagrams each for illustrating the operation of generating a motion identification image of a backward motion layer;

BEST MODE FOR CARRYING OUT THE INVENTION

Figure 1:
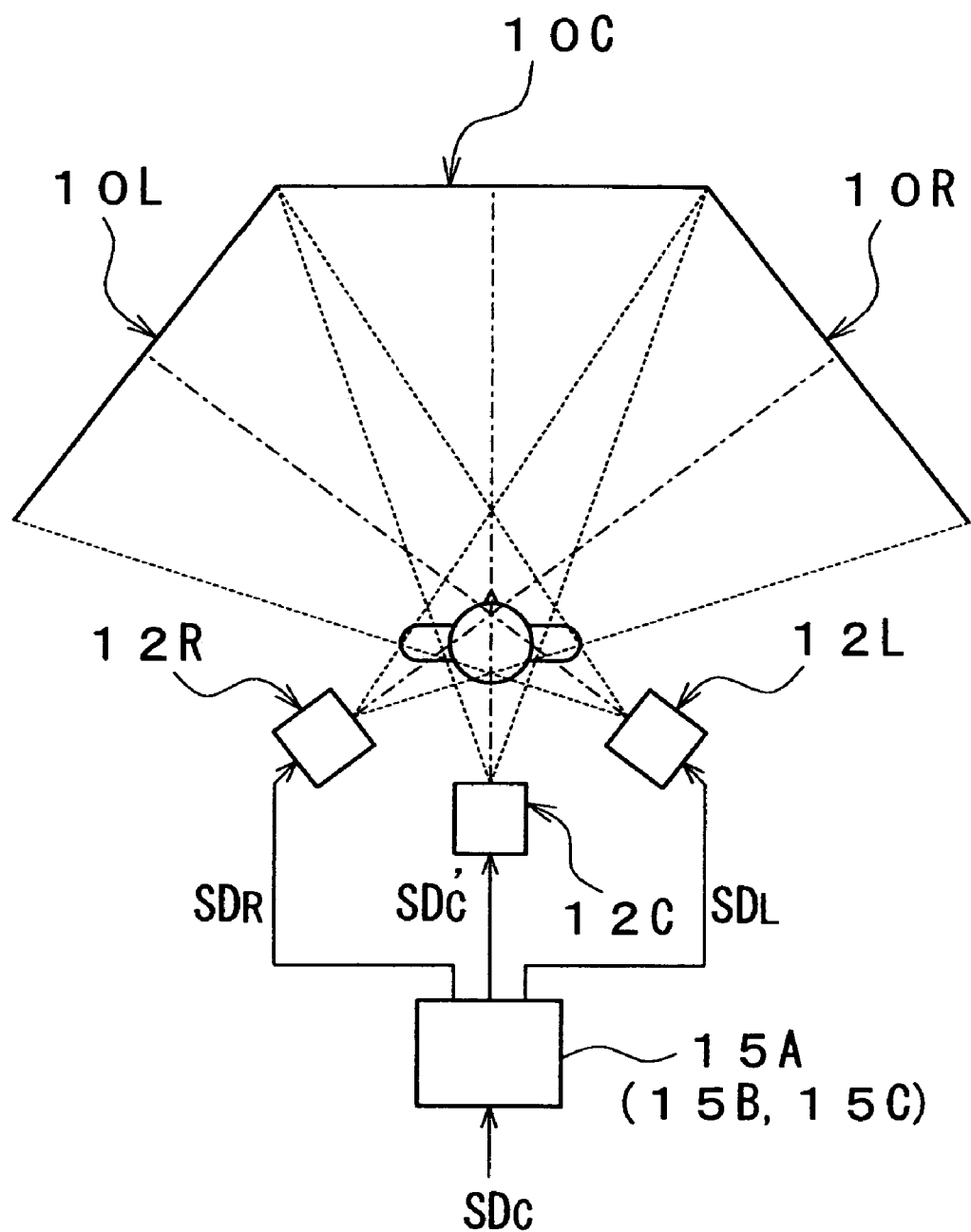
FIG. 1 is a view showing a configuration of a display system.

Below, the embodiments of this invention will be described with reference to drawings. FIG. 1 shows an overall configuration of a display system using an image processing apparatus in this invention. In this display system, for example, three screens are disposed on the front side and on the opposite sides of a user. By projecting an image using projectors 12L, 12C, and 12R corresponding to their respective screens 10L, 10C, and 10R, a wide range of image for the three screens is presented. The projectors 12L, 12C, and 12R are connected to an image processing apparatus 15A.

Figure 2:
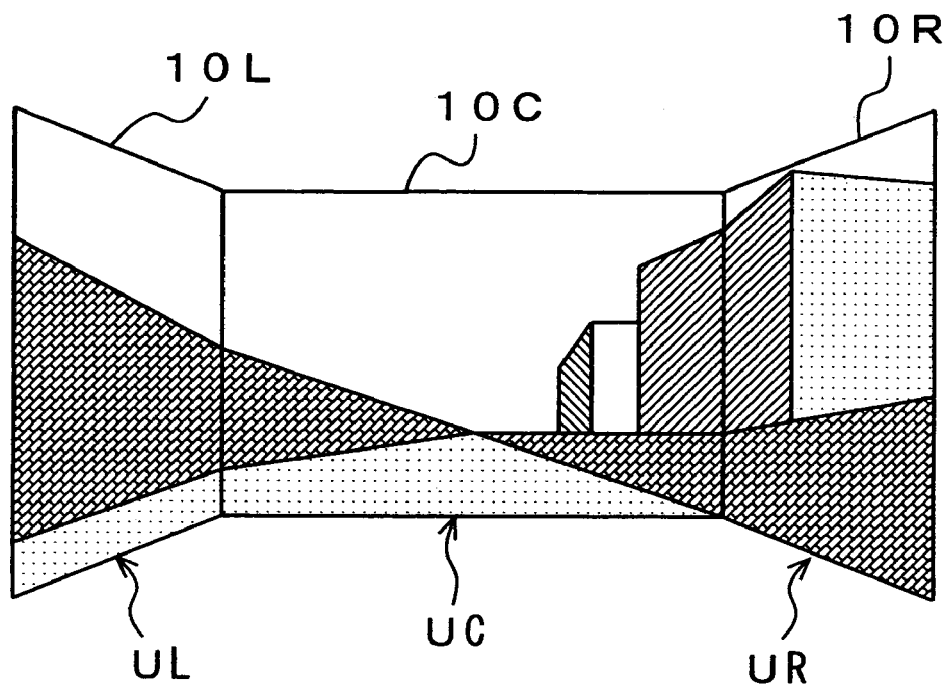
FIG. 2 is a diagram showing an image projection state.

To the image processing apparatus 15A, an image signal of an image photographed from a moving point, for example, an image signal SDC of the moving image obtained by photographing the front with a car-mounted camera is inputted. The image processing apparatus 15A delays the inputted image signal SDC by the time required for generation of peripheral image signals SDL and SDR of side moving images described later, and then supplies it as an image signal SDC' to the projector 12C. The projector 12C projects a front moving image UC based on the image signal SDC' onto a screen 10C situated at the front as shown in FIG. 2. Further, the image processing apparatus 15A generates peripheral image signals SDL and SDR of side moving images corresponding to the front moving image UC, i.e., moving images in the peripheral area adjoining to the range of the visual field (range of angle of view) of the car-mounted camera, for example, peripheral image signals of left and right side moving images based on the image signal SDC of the front moving image UC which is a reference moving image. The projector 12L receives the peripheral image signal SDL of the generated left side moving image UL, and projects the left side moving image UL onto the screen 10L situated at the left side based on the peripheral image signal SDL. The projector 12L receives the peripheral image signal SDR of the generated right side moving image UR, and projects the right side moving image UR onto the screen 10R situated at the right side based on the peripheral image signal SDR.

Figure 3:
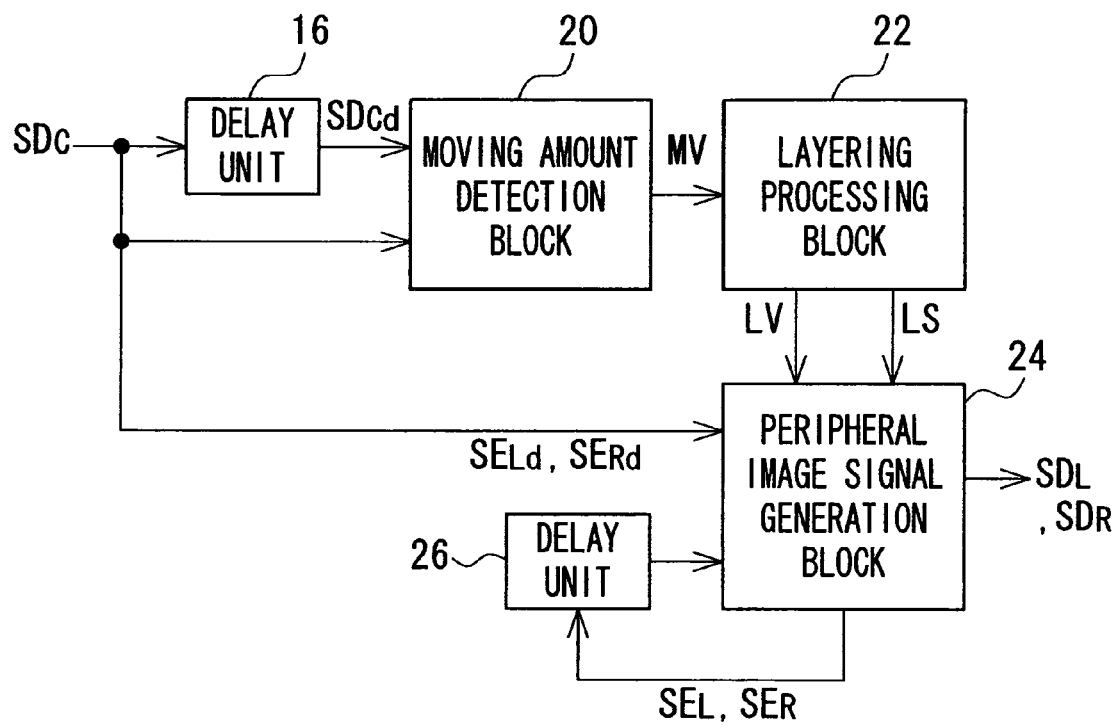
FIG. 3 is a chart showing an image processing apparatus according to a first embodiment of this invention.

FIG. 3 shows a schematic configuration of an image processing block for newly generating the peripheral image signals SDL and SDR of side moving images based on the received image signal SDC of the front moving image in the image processing apparatus 15A.

Figure 4:
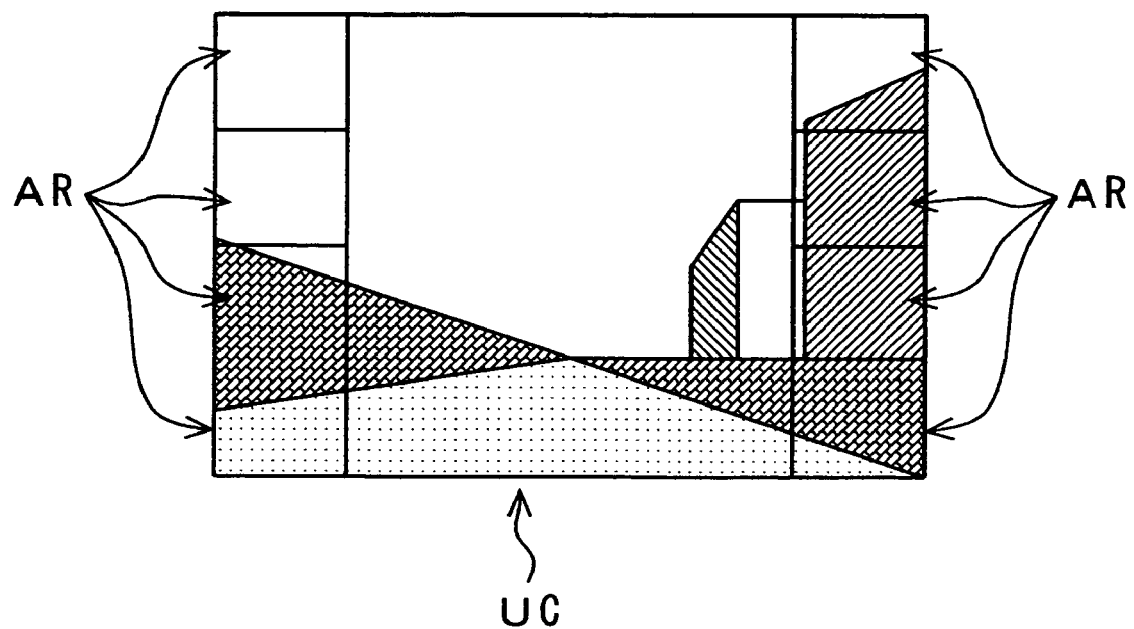
FIG. 4 is a diagram for illustrating the setting of motion detection areas.

The image signal SDC is supplied to a delay unit 16, a moving amount detection block 20, and a peripheral image signal generation block 24. The moving amount detection block 20 sets image edge areas of the moving image, for example, a plurality of motion detection areas AR as shown in FIG. 4 closer to opposite side edges of the front moving image UC, calculates the moving amount MV of the image in each motion detection area AR, and supplies it to a layering processing block 22. This moving amount MV is calculated based on an image signal SDC of the motion detection area and an image signal SDd of one frame prior.

The layering processing block 22 identifies whether each motion detection area is the area of a distant-view image obtained by photographing a distant object (distant-view layer), the area of a close-view image obtained by photographing a nearby object (close-view layer), or the area of an intermediate-view image situated between the distant-view image and the close-view image (intermediate-view layer), based on the moving amount MV. Further, it generates layer identification information LS indicating which one of the distant-view layer, the intermediate-view layer, and the close-view layer includes any motion detection area on the basis of the identification result, and supplies it to the peripheral image signal generation block 24. Still further, it calculates a layer moving amount LV of each layer for each frame based on the statistical information calculated by using the moving amounts of each motion detection area included in the layer, and supplies the layer moving amount LV to the peripheral image signal generation block 24.

The peripheral image signal generation block 24 extracts the front moving image by the layer moving amount LV of the corresponding layer of each motion detection area from the respective positions set as the image edge areas in correspondence with the motion detection areas. Further, the peripheral image signal generation block 24 superimposes the extracted images one on another sequentially from the layer of the distant-view having a smaller moving amount to the layer of the close-view having a larger moving amount to perform image synthesis. Then, it performs a transformation processing in accordance with the orientation of the plane of projection of each of the side moving images, and generates and outputs the peripheral image signals SDL and SDR of the side moving images corresponding to the time of the front moving image.

Further, image signals SEL and SER of side moving images of each layer are supplied to a delay unit 26, thereby allowing them to be delayed by one frame, and then supplied back to the peripheral image signal generation block 24. Herein, the peripheral image signal generation block 24 moves the images based on image signals SELd and SERd of the side moving images each delayed by one frame, layer by layer, in accordance with each moving amount set for every layer. Further, the peripheral image signal generation block 24 adds the images extracted from the front moving image to the images after movement, followed by layer-by-layer superimposition. Thus, image synthesis is performed to generate the peripheral image signals SDL and SDR of the side moving images.

Further, when a gap portion without image occurs due to the difference in layer moving amount upon formation of the image obtained by superimposing distant-view, intermediate-view, and close-view images sequentially one on another, the peripheral image signal generation block 24 interpolates the gap portion by an interpolation processing, and thereby generating the peripheral image signals SDL and SDR of the side moving images each having no gap portion.

Then, the configuration and operation of each block will be described in detail by reference to the drawings. Incidentally, in the following explanation, only the right side moving image is to be described, and the explanation on generation of the left side moving image is omitted.

The moving amount detection block 20 identifies the moving amount MV of the image for every motion detection area as described above. Herein, when the front is photographed by a car-mounted camera as described above, so that an image looks as if it comes out of one point (below, referred to as an "image reference position") CP, the moving amount detection block 20 identifies the moving amounts by imposing the boundary condition that the direction of movement of the front moving image is along the radial direction from one point. In this case, for example, at a time T' after an elapse of one frame time, the front moving image at a time T shown in FIG. 5A will become roughly equal to the image obtained by causing the front moving image at the time T to perform a zoom operation with the image reference position CP as a center as shown in FIG. 5B. For this reason, it is conceivable that the distance from the image generation position to the center of the motion detection area is proportional to the scaling factor in the zoom motion. Thus, the moving amount detection block 20 sets a scaling factor Z with the image reference position CP as a center to scale down the motion detection area to (1/Z) as shown in FIG. 5C. The sum of differences between the image signals of positions of the scaled-down area and the image signals of the corresponding positions in the image of one frame prior is calculated to detect a scaling factor Z such that the sum of differences becomes the minimum value, thereby calculating the moving amount of each moving area.

Figure 6:
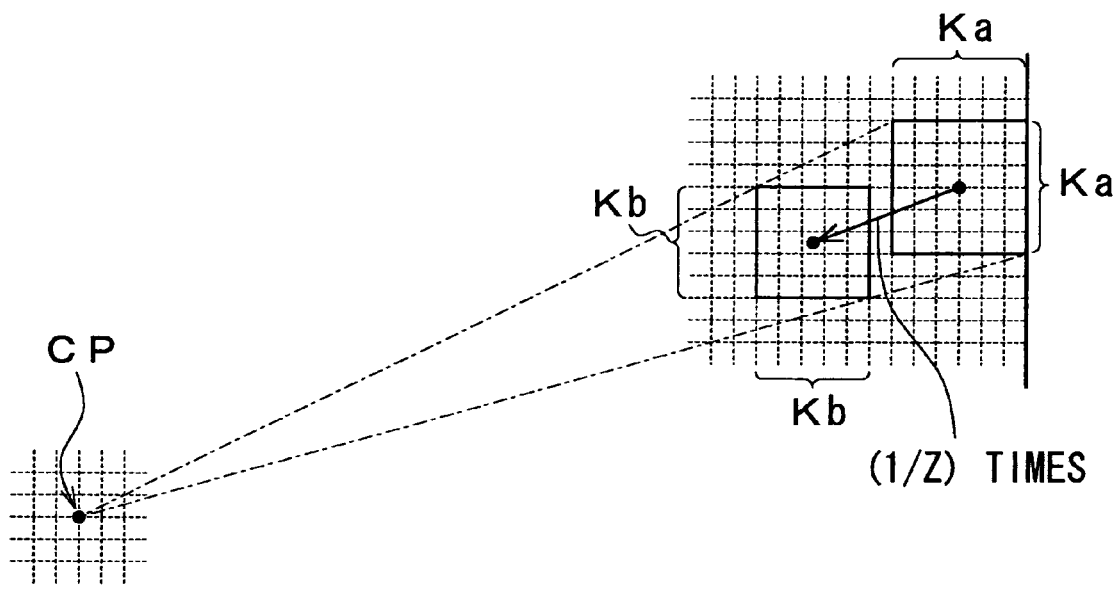
FIG. 6 is a diagram showing a change in area size upon zooming.

Herein, upon performing the scale-down processing, there occur any pixels having no coordinate values of an integer in pixels in the area. On the other hand, in the image of one frame prior, which has not undergone the scale-down processing, each coordinate value of the pixels in the area is an integer value. For this reason, linear interpolation is carried out for the scaled-down image to calculate the signal level of a position such that the coordinate value becomes an integer value. For example, when the area size becomes the size of Kb□~Kb pixels by scaling down the motion detection area of Ka□~Ka pixels by (1/Z) times as shown in FIG. 6, linear interpolation is carried out to calculate the signal level for the "Kb□~Kb" number of pixels using the signal level of Ka□~Ka pixels. By calculating the sum of differences using this calculated signal level, it is possible to identify the moving amount with high precision.

Figure 7:
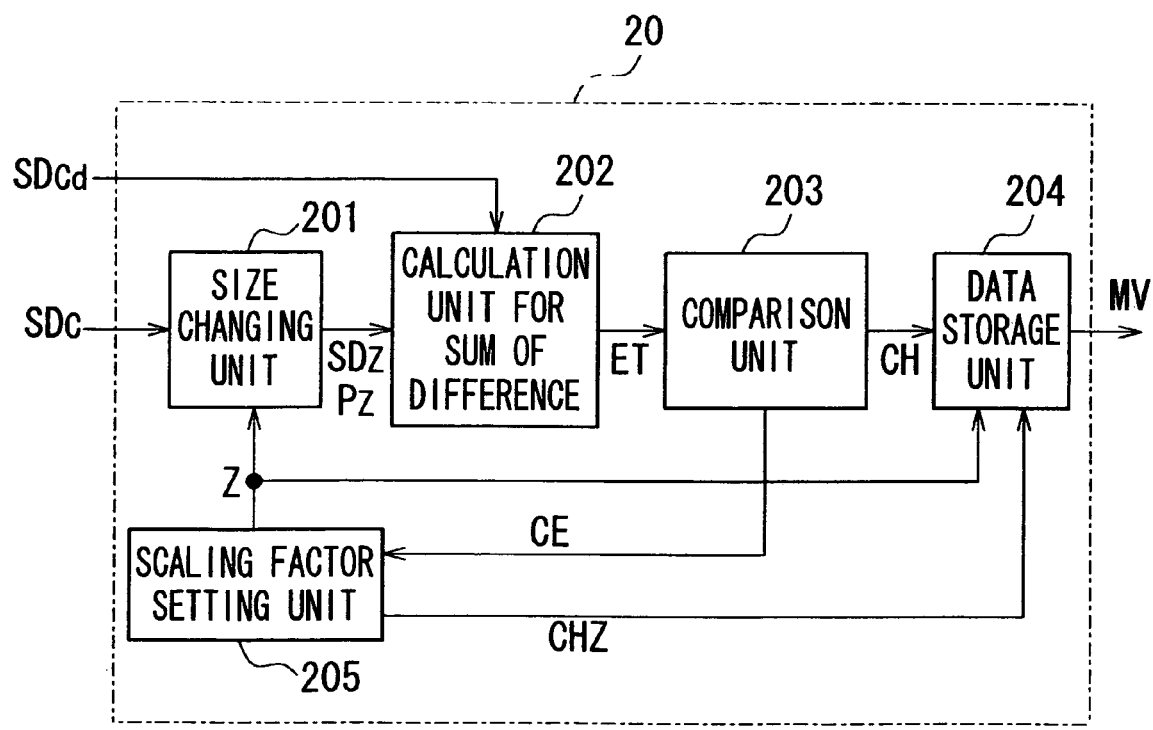
FIG. 7 is a chart showing a configuration of a motion detection block.

FIG. 7 shows a configuration of the moving amount detection block 20. An image signal SDc is supplied to a size changing unit 201, and an image signal SDcd of one frame prior is supplied to the calculation unit for sum of differences 202. The size changing unit 201 divides the right side edge portion of the front moving image in, for example, units of 16×16 pixel size to set a plurality of motion detection areas. Incidentally, in the following description, the operation of each unit with respect to one motion detection area will be shown.

The size changing unit 201 generates an image signal SDz of the motion detection area which has been magnified by (1/Z) times with the image reference position CP as a center, using a scaling factor Z supplied from a scaling factor setting unit 205, and supplies the image signal SDz to the calculation unit for sum of differences 202. Further, when the image signal SDz is supplied to the calculation unit for sum of differences 202, the coordinate value Pz of the center of the motion detection area moved due to (1/Z) times scaling down with the image reference position CP as a center is also supplied to the calculation unit for sum of differences 202. Incidentally, the image signal SDz is a signal resulting from transformation to the signal level at every pixel position by an interpolation processing as described for FIG. 6.

The calculation unit for sum of difference 202 selects an image signal of the area corresponding to the motion detection area scaled down by (1/Z) times with reference to the coordinate value Pz shown by the size changing unit 201 from the image signal SDd of one frame prior. By using the signal thus selected and the image signal SDz of the motion detection area scaled down by (1/Z) times, pixel-by-pixel differences are calculated and added to calculate the sum of differences ET, which is then notified to a comparison unit 203.

The comparison unit 203 compares a minimum value in the sum of differences ETL with the sum of differences ET calculated at the calculation unit for sum of differences 202. Herein, when the minimum value in the sum of differences ETL is not set, the sum of differences ET calculated first is set as the minimum value in the sum of differences ETL. Further, it is also acceptable that the minimum value in the sum of differences ETL is previously set to be a larger value than the sum of differences to be calculated. When the sum of differences ET has been found to be smaller than the minimum value in the sum of differences ETL as a result of the comparison between the minimum value in the sum of differences ETL and the sum of differences ET, the sum of differences ET is set as another minimum value in the sum of differences ETL, and an update signal CH indicating that the minimum value in the sum of differences ETL has been updated is notified to a data storage unit 204. Further, the comparison unit 203 notifies a signal CE indicating that the comparison between the sum of differences ET and the minimum value in the sum of differences ETL has been completed to the scaling factor setting unit 205.

The data storage unit 204 has been notified of the scaling factor Z from the scaling factor setting unit 205. It stores the notified scaling factor Z upon being notified of the fact that the minimum value in the sum of differences ETL has been updated by the update signal CH. Whereas, when it has already stored the scaling factor, it updates the stored scaling factor to the notified scaling factor Z. Further, when it has received a signal CHZ indicative of the completion of the change processing of the scaling factor from the scaling factor setting unit 205, it supplies the stored scaling factor Z as the moving amount MV to the layering processing block 22.

The scaling factor setting unit 205 presets the lower limit value and the upper limit value of the scaling factor (for example, lower limit value=1.0, upper limit value=1.1), and first, it notifies the lower limit value as the scaling factor Z to the size changing unit 201 and to the data storage unit 204. Thereafter, every time the signal CE indicative of the completion of the comparison between the sum of differences ET and the minimum value in the sum of differences ETL is supplied from the comparison unit 203, the scaling factor Z is sequentially increased by a prescribed amount (ex. increased in steps of 0.005) to be notified to the size changing unit 201 and the data storage unit 204. Subsequently, when the scaling factor Z has reached the upper limit value, the scaling factor setting unit 205 notifies the signal CHZ indicative of the completion of the change processing of the scaling factor to the data storage unit 204.

Thus, by sequentially increasing the scaling factor at the scaling factor setting unit 205, the image of the motion detection area is sequentially scaled down. In addition, the image of the scaled-down area is compared with the image of one frame prior to store the scaling factor when the difference becomes the lowest in the data storage unit 204. Accordingly, it is possible to supply the moving amount MV of the motion detection area from the data storage unit 204 to the layering processing block 22 when the change processing of the scaling factor at the size changing unit 201 has been completed.

Figure 8:
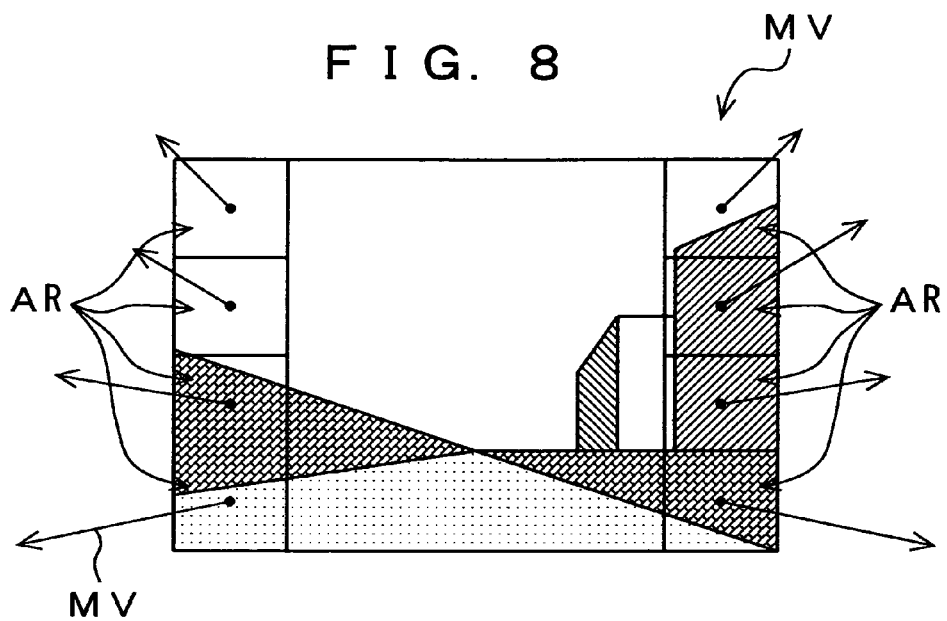
FIG. 8 is a diagram showing the moving amount of each motion detection area.

Further, also for every set motion detection area, the same processing is performed using the scaling factor Z set by the scaling factor setting unit 205. When the change processing of the scaling factor at the scaling factor setting unit 205 has been completed, as indicated by the length of each arrow of FIG. 8, the moving amount MV of each motion detection area AR is identified. Accordingly, it is possible to notify the moving amount MV of respective motion detection areas from the data storage unit 204 to the layering processing block 22.

The layering processing block 22 sets threshold values, and compares them with each moving amount. As a result, it identifies which one of a plurality of layers includes any motion detection area, and classifies the image edge area into a plurality of layers. Herein, for a distant-view image, the moving amount is small. Whereas, for a close-view image, the moving amount is large. As a result, by setting the threshold values, and comparing them with each moving amount, the layering processing block 22 can identify which one of the layers of, for example, the distant-view layer, intermediate-view layer, and close-view layer includes any motion detection area.

Figure 9:
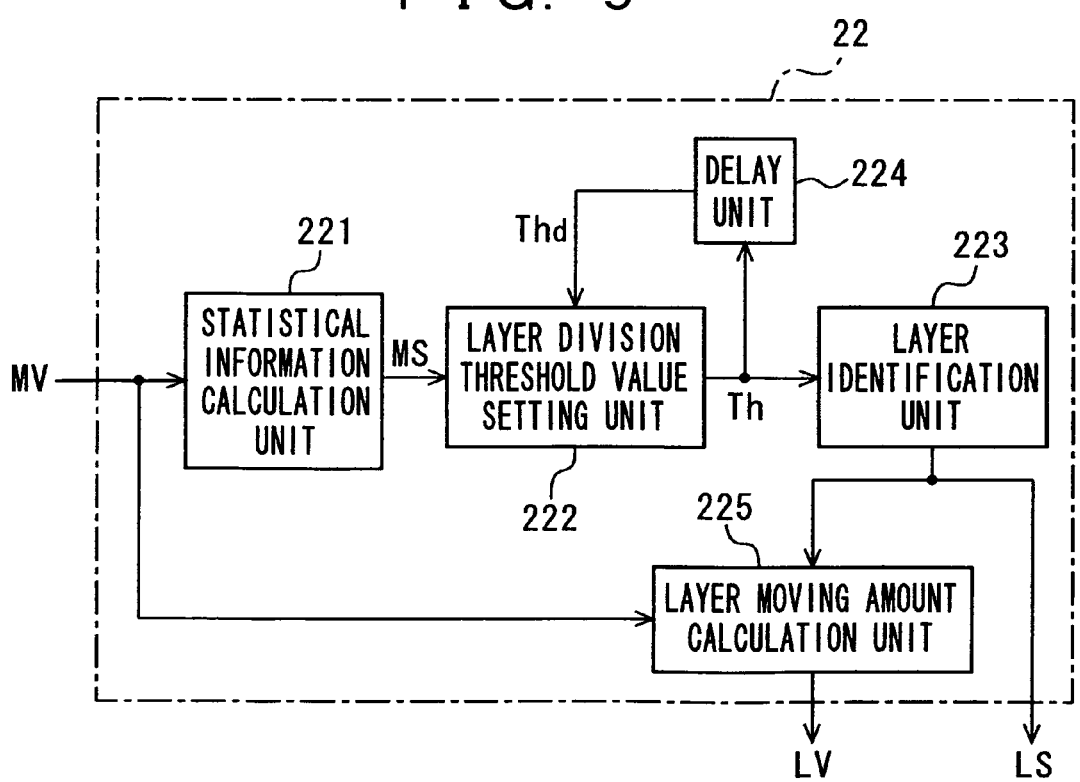
FIG. 9 is a chart showing a configuration of a layering processing block.

FIG. 9 shows a configuration of the layering processing block 22. The moving amount MV supplied from the moving amount detection block 20 is supplied to a statistical information calculation unit 221 and a layer moving amount calculation unit 225. The statistical information calculation unit 221 determines the statistical information MS based on the supplied moving amount of each area, such as the average value, the maximum value and the minimum value of the moving amounts, and the frequency distribution determined from classification of the moving amounts, and supplies it to the layer division threshold value setting unit 222.

The layer division threshold value setting unit 222 sets a threshold value Th based on the statistical information MS determined at the statistical information calculation unit 221, and supplies it to a layer identification unit 223 and a delay unit 224. Further, to the layer division threshold value setting unit 222, a threshold value Thd of one frame prior, which is the threshold value delayed by one frame at the delay unit 224 is supplied. The threshold value Thd of one frame prior is modified based on the statistical information MS determined at the statistical information calculation unit 221 to set another threshold value Th.

Figure 10A:
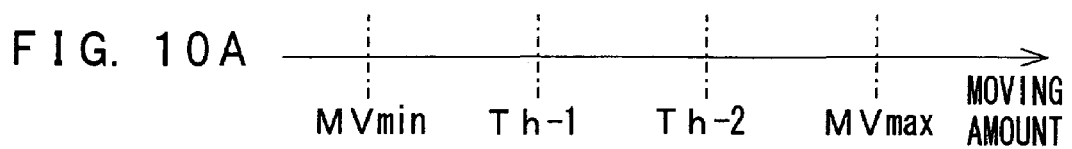
FIGS. 10A and 10B are charts each for illustrating the setting of threshold values.

Herein, in the case where n threshold values are set when the maximum value and the minimum value of the moving amounts are shown as the statistical information MS, it divides the range between the maximum value and the minimum value, which is the occurrence range of the moving amounts, into (n−1) equal parts to set threshold values. For example, as shown in FIG. 10A, the range from the maximum value MVmax to the minimum value MVmin is divided into 3 equal parts, so that the boundary values are set to be threshold values Th-1 and Th-2. Alternatively, the threshold values Th-1 and Th-2 are set using an average value MVavg as the following equations (1) and (2):

$$Th-1 = \frac{MV\mathrm{avg} + MV\mathrm{min}}{2} \quad (1)$$

$$Th-2 = \frac{MV\mathrm{avg} + MV\mathrm{max}}{2} \quad (2)$$

Further, when a threshold value of one frame prior is supplied, the threshold value is corrected based on the statistical information determined at the statistical information calculation unit 221, thereby calculating another threshold value. For example, if the threshold values each of one frame prior are assumed to be respectively "Thd-1" and "Thd-2", the threshold values Th-1 and Th-2 are calculated using the following equations (3) and (4). It is noted that "$f_¿$" and "fÀ" are coefficients.

$$Th-1 = \alpha \times Thd-1 + \beta \frac{MVavg + MVmin}{2} \quad (3)$$

$$Th-2 = \alpha \times Thd-2 + \beta \frac{MVavg + MVmax}{2} \quad (4)$$

Figure 10B:
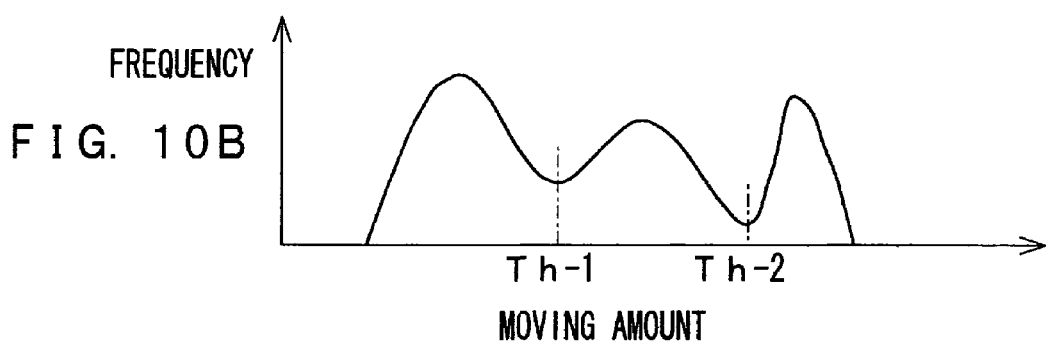

Further, when the histogram as shown in FIG. 10B is shown as the statistical information, it is also possible to identify the moving amount to be minimum, and to set the threshold values Th-1 and Th-2 based on the identified moving amount to be minimum. Further, it is also acceptable that other threshold values Th-1 and Th-2 are determined by correction of the threshold values Thd-1 and Thd-2 already set based on the histogram, based on the statistical information determined at the statistical information calculation unit 221 in the same manner as described above. Thus, the threshold values set at the layer division threshold value setting unit 222 are supplied to the layer identification unit 223.

The layer determination unit 223 compares the moving amount MV of each motion detection area with the threshold values Th set at the layer division threshold value setting unit, thereby determining which one of the layers includes the image edge area. Further, it generates layer identification information LS indicative of the result thereof, and supplies it to the layer moving amount calculation unit 225 and the peripheral image signal generation block 24. The layer moving amount calculation unit 225 calculates the average value based on the moving amounts of the motion detection areas included in layers for every layer, and supplies it to the peripheral image signal generation block 24 as the layer moving amount LV.

Incidentally, in such a case where the motion detection area is, for example, a part of the blue sky, the moving amount detection block 20 may be incapable of identifying the moving amount with high precision because even if the motion detection area is scaled down to calculate the sum of differences, the sum of differences becomes generally constant regardless of the scaling factor. For this reason, when it is not possible to identify the moving amount MV, the moving amount detection block 20 supplies the information indicative of the color of the image within the motion detection area to the layering processing block 22. Further, the layering processing block 22 performs layer division utilizing the information indicative of the color. For example, when in the motion detection area of which the moving amount cannot be detected, the color of the image within this area is the color of the blue sky, this area is allocated to the distant-view layer, thereby generating the layer identification information LS.

Then, the peripheral image signal generation block 24 extracts an image by the corresponding layer moving amount from the image edge area divided into layers based on the layer identification information LS and the layer moving amount LV. Further, the peripheral image signal generation block 24 moves the already generated side moving image of one frame prior, layer by layer, and then superimposes the images each extracted by the layer moving amount one on another, layer by layer, to perform image synthesis, thereby generating the side moving image. Further, the plane of projection of the front moving image is different in orientation from the plane of projection of the right side moving image. For this reason, the peripheral image signal generation block 24 subjects the generated side moving image to a transformation processing into the image adaptable to the plane of projection, and thereby generates and outputs an image signal of the side moving image to be projected onto a screen.

Figure 11:
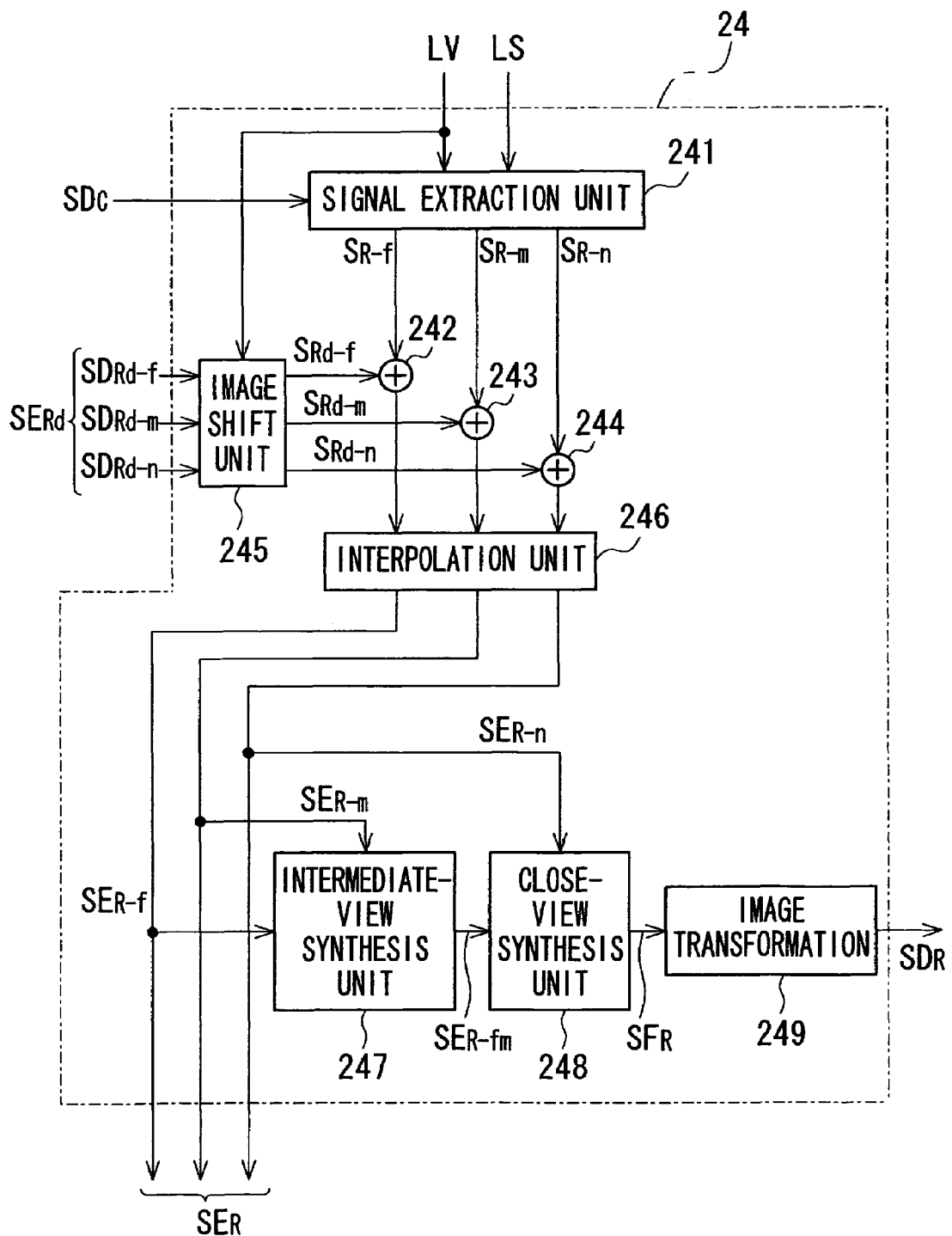
FIG. 11 is a chart showing a configuration of a peripheral image signal generation block.

FIG. 11 shows a configuration of the peripheral image signal generation block 24. This peripheral image signal generation block 24 has the configuration in the case where the image edge areas of the front moving image have been divided into three layers of the distant-view, intermediate-view, and close-view at the layering processing block 22.

The layer identification information LS and the layer moving amount LV both generated at the layering processing block 22 are supplied to a signal extraction unit 241. The signal extraction unit 241 extracts image signals each by the layer moving amount, layer by layer, from the image edge area of the front moving image based on the image signal SDC of the front moving image. For example, as shown in FIG. 12A, for every motion detection area position, it extracts an image UE by the layer moving amount corresponding to each layer of the motion detection area from the right end of the front moving image. Herein, when the motion detection area is identified as the distant-view layer, a signal of such a number of pixels that corresponds to the layer shift amount of the distant-view layer from the right end of the front moving image at the position corresponding to the motion detection area. Whereas, when it is identified as the intermediate-view layer or the close-view layer, the signal of such a number of pixels that corresponds to the layer moving amount of the intermediate-view layer or the close-view layer is extracted from the right end of the front moving image. If the extracted images of the respective layers are superimposed one on another to perform image synthesis, it is possible to generate the right side moving image UR as shown in FIG. 12B.

Thus, an image signal SR-f of the distant-view layer extracted by the signal extraction unit 241 is supplied to an addition unit 242. Whereas, an extracted image signal SR-m of the intermediate-view layer is supplied to an addition unit 243, and an extracted image signal SR-n of the close-view layer is supplied to an addition unit 244.

To an image shift unit 245, the layer moving amount is notified from the layering processing block 22, and image signals SERd-f, SERd-m, and SERd-n for each layer of one frame prior are supplied from the delay unit 26. The image shift unit 245 generates an image signal SRd-f obtained by moving the image of the distant-view layer based on the image signal SERd-f by the layer moving amount of the distant-view layer, and supplies it to the addition unit 242. Similarly, the image shift unit 245 generates an image signal SRd-m obtained by moving the image of the intermediate-view layer based on the image signal SERd-m by the layer moving amount of the intermediate-view layer, and supplies it to the addition unit 243, and it generates an image signal SRd-n obtained by moving the image of the close-view layer based on the image signal SERd-n by the layer moving amount of the close-view layer, and supplies it to the addition unit 244.

The addition unit 242 generates an addition signal SRA-f of the image signal SR-f and the image signal SRd-f, and supplies it to an interpolation unit 246. Similarly, the addition unit 243 generates an addition signal SRA-m of the image signal SR-m and the image signal SRd-m, and supplies it to the interpolation unit 246, and the addition unit 244 generates an addition signal SRA-n of the image signal SR-n and the image signal SRd-n, and supplies it to the interpolation unit 246.

Herein, for example, when the right side moving image UR generated by superimposing the image signals SERd-f, SERd-m, and SERd-n one on another is the one shown in FIG. 12C, images are moved by their respective layer moving amounts MR1 and MR2, layer by layer, by the image shift unit 245. Therefore, the right side moving image UR generated by superimposing the image signals SERd-f, SERd-m, and SERd-n one on another becomes the one shown in FIG. 12D. Further, the image signal SR and the image signal SRd are also added by the addition units 242, 243, and 244. Therefore, the addition signals SRA-F, SRA-m, and SRA-n are superimposed one on another, thereby to synthesize the image UE, so that the right side moving image UR becomes the one shown in FIG. 12E. Thus, it is possible to generate the right side moving image after an elapse of one frame period with respect to FIG. 12C. Further, at this time, the images are moved by their respective layer moving amounts, layer by layer, by the image shift unit 245. In addition, from the right end of the front moving image, images are extracted by their respective layer moving amounts, layer by layer. Accordingly, the images are superimposed from the front moving image by the amount of the image moved, so that each layer becomes a continuous image even if the image has been moved.

Figure 13A:
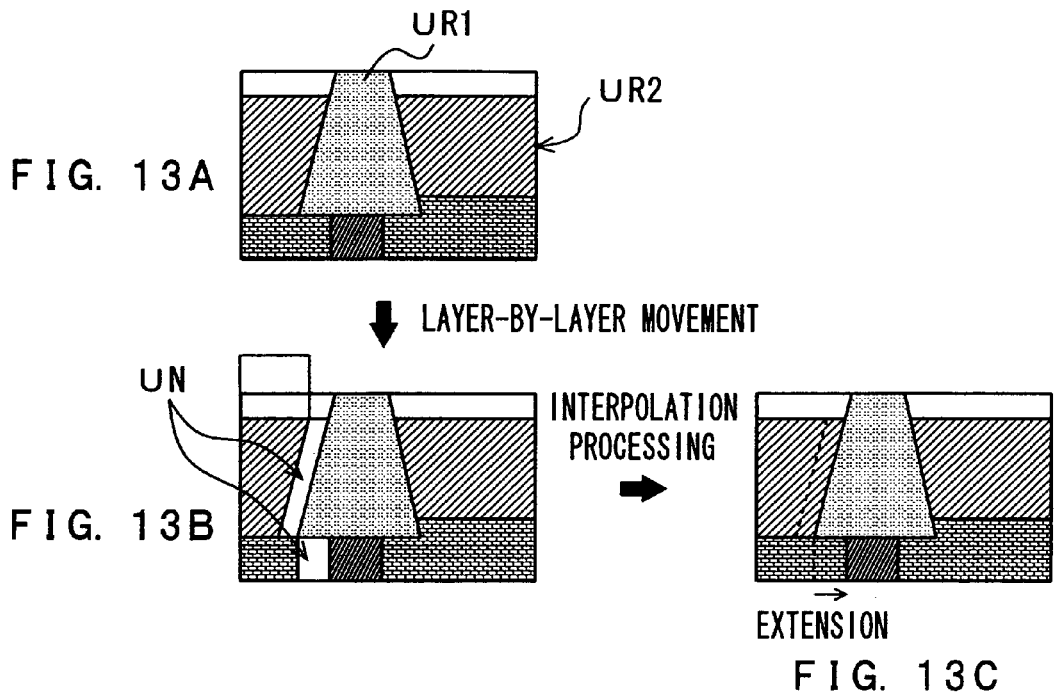

When the image synthesis is performed by sequentially superimposing the images from the image having a smaller moving amount based on the addition signals supplied from the addition units 242, 243, and 244, the interpolation unit 246 identifies whether a gap area without image has occurred, or not due to the difference in layer moving amount. It generates an image in the gap area by interpolation when the gap area has occurred. For example, when a still object such as a building has been photographed by a car-mounted camera, the moving amount of the distant-view layer is small and the moving amount of the close-view layer is large. For this reason, in a case where the distant-view image, the intermediate-view image, and the close-view image of the right side moving image have been moved by their respective layer moving amounts by the image shift unit 245, a gap area without image UN may be generated as shown in FIG. 13B, if the images are moved, layer by layer, for example, in the right side moving image shown in FIG. 13A when an intermediate-view layer image UR2 and a close-view layer image UR2 are adjacent to each other, and the layer moving amount of the close-view layer and the moving amount of the intermediate-view layer are different from each other. Incidentally, the gap area can be identified using a method in which the portion the images have been superimposed one on another is flagged as such, or the like.

Therefore, the interpolation unit 246 performs interpolation utilizing the peripheral pixels around the gap area, and develops images of the gap area, and superimposes them one on another. For example, as shown in FIG. 13C, images situated on the rear side of the gap area is extended to the side of the gap area, i.e., in the direction of movement of the layer, thereby interpolating the gap area. Thus, by performing the interpolation processing, it is possible to generate image signals of the right side moving image having no gap area for the right side moving image. Further, by extending the images situated on the rear side thereof in the direction of movement of the layers, and performing the interpolation, it is also possible to prevent the image with a large moving amount from becoming elongated in a tailing manner during movement. Whereas, it is also acceptable that the peripheral images are shifted to the side of the gap area. Further, it is also acceptable that the interpolation unit 246 performs the interpolation processing by forming a plurality of pixels by the weighted mean of distances using the peripheral image signals, i.e., by the weighted mean of pixels within the adjacent areas in contact with the gap area, and filling in the gap area.

The addition signal SRA-f after the interpolation processing by the interpolation unit 246 is supplied to an intermediate-view synthesis unit 247, as well as supplied to the delay unit 26 as an image signal SER-f. Similarly, the addition signal SRA-m of the intermediate-view layer is supplied to the intermediate-view synthesis unit 247 and the delay unit 26 as an image signal SER-m, as well as the addition signal SRA-n of the close-view layer is supplied to the close-view synthesis unit 248 and the delay unit 26 as an image signal SER-n.

The intermediate-view synthesis unit 247 generates an image signal SER-fm obtained by superimposing the intermediate-view layer image on the distant-view layer image using the image signal SER-f and the image signal SER-m, and supplies it to the close-view synthesis unit 248.

The close-view synthesis unit 248 further superimposes the close-view image on the image obtained by superimposing the intermediate-view image on the distant-view image using the image signal SER-fm and the image signal SER-n, thereby performing the image synthesis, and supplies the resulting image signal as an image signal SFR of the right side moving image to an image transformation unit 249.

Figure 14A:
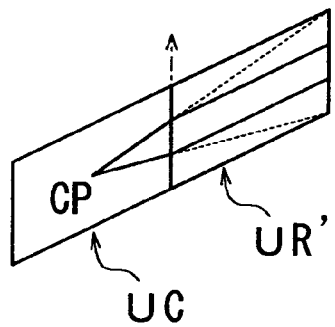
FIGS. 14A to 14E are diagrams each for illustrating an image transformation processing.
Figure 14B:
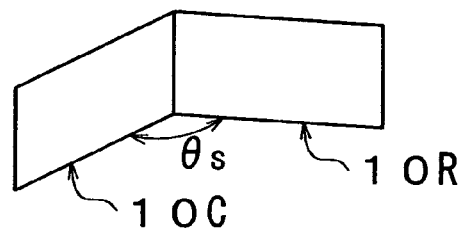

The image transformation unit 249 transforms the image signal SFR of the right side moving image supplied from the close-view synthesis unit 248 to the peripheral image signal SDR for image projection. Herein, the image based on the image signal SFR supplied from the close-view synthesis unit 248 is, as described above, the image obtained by moving the images of one frame prior in accordance with their respective layer moving amounts, as well as extracting images by the layer moving amounts from the front moving image UC, and superimposing the extracted images on the moved images. Therefore, it results in an image UR' indicated by a solid line of FIG. 14A, and it will not be an image looking as if it is coming out of the image reference position CP as indicated by a broken line. Further, as shown in FIG. 14B, the planes of projection of the screen 10R for projecting the right side moving image and the screen 10C for projecting the front moving image are not identical with each other in orientation. Therefore, the image transformation unit 249 performs the image transformation processing whereby the image UR' based on the image signal SFR becomes the right side moving image UR looking as if it is coming out of the image reference position CP.

Namely, the image transformation unit 249 scales up, as the image transformation processing, the image based on the image signal SFR in the vertical direction in proportion to a distance from an image reference position CPR corresponding to the right side moving image projected onto the screen 10R. Whereas, for the horizontal direction, the scaling up is performed so that the motion of the image is proportional to the distance from the image reference position CPR.

Figure 14C:
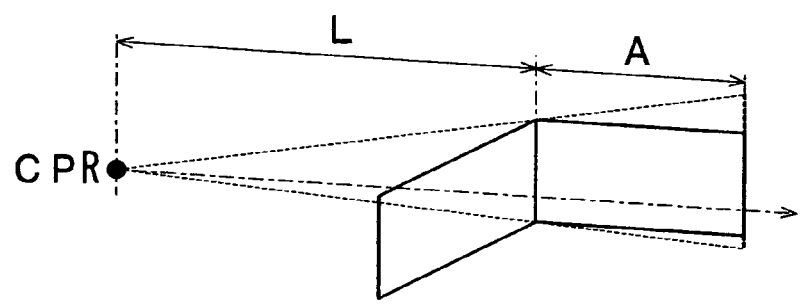
Figure 14D:
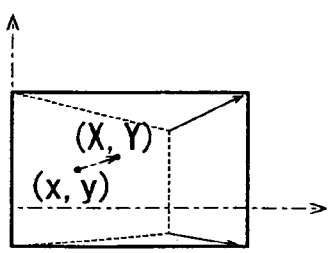

Herein, as shown in FIG. 14C, the length between the front end of the right side moving image and the image reference position CPR is set to be "L"; the length along the horizontal direction of the right side moving image, "A"; and further, the proportionality constant fÁ based on the angle fÆs formed between the plane of projection of the front moving image and the plane of projection of the right side moving image is set. Thus, as shown in FIG. 14D, it is possible to approximately show the relationship between the position (x, y) of the image based on the image signal SFR and the position (X, Y) after image transformation corresponding to this position as the following equations (5) and (6). It is noted that the lengths "L" and "A", and the proportionality constant fÁ are preset prior to formation of the side moving image.

$$y = \frac{L}{L+X}Y \quad (5)$$

$$x = \frac{\sqrt{(1+4X)/A - 1}}{2\gamma} \quad (6)$$

Figure 14E:
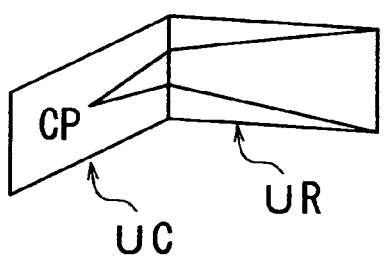

For this reason, if the signal of the position (x, y) on the image based on the image signal SFR calculated based on the equations (5) and (6) is extracted as the signal of the position (X, Y) after image transformation, it is possible to easily generate the peripheral image signal SDR subjected to image transformation. Further, it is also possible to generate the peripheral image signal SDL of the left side moving image in the same manner. Therefore, the projector 12R can project a higher-reality right side moving image as shown in FIG. 14E by projecting the right side moving image onto the screen 10R using the peripheral image signal SDR. Whereas, the projector 12L can project a higher-reality left side moving image by projecting the left side moving image onto the screen 10L using the peripheral image signal SDL. Further, if the projector 12C projects the front moving image onto the screen 10C based on the image signal SDC' which is the image signal obtained by delaying the image signal SDC by the time required for formation of the peripheral image signals SDL and SDR, it is possible to project the front moving image, and the good left and right side moving images in real time only by using the image signal SDC of the front moving image. The foregoing description was directed to the formation of the side moving images. However, it is also possible to display the moving images on the top side and on the bottom side in real time in the same manner. Incidentally, division into layers, setting of threshold values, size and position of the motion detection area, and the like in the foregoing first embodiment, and second and third embodiments described later are explanatory ones, but not exclusive ones. For example, it is also possible to use a block matching method, or the like for the way to determine the motion of the motion detection area. However, this technique is desirable according to the zoom ratio of an image in forward motion or an image in backward motion. Further, threshold value calculation in the division into layers may be accomplished by any techniques so long as the layer can be appropriately determined based on the moving information (moving amount, direction).

Further, it is also acceptable that the foregoing processing performed in the respective blocks are implemented not only by hardware but also by software. The configuration in this case is shown in FIG. 15.

Figure 15:
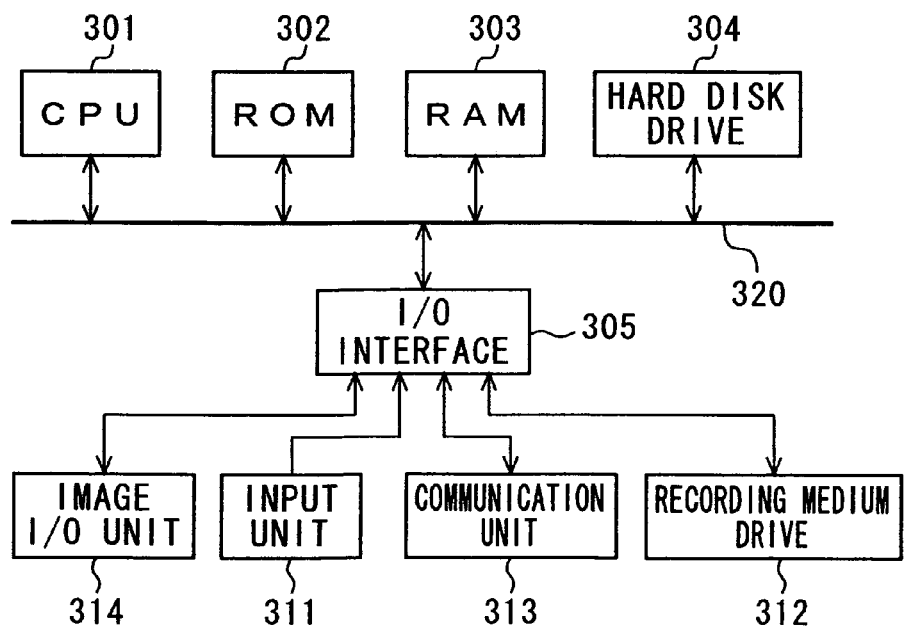
FIG. 15 is a chart showing a configuration using a computer.

A computer 30 includes a CPU (Central Processing Unit) 301 therein as shown in FIG. 15. To the CPU 301, a ROM 302, a RAM 303, a hard disk drive 304, and an I/O interface 305 are connected via a bus 320. Further, to the I/O interface 305, an input unit 311, a recording medium drive 312, a communication unit 313, and an image I/O unit 314 are connected.

If an instruction is inputted from an external device, or an instruction is inputted from the input unit 311 configured by using an operation input means such as a keyboard and a mouse, a voice input means such as a microphone, or the like, the instruction is supplied to the CPU 301 via the I/O interface 305.

The CPU 301 executes the program stored in the ROM 302, RAM 303, or the hard disk drive 304, and performs the processing in response to the supplied instruction. Further, in the ROM 302, the RAM 303, or the hard disk drive 304, the image processing program for causing the computer 30 to execute the same processing as the one performed with the foregoing image processing apparatus is previously stored, to form the side moving images which are the peripheral images.

Figure 16:
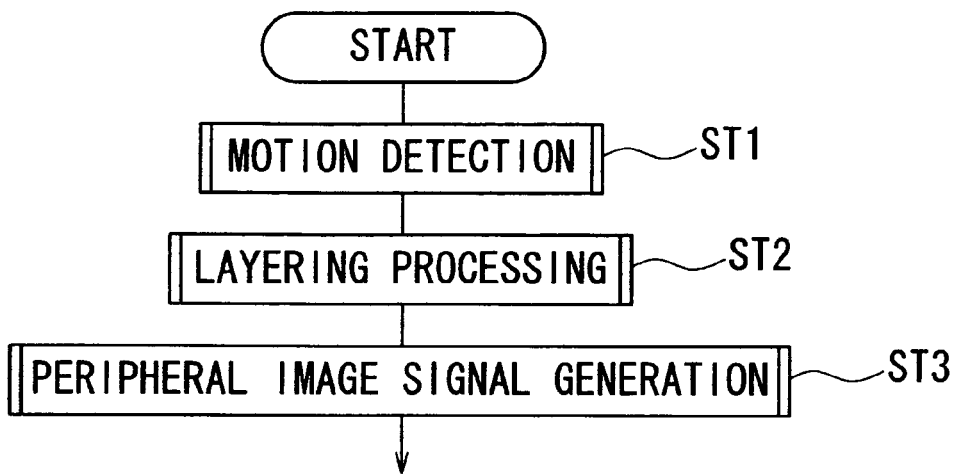
FIG. 16 is a flowchart showing an overall configuration of an image processing program in the first embodiment.

FIG. 16 is a flowchart showing an overall configuration of the image processing program in the first embodiment. In the chart, in a step ST1, a motion detection processing is performed, thereby detecting the moving amount of each image. Then, in a step ST2, the layer information indicating which one of the layers includes the image is generated by a layering processing, and the moving amount of each layer is also calculated. In a step ST3, a peripheral image generation processing is performed so that the peripheral images can be synthesized based on the layer information and the moving amount of each layer.

Figure 17:
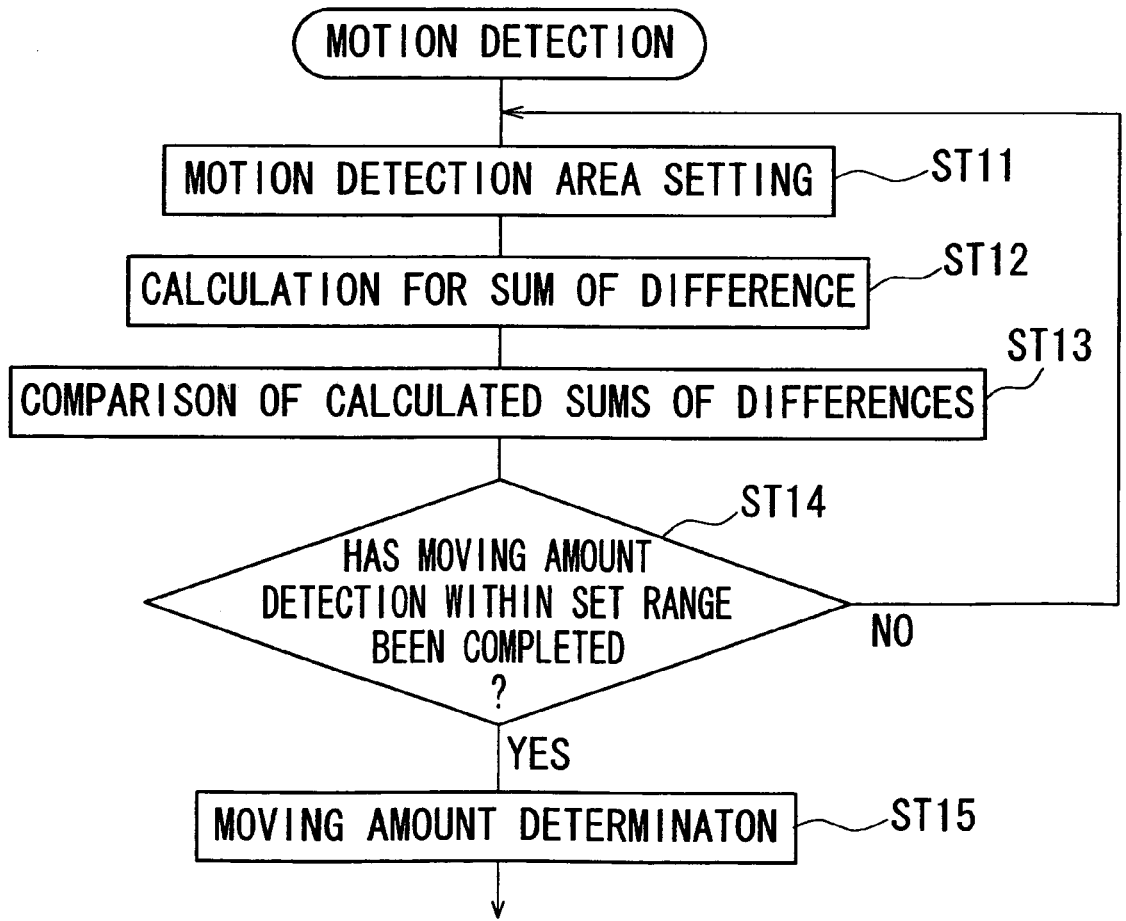
FIG. 17 is a flowchart showing motion detection in the first embodiment.

FIG. 17 is a flowchart showing the moving amount detection processing in the step ST1 of FIG. 16. In a step ST11, the motion detection areas are set on the front moving image, and then the process proceeds to a step ST12. In the step ST12, the image in each of the motion detection areas is scaled down and the sum of differences thereof is calculated, and then the process proceeds to a step ST13. In the step ST13, the already calculated sums of differences are compared with each other and the moving amount is detected so that the sum of differences becomes smaller, and then the process proceeds to a step ST14. In the step ST14, it is identified whether the processing of each of the steps ST12 and ST13 has been completed with an image size within the preset range, or not. If they have not been completed, the process returns to the step ST11. Whereas, if completed, then the process proceeds to a step ST15. In the step ST15, the moving amount such that the sum of differences becomes the smallest is set as the moving amount of the motion detection area.

Figure 18:
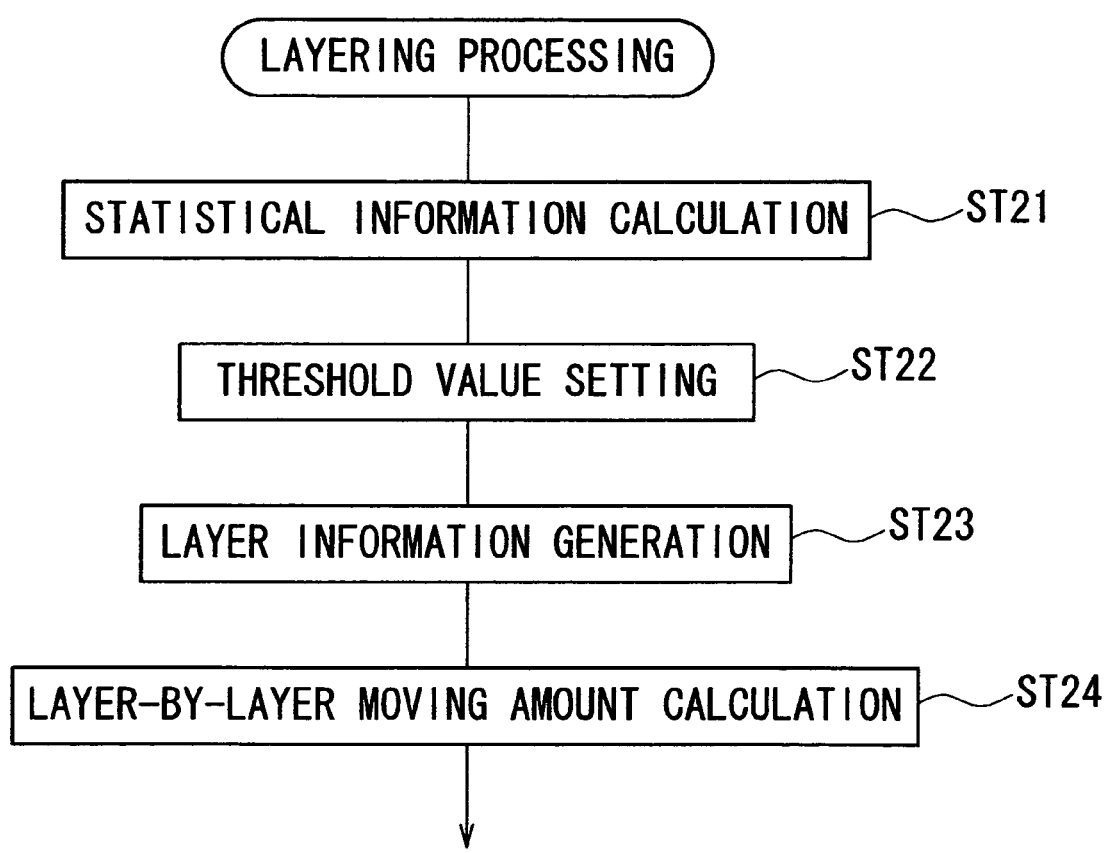
FIG. 18 is a flowchart showing a layering processing in the first embodiment.

FIG. 18 is a flowchart showing the layering processing in the step ST2 of FIG. 16. In a step ST21, the statistical information, for example, the average value is calculated using the moving amounts detected by the moving amount detection processing in the step ST1, and then the process proceeds to a step ST22. In the step ST22, threshold values for classifying the image into layers of, for example, a distant-view, an intermediate-view, and a close-view based on the statistical information are set. In a step ST23, the set threshold values and the moving amount are compared with each other, thereby generating the layer information indicating which one of the layers includes the motion detection area. In a step ST24, the moving amount of each layer is calculated based on the moving amount of the motion detection area included in the layer.

Figure 19:
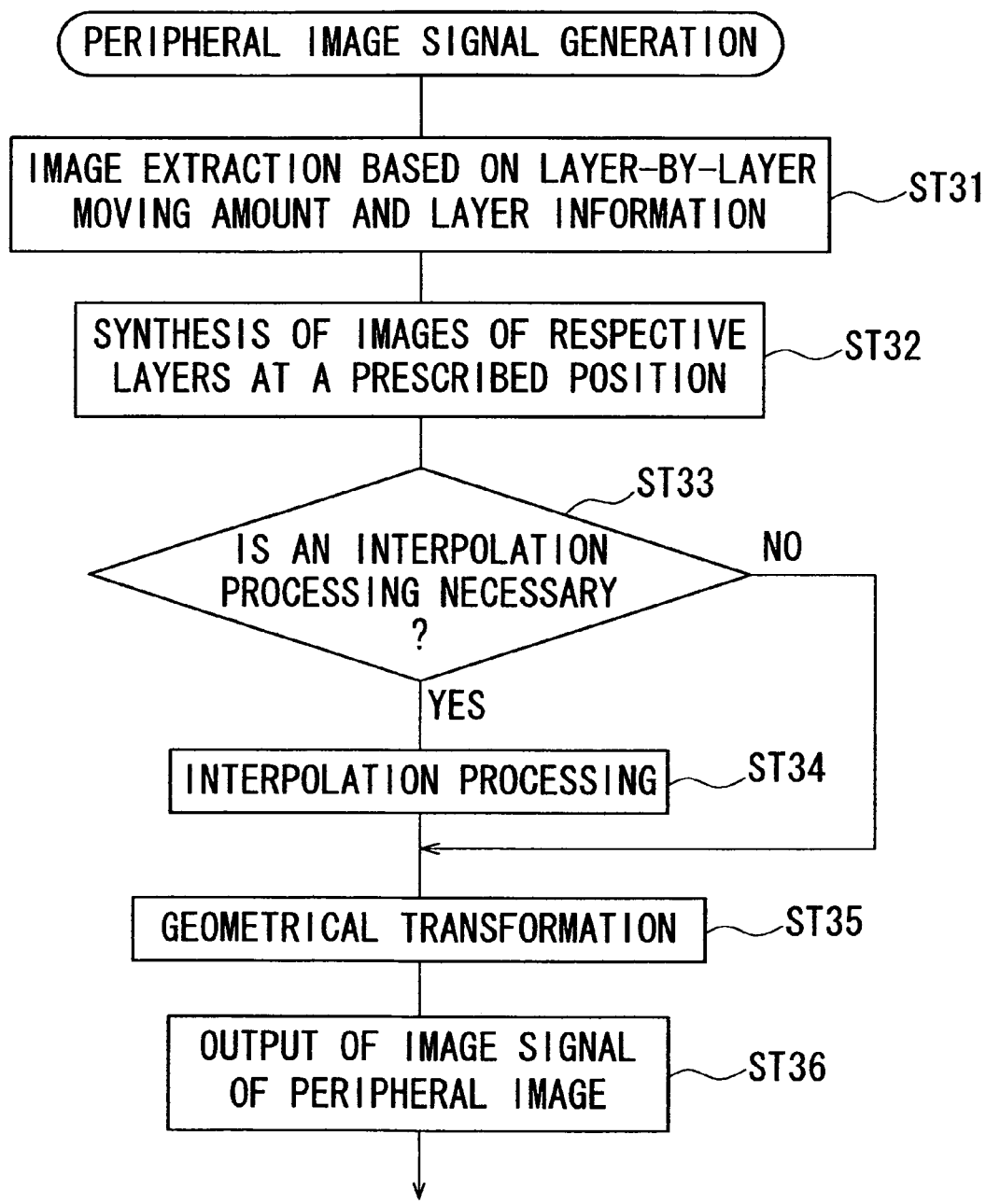
FIG. 19 is a flowchart showing peripheral image signal generation in the first embodiment.

FIG. 19 is a flowchart showing the peripheral image generation processing in the step ST3 of FIG. 16. In a step ST31, images are extracted layer by layer from the front moving image based on the moving amounts of their respective layers and the layer information generated by the layering processing. In a step ST32, the syntheses of the extracted images of the respective layers are formed at a prescribed position. In a step ST33, it is identified whether the interpolation processing for making up the image in a portion without image is necessary or not if the portion has occurred upon synthesizing the images. Herein, when the portion without image occurs, the process proceeds to a step ST34. Whereas, when no portion without image occurs, the process proceeds to a step ST35. In the step ST34, the interpolation processing is carried out, and then, the process proceeds to the step ST35. For example, the peripheral images around the portion without image are extended for interpolation. In the step ST35, a geometrical transformation processing is carried out in accordance with the orientation of each screen onto which the synthesized image is to be projected. Then, the image signals of the image subjected to the geometrical transformation are outputted as the image signals of the peripheral images in a step ST36.

It is also acceptable that such an image processing program is stored on a removable recording medium utilizing magnetism or light, or a removable information recording transmission medium configured by using semiconductor elements, or the like, for example, a floppy disk, an optical disk such as a CD-ROM, a magneto-optical disk such as an MO disk, a tape cartridge, a semiconductor memory, or the like. In this case, it is also acceptable that the removable information recording transmission medium is mounted in the recording medium drive 312 to read the image processing program, and that the read program is stored in the ROM 302, the hard disk drive 304, or the like via the I/O interface 305 and a bus 320, thereby to be installed.

Further, the information recording transmission medium includes a line or radio transmission path for transmitting the image processing program, for example, a network such as a LAN or the internet, a satellite broadcast wave, a ground broadcast wave, or the like. In this case, the information recording transmission medium is connected to the communication unit 313. Thus, the image processing program transmitted via the information recording transmission medium is stored in the ROM 302, the hard disk drive 304, or the like via the communication unit 313, the I/O interface 305, and the bus 320, so that the image processing program is installed.

Herein, when the image signal of the front moving image is inputted to the image I/O unit 314 during execution of the image processing program, the foregoing processing at the image processing block is carried out to allow image signals of side moving images to be generated on the basis of the image signal of the front moving image. By outputting the generated image signals of the side moving images from the image I/O unit 314, and supplying them to the projectors 12L and 12R, it is possible to perform the image display shown in FIG. 2.

Thus, in accordance with the foregoing embodiment, only by inputting the image signal SDC having the motion satisfying at least one boundary condition obtained by photographing with one car-mounted camera, or the like, it becomes possible to present the peripheral images not existing in the moving image based on the image signal SDC in real time. Accordingly, it becomes possible to present a high-reality multi-directional image.

Further, the image of the originally nonexistent portion is developed based on the input image. Therefore, a large number of cameras or special cameras are not required to be used for obtaining the image of the nonexistent portion, resulting in a low cost. In addition, it is possible to obtain an image with a sense of greater depth over a wide display range.

Further, since the image is developed using a real picture image, it becomes possible to present a more real image. This is not implemented by restructuring a three-dimensional space as in the case of developing a virtual space by a computer graphics. Therefore, it is possible to obtain images on different planes of projection from that of the input image by a very simple processing.

Whereas, also for an enormous amount of existing image sources, if they are the images having the motions satisfying at least one boundary condition, it is possible to present the images of the opposite sides and the upper and lower sides simultaneously with the input image, by performing the above processing. Therefore, it is possible to express a higher-reality wider-range picture.

Incidentally, for the image processing apparatus 15A, by imposing the boundary condition that the direction of movement of the front moving image is the radial direction from one point thereon, it has been configured such that the front moving image, the left side moving image, and the right side moving image are displayed in real time based on the input image signal SDC. However, assuming that the stored and freely readable image signal SDC is used, it is possible to display the front moving image, the left side moving image, and the right side moving image based on the image signal SDC without imposing the foregoing boundary condition thereon.

An image processing apparatus 15B for performing such a processing supplies, for example, the stored image signal SDC of the front moving image photographed by a car-mounted camera to the projector 12C, and displays the front moving image based on the image signal SDC onto the screen 10C situated on the front shown in FIG. 2. Further, the image processing apparatus 15B generates and stores intermediate image information for generating image signals indicative of peripheral images for the angle of view not included within the visual field range of the car-mounted camera, for example, the peripheral image signals SDL and SDR, which are the image signals indicative of the left and right side moving images continuous with the front moving image, based on the stored image signal SDC of the front moving image. When the front moving image is displayed on the screen 10C, the peripheral image signals SDL and SDR of the side moving images continuous with the front moving image are generated using the stored intermediate image information. Then, the peripheral image signal SDL is supplied to the projector 12L, and the peripheral image signal SDR is supplied to the projector 12R. Therefore, the left side moving image having a continuity with the front moving image is displayed on the screen 10L situated on the left side, and the right side moving image having a continuity with the front moving image is displayed on the screen 10R situated on the right side. As a result, it is possible to present a wide view angle image. Incidentally, the image signal SDC and the intermediate image information may also be stored with the image processing apparatus 15B. Alternatively, they may also be stored in an external storage means.

Figure 20:
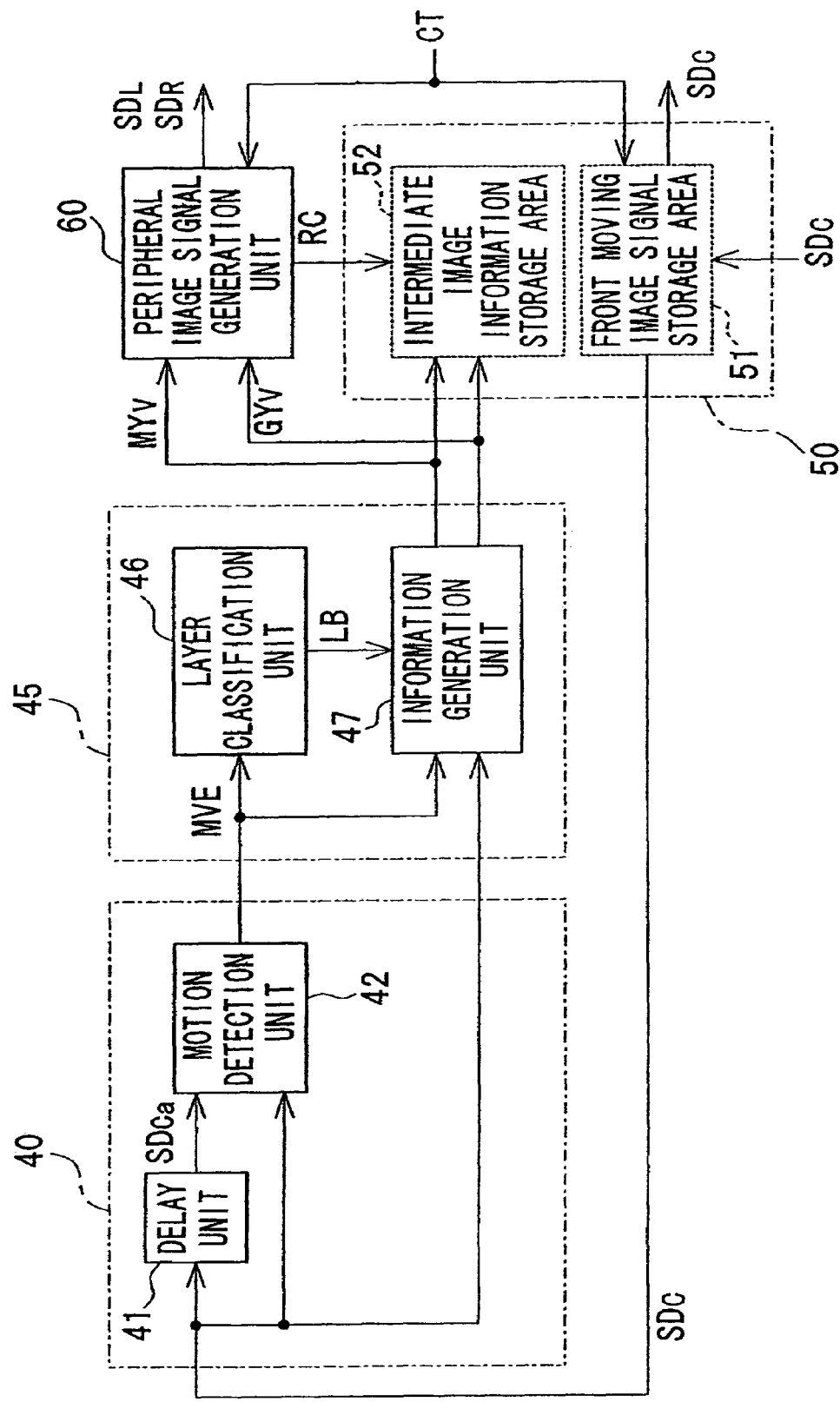
FIG. 20 is a chart showing an image processing apparatus according to a second embodiment of this invention.

Then, as a second embodiment of this invention, a description will be given to the case where the image signal SDC and the intermediate image information are stored with the image processing apparatus 15B. FIG. 20 shows a schematic configuration of the image processing apparatus 15B. The image processing apparatus 15B is capable of displaying the front moving image, the left side moving image, and the right side moving image using the stored image signal SDC. The image signal SDC is stored in a front moving image signal storage area 51 of a storage unit 50, and is supplied to a delay unit 41 and a motion detection unit 42 of a motion detection block 40, and an information generation unit 47 of a layering processing unit 45.

Figure 21:
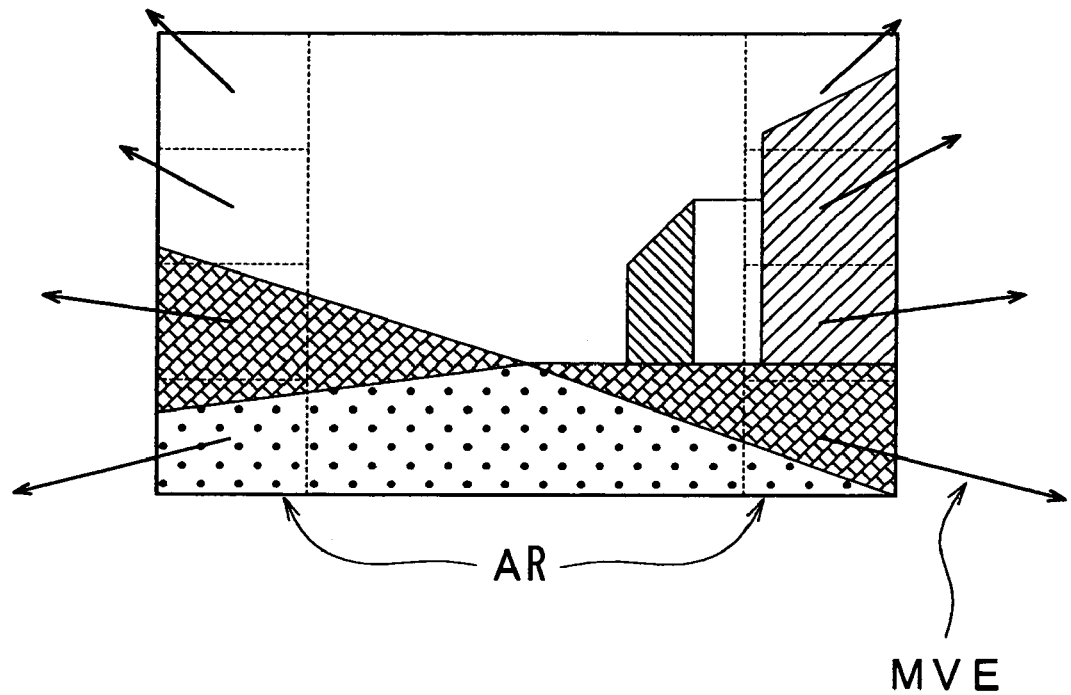
FIG. 21 is a diagram showing the moving vector of each motion detection area.

The delay unit 41 delays the image signal SDC by one frame, and supplies the delayed signal as an image signal SDCa to the motion detection unit 42. The motion detection unit 42 sets a plurality of motion detection areas divided as indicated by dot lines of FIG. 21 closer to the side ends of the front moving image. Thus, it performs the comparison between the image signal SDC of the objective frame and the image signal SDCa of one frame prior of the motion detection area for every motion detection area. Then, it identifies the moving vector MVE indicative of the motion of the image for every motion detection area and supplies it to a layer classification unit 46 of the layering processing block 45.

The layer classification unit 46 identifies the moving pattern of the front moving image based on the moving vector MVE of each motion detection area, and performs layer setting for generating the intermediate image information. For example, the layer classification unit 46 identifies how to provide the layer of the distant-view image obtained by photographing a distant object, the layer of the close-view image obtained by photographing a near object, the layer of the intermediate-view image situated between the distant-view image and the close-view image, and a different layer from these layers, and performs layer setting. Herein, the front moving image when the front moving image has been photographed by a car-mounted camera becomes the image obtained by sequentially zooming in the front moving image when the car moves straight ahead in one direction. Whereas, it becomes the image obtained by sequentially zooming out the front moving image when the car moves backward. Further, when a passing vehicle has been photographed, the passing vehicle is displayed as a zoomed-out image on the zoomed-in image. Further, when the car makes a right turn or a left turn, for example, the top side of the front moving image is moved in the horizontal direction, and a zoomed-in image appears on the bottom side. Therefore, the layer classification unit 46 identifies the moving pattern of the front moving image based on the moving vector MVE of each motion detection area, and performs layer setting based on the identified moving pattern. For example, when the moving pattern is identified as the moving pattern of straight-ahead motion, the layers of respective images of the distant-view, intermediate-view, and close-view are formed. Whereas, when the moving pattern is identified as that of right or left turn, not only the layers of respective images of the distant-view, intermediate-view, and close-view but also the layer including the image to be moved in the horizontal direction are also formed. Further, for the moving pattern in which a passing vehicle is observed, layer setting is performed so that not only the layers of respective images of the distant-view, intermediate-view, and close-view but also the layer including the zoomed-out image are also formed.

Further, the layer classification unit 46 performs layer classification for determining which one of the layers includes any motion detection area set closer to the side end of the front moving image based on the moving vector MVE supplied from the motion detection unit 42. The layer classification is performed using the layers set according to the moving pattern. For example, the layer classification unit 46 performs layer division into three layers of the distant-view, the intermediate-view, and the close-view. In addition, when the layer including the image to be moved in the horizontal direction and the layer including the zoomed-out image are formed, the layer classification is performed including these layers. In accordance with the layer classification, the layer classification unit 46 generates layer classification information LB indicating which one of the layers includes any motion detection areas, and supplies the generated layer classification information LB to an information generation unit 47.

The information generation unit 47 performs layer division on each motion detection area set on the front moving image based on the layer classification information LB received from the layer classification unit 46. By using the image signals of the motion detection area, layer by layer, in the order of the frame sequence, the intermediate signal of every layer is generated. Further, the average value of the moving amounts is calculated for each layer based on the moving amount of the moving vector MVE of the motion detection area subjected to layer division. The intermediate image signal GYv and the calculated moving amount (average value) MYv of each layer, which are generated at the information generation unit 47, are stored in an intermediate image information storage area 52 of the storage unit 50 as intermediate image information.

When an image is displayed on the screens 10C, 10R, and 10L, the projector 12C displays the image based on the stored image signal SDC on the screen 10C. Whereas, the image processing apparatus 15B reads the intermediate image information stored in the intermediate image information storage area 52 by a read control signal RC from a peripheral image signal generation block 60 connected to the storage unit 50. Then, it sequentially uses the intermediate image signal GYv of each layer by the amount corresponding to the moving amount MYv of each layer, and superimposes the images of respective layers in the order of the distant-view, intermediate-view, and close-view, thereby performing image synthesis. Further, when there are provided other layers not belonging to the three layers of the distant-view, intermediate-view, and close-view, the image synthesis processing of these layers, and the like are also performed to generate the peripheral image signals SDL and SDR. Further, the image processing apparatus 15B supplies the peripheral image signal SDL at a timing in accordance with the image signal SDC of the front moving image to the projector 12L, and supplies the peripheral image signal SDR at a timing in accordance with the image signal SDC of the front moving image to the projector 12R. The projector 12L displays the left side moving image continuous with the front moving image on the screen 10L. Whereas, the projector 13R displays the right side moving image continuous with the front moving image on the screen 10R.

Then, each element constituting the motion detection block 40 will be described in detail. Incidentally, for simplification of description, in the following explanation, a description will be given to only the right side, and a description on the left side is omitted.

The motion detection block 40 identifies the moving vector MVE for every motion detection area as described above. Herein, when the moving center of the image is present in the front moving image, i.e., when the front moving image is obtained by photographing the front by a car-mounted camera, the image at a time T shown in FIG. 5A becomes, for example, the one shown in FIG. 5B at a time T' after an elapse of one frame time, which becomes generally equal to the zoom-in operation image around the image reference position CP as a center.

Herein, as shown in FIG. 5C, the scaling factor Z is set so that the motion detection area of the objective frame is scaled down to 1/Z, and the sum of differences between them and the image signal of one frame prior is calculated with a position of the scaled-down motion detection area moving. Further, by changing the scaling factor Z, the sum of differences is also calculated with the position in the same manner moving. By detecting the position such that the sum of differences becomes the minimum value in this manner, it is possible to identify the moving vector MVE of each motion detection area for every objective frame. Further, the scaling factor Z when the sum of differences becomes the minimum value is set to be the moving amount.

Incidentally, when a scale-down processing is performed, there occur any pixels having no coordinate value of an integer within the area. On the other hand, in the image of one frame prior, which has not undergone the scale-down processing, the coordinate value of each pixel in the area is an integer value. Therefore, linear interpolation is performed on the scaled-down image to calculate the signal level of the position such that the coordinate value becomes an integer value. For example, as shown in FIG. 6 described above, when the image of Ka□~Ka pixels is subjected to a scale-down processing to (1/Z), so that the size of the image becomes the size of Kb□~Kb pixels, linear interpolation is carried out to calculate the signal level of the image in which the number of pixels has been set to be "Kb□~Kb" using the signal level of Ka□~Ka pixels. By calculating the sum of differences between the calculated signal level of a position in the image and the signal level of one frame prior of the position corresponding thereto in the scaled-down image, it is possible to determine the moving amount with high precision.

Figure 22:
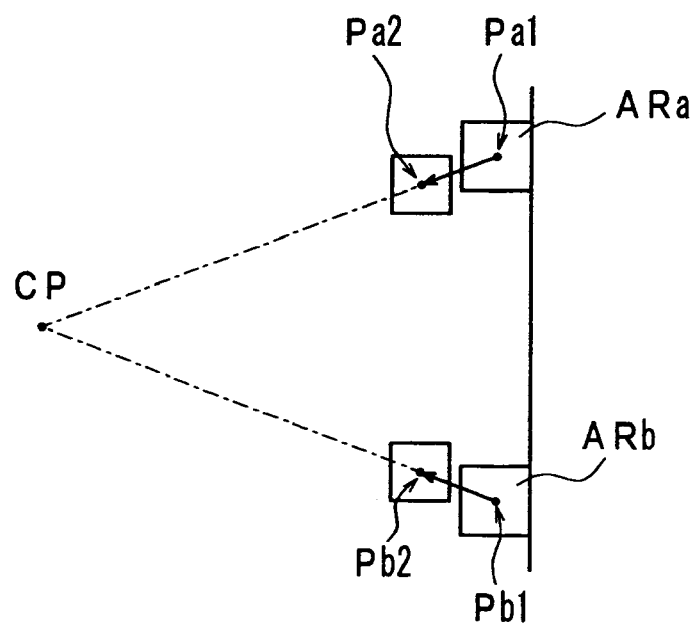
FIG. 22 is a diagram showing a method for identifying an image reference position.

When the image reference position CP is not apparent, as shown in FIG. 22, in the case where the sum of differences becomes the minimum value when the center of the motion detection area ARa has been moved from the position Pa1 to the position Pa2, and the sum of differences becomes the minimum value when the center of the motion detection area ARb has been moved from the position Pb1 to the position Pb2, it is possible to detect the image reference position CP by detecting the point of intersection between the vector direction of the moving vector MVE of the motion detection area ARa and the vector direction of the moving vector of the motion detection area ARb.

Whereas, for a right turn or a left turn, for example, the top side image of the front moving image moves horizontally. Therefore, when the minimum value in the sum of differences is not detected even if the zoom-in operation is performed with the image reference position CP as a center, the image of the motion detection area is moved laterally to identify the minimum value in the sum of differences. Further, at this time, the amount of movement of the motion detection area until the sum of differences becomes the minimum value can be set as the moving amount of the moving vector MVE.

Then, for a backward motion, the image looks as if it disappears into the image reference position CP. Accordingly, the image during backward motion becomes generally equal to the zoom-out operation image with the image reference position CP as a center. Therefore, the scaling factor "Z" is set to be not more than "1". Namely, during the backward motion, the image moves in a reversed manner to that during the forward motion. Therefore, a plurality of motion detection areas is set closer to the side ends of the image of the preceding frame. Then, the respective motion detection areas are scaled down to (1/Z) and the sum of differences between them and the image of the objective frame is calculated with the position in each scaled-down area moving. Alternatively, respective motion detection areas of the objective frame are scaled down to (1/Z) and the sum of differences between them and the image of one frame later is calculated with the position in each scaled-down area moving. Further, by changing the scaling factor Z, the sum of differences is calculated with the position moving in the same manner. By detecting the position such that the sum of differences becomes the minimum value in this manner, it is also possible to identify the moving vector MVE during the backward motion.

Upon identification of the moving vector MVE in the foregoing manner, the distant-view image is reduced in moving amount of the moving vector MVE because it moves less, and the close-view image is increased in moving amount of the moving vector MVE because it moves much.

Figure 23:
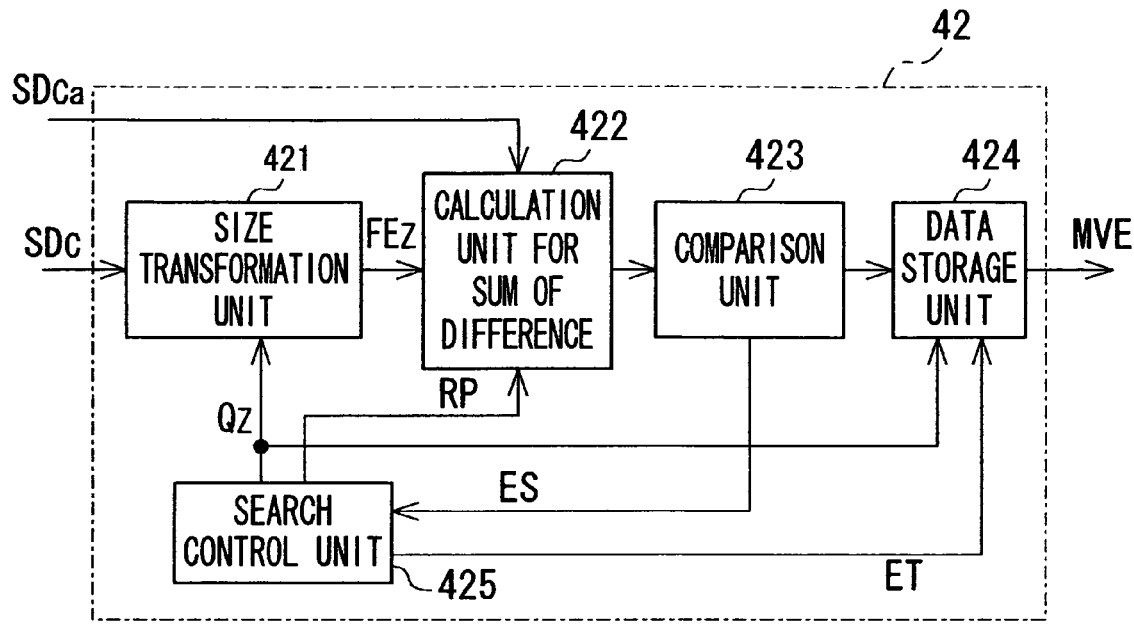
FIG. 23 is a chart showing a configuration of a motion detection unit.

FIG. 23 shows a configuration of the motion detection unit 42. The image signal SDC is supplied to a size transformation unit 421, and the image signal SDCa supplied from the delay unit 41 is supplied to a calculation unit for sum of differences 422. The size transformation unit 421 divides the side end portion of the front moving image into a plurality of motion detection areas, for example, a plurality of motion detection areas in units of 16□~16-pixel size to set the motion detection areas. Further, the size transformation unit 421 generates an image signal FEz obtained by scaling down the image of each motion detection area by (1/Z) times using the scaling factor Z supplied from a search control unit 425 described later. In addition, it sets a coordinate value Qz transformed by scaling down the image of the motion detection area by (1/Z) times based on the image reference position CP. Then, it supplies the image signal FEz and the coordinate value Qz to the calculation unit for sum of differences 422. Incidentally, the image signal FEz is the signal when the coordinate value has been transformed to an integer value by the interpolation processing as shown in FIG. 6 described above. The coordinate value Qz is the coordinate value when the coordinate value has been transformed to an integer value by interpolation processing, i.e., the pixel position of "Kb□~Kb" in FIG. 6.

The calculation unit for sum of differences 422 selects the signal of the position indicated by the coordinate value Qz received from the size transformation unit 421 from the image signal SDCa. In addition, it calculates the sum of differences between the selected signal and the image signal FEz, and notifies the calculation result to a comparison unit 423.

The comparison unit 423 compares the minimum value in the sum of differences with the sum of differences calculated at the calculation unit for sum of differences 422. Herein, when the minimum value in the sum of differences is not set, the comparison unit 423 sets the sum of differences calculated first as the minimum value in the sum of differences. When the calculated sum of differences is smaller than the minimum value in the sum of differences, the comparison unit 423 sets this sum of differences as another minimum value in the sum of differences. In addition, it notifies a data storage unit 424 that the minimum value in the sum of differences has been updated. Further, the comparison unit 423 notifies the search control unit 425 by a signal ES that the comparison between the minimum value in the sum of differences and the sum of differences calculated at the calculation unit for sum of differences 422 has been completed. Incidentally, it is also acceptable that the minimum value in the sum of differences is preset to be a larger value than the sum of differences to be calculated.

When the data storage unit 424 is notified from the comparison unit 423 that the minimum value in the sum of differences has been updated, it stores the scaling factor Z notified from the search control unit 425. Further, when the data storage unit 424 has already stored a scaling factor, it updates the stored scaling factor to the notified scaling factor Z. Further, when the data storage unit 424 is notified by the signal ER from the search control unit 425 of the completion of the change processing of the scaling factor, it supplies to the layer classification unit 46 a moving vector MVE in which the stored scaling factor is set as the moving amount, and the direction toward the image reference position is set as the vector direction.

The search control unit 425 sets the lower limit value of the scaling factor as "1", and also presets the upper limit value. It first notifies the lower limit value as the scaling factor Z to the size transformation unit 421 and the data storage unit 424. Thereafter, every time it is notified from the comparison unit 423 that the comparison between the minimum value in the sum of differences and the sum of differences calculated at the calculation unit for sum of differences 422 has been completed, the scaling factor Z is sequentially increased and the scaling factor Z thus increased is notified to the size transformation unit 421 and the data storage unit 204. Subsequently, when the scaling factor Z has reached the upper limit value, the search control unit 425 notifies the data storage unit 424 of the completion of change processing of the scaling factor.

Further, when the minimum value in the sum of differences obtained at the comparison unit 423 is not small, namely, when it is not possible to detect the image equal to the side end portion of the front moving image, the search control unit 425 notifies the scaling factor as "1" to the size transformation unit 421, which is then caused to supply the image signal FEz of the motion detection area to the calculation unit for sum of differences 422. Further, the search control unit 425 supplies the control signal RP to the calculation unit for sum of differences 422, which is then allowed to select the signal of the position obtained by moving the motion detection area of the image signal FEz by a predetermined amount in the horizontal direction out of the image signal SDCa. Thereafter, the minimum value in the sum of differences is identified by moving the position to be selected from the image signal SDCa in the horizontal direction by the control signal RP. In consequence, it is also possible to determine the moving vector MVE of the image to be moved in the horizontal direction. Further, although not shown, by supplying the signal of one frame later to the calculation unit for sum of differences 422, and setting the motion detection areas in the image of one frame prior, and supplying the signal of the image of the objective frame to the calculation unit for sum of differences 422, it is also possible to identify the moving amount of the image looking as if it disappears into the image reference position CP.

Thus, by moving the search direction toward the direction of the image reference position CP and the horizontal direction, and thereby detecting the image position of another frame such that the sum of differences with the image of the motion detection area becomes minimum, it is possible to properly determine the moving vector MVE even if the image of the motion detection area is the image upon a right turn or a left turn, the image of a car or a person crossing the front, or the like, or the image of a passing vehicle.

The layer classification unit 46 identifies what moving pattern of image the front moving image is based on the moving vector MVE of each motion detection area, and sets the layer based on the identified moving pattern. Thus, it supplies to the information generation unit 47 the layer classification information LB indicating which one of the layers includes any one of the areas.

Figure 24:
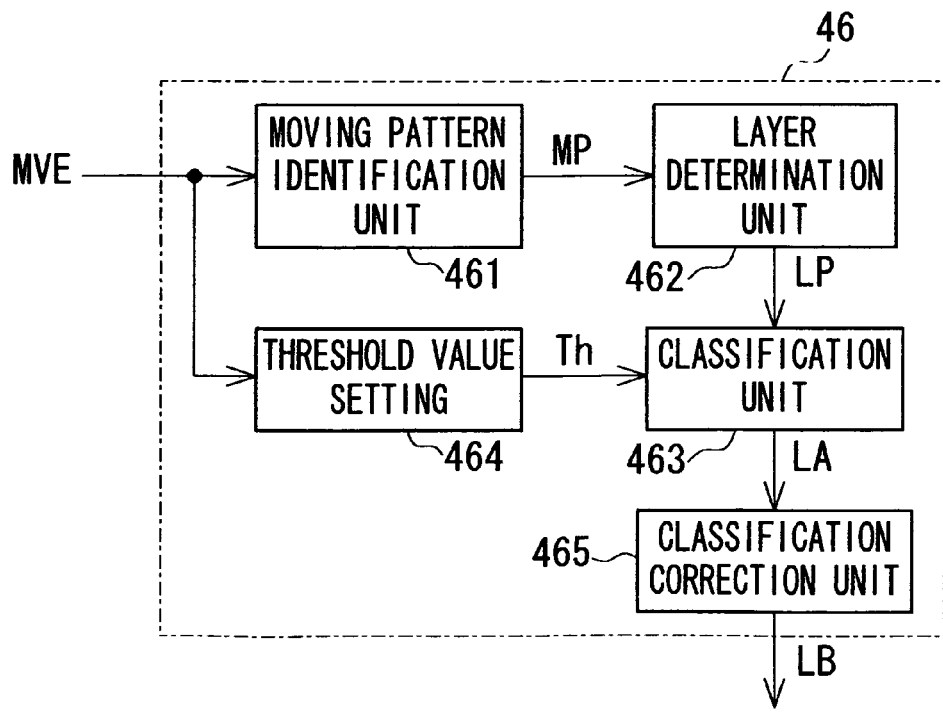
FIG. 24 is a chart showing a configuration of a layer classification unit.

FIG. 24 shows a configuration of the layer classification unit 46. A moving pattern identification unit 461 of the layer classification unit 46 stores the moving vectors MVE of the respective motion detection areas supplied from the motion detection unit 42 on a frame-by-frame basis, and identifies the moving pattern based on the stored moving vectors MVE.

Figure 25A:
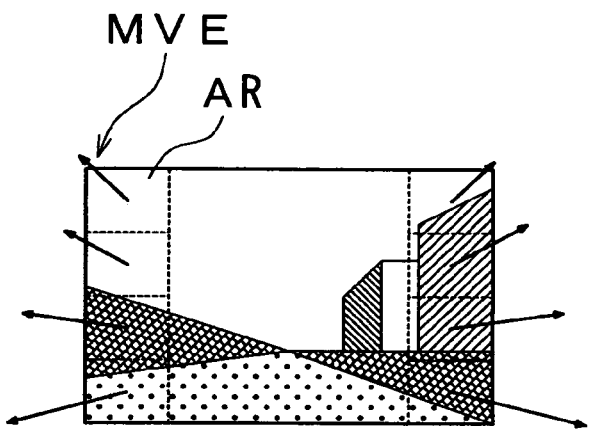
FIGS. 25A to 25E are diagrams each for illustrating the relationship between the vector direction and the moving pattern.

Herein, when the vector directions of moving vectors MVE of the respective motion detection areas are along the radial directions from the image reference position CP, the moving pattern identification unit 461 identifies whether the vector directions are along the zoom-in operation directions in which all the images come out from the image reference position CP, or not. For the zoom-in operation directions in which all the images come out from the image reference position CP, it identifies the moving pattern as straightforward motion. For example, when the vector directions of moving vectors MVE are along the radial directions from the image reference position CP as indicated by arrows of FIG. 25A, the moving pattern is identified as a straight forward motion.

Then, when the moving pattern identification unit 461 does not identify the moving pattern as a straight forward motion, the vector directions of moving vectors MVE of the respective motion detection areas are the opposite directions to the radial directions, so that the unit 461 identifies whether the vector directions are along the zoom-out operation directions in which all the images disappear into the image reference position CP, or not. Herein, for the zoom-out operation directions in which all the images disappear into the image reference position CP, it identifies the moving pattern as a backward motion. For example, when the vector directions have been found to be along the directions toward the image reference position CP as indicated by arrows of FIG. 25B, and detected to be along the zoom-out operation directions in which all the images disappear into the image reference position CP, the unit 461 identifies the moving pattern as a backward motion.

Figure 25D:
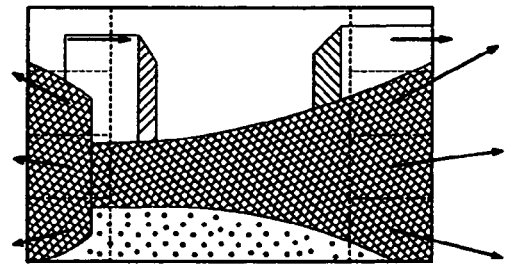
Figure 25B:
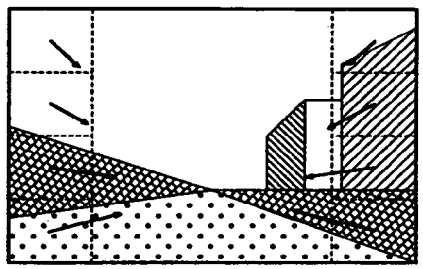
Figure 25E:
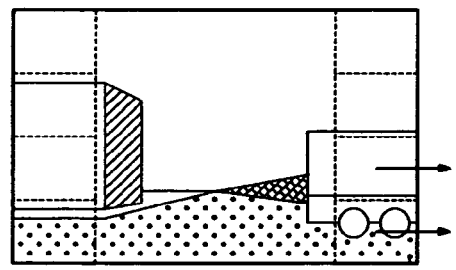
Figure 25C:
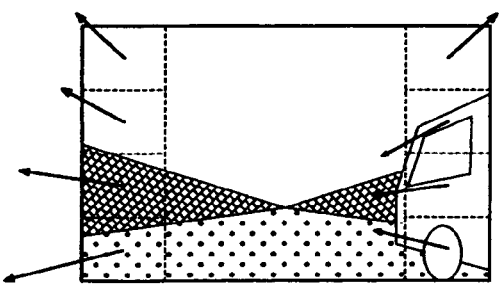

Whereas, when the moving pattern identification unit 461 does not identify the straight forward motion and backward motion, it identifies whether only a part of the vector directions is along the zoom-out operation direction or not. When only a part thereof is along the zoom-out operation directions, the presence of a passing vehicle is identified. For example, when the moving pattern identification unit 461 has detected that the motions of the motion detection areas on the left and right opposite side edges are along the zoom-in operation directions as shown in FIG. 25C, and that only a part thereof is along the zoom-out operation directions, it identifies the presence of a passing vehicle. Further, in the case where it does not identify any presence of straight forward motion, backward motion, and a passing vehicle, when the vector directions of the moving vectors MVE are observed to be along the horizontal direction as shown in FIG. 25D in the motion detection areas on the top side of the front moving image, the moving pattern is identified as a right turn or a left turn according to the vector directions. Whereas, when the vector directions of the moving vectors MVE are along the horizontal direction as shown in FIG. 25E in a part of the motion detection areas, the moving pattern is identified as a crossing motion. The moving patter MP thus identified is notified to a layer determination unit 462. Incidentally, as the moving patterns, not only the foregoing patterns, but also patterns in which the motion is stopped, a right turn or a left turn is made while moving backward, and the like are also conceivable.

The layer determination unit 462 identifies whether the identified moving pattern has occurred sequentially for not less than a prescribed number of frames or not based on the moving pattern MP identified at the moving pattern identification unit 461. Herein, the layer determination unit 462 generates the layer pattern information LP according to the identified moving pattern when the moving pattern has occurred sequentially for not less than a prescribed number of frames, and notifies it to a classification unit 463.

Herein, when the layer determination unit 462 has identified the moving pattern that the overall image is enlarging like the forward motion sequentially for not less than a prescribed number of frames, it generates the layer pattern information LP instructing the formation of, for example, the distant-view, intermediate-view, and close-view layers, and notifies it to the classification unit 463. Whereas, when the layer determination unit 462 has identified the moving pattern in which the top moves in the horizontal direction like a right turn or a left turn motion sequentially for not less than a prescribed number of frames, it generates the layer pattern information LP instructing the formation of not only the distant-view, intermediate-view, and close-view layers, but also the layer including a horizontally moving image, and notifies it to the classification unit 463. Whereas, when it has identified the moving pattern in which an image shrinking with time is included like a passing vehicle or during a backward motion sequentially for not less than a prescribed number of frames, it generates the layer pattern information LP instructing the formation of not only the distant-view, intermediate-view, and close-view layers, but also the backward motion layer including a shrinking image. Whereas, it has identified the moving pattern in which a part of the image moves in the horizontal direction like a crossing object sequentially for not less than prescribed number of frames, it generates the layer pattern information LP instructing the formation of the layer including a horizontally moving image. Thus, when the identified moving pattern has occurred sequentially for not less than a prescribed number of frames, the layer pattern information LP corresponding to the identified moving pattern MP is formed. Therefore, even if there occurs a frame in which the moving pattern has been identified erroneously, it is possible to form the layer pattern information LP according to the proper moving pattern.

A threshold value setting unit 464 determines the average value Vavg, the maximum value Vmax, and the minimum value Vmin of the moving amounts of the moving vectors MVE of which the vector directions have been set along the radial directions from the image reference position CP by using the moving vectors MVE within a prescribed time range (for example, for 30 frames before and after the objective frame). In addition, it sets threshold values Th for classification into the layers shown by the layer pattern information LP based on the average value Vavg, the maximum value Vmax, and the minimum value Vmin, and supplies them to the classification unit 463.

For example, when classification into the distant-view, intermediate-view, and close-view layers is indicated by the layer pattern information LP, the threshold value setting unit 464 calculates the threshold value Th-1 indicative of the segment position between the distant-view layer and the intermediate-view layer based on the foregoing equation (1). Further, it calculates the threshold value Th-2 indicative of the segment position between the intermediate-view layer and the close-view layer based on the foregoing equation (2).

Setting of the threshold values may also be accomplished by determining the histogram of the moving amount, and determining the threshold values Th-1 and Th-2 utilizing the minimum value of the histogram in the same manner as the foregoing case shown by FIGS. 10A and 10B. Thus, since the threshold values Th are changed dynamically according to the distribution of the moving amounts, the image will not be classified into only one layer. Accordingly, it is possible to carry out the layer classification according to the distribution of the moving amounts.

The classification unit 463 identifies which one of the layers whose formation has been indicated by the layer pattern information LP includes the respective motion detection areas of each frame based on the threshold values Th from the threshold value setting unit 464 and the moving amounts of the moving vectors MVE, thereby carrying out layer classification. Further, the classification unit 463 allocates the motion detection areas moving in the horizontal direction and the motion detection areas moving in the zoom-out operation directions to their respective corresponding layers. Upon completion of layer classification of respective motion detection areas of the objective frame at the classification unit 463, the classification unit 463 generates layer classification information LA indicative of the layer classification results, and supplies it to a classification correction unit 465.

When the classification unit 463 forms, for example, three layers of distant-view, intermediate-view, and close-view, it calculates the average value of the moving amounts for the preceding m frames and for the succeeding n frames for every motion detection area by using the moving vectors MVE from the motion detection unit 42. For example, when the moving amount of the moving vectors MVE have changed with time as shown in FIG. 26A (it is assumed that each numeric in the figure denotes the moving amount) in the motion detection areas provided on the right side edge of the front moving image, the classification unit 463 calculates the average value of moving amounts using the moving amount of a motion detection area AR1 at an Fp frame, the moving amounts of the motion detection area AR1 at Fp−1 to Fp−m frames, and the moving amounts of the motion detection area AR1 at Fp+1 to Fp+n frames with respect to the motion detection area AR1 at the Fp frame. Further, it compares the average value calculated as the moving amount of the motion detection area AR1 with the threshold values Th-1 and Th-2 set in the foregoing manner, and then, it identifies which one of the distant-view layer, the intermediate-view layer, and the close-view layer includes the motion detection area AR1 at the Fp frame. Thus, the classification unit 463 calculates the average value of moving amounts also using the moving amounts at the preceding frames and the succeeding frames with respect to the motion detection area AR1 at the objective frame, and carries out the layer division of the motion detection area AR1 using the average value. Therefore, even if a difference occurs in the moving amount of the motion detection area AR1, it is possible to carry out the layer classification of the motion detection area AR1. Further, even if there occurs a variation in moving amount of each frame due to a difference in size between objects or a difference in distance to each object, it is possible to prevent the influence of the variation thereof. Further, the classification unit 463 performs the same processing also on other areas and other frames, and thereby it classifies the respective motion detection areas into any layer of the distant-view, intermediate-view, and close-view as shown in FIG. 26B, and notifies the layer classification information LA to the classification correction unit 465.

Incidentally, in FIG. 26B, each motion detection area indicated by crosshatching denotes that it has been classified as the close-view; each motion detection area indicated by oblique lines, as the intermediate-view; and other motion detection areas, as the distant-views.

The classification correction unit 465 refers to the layer classification information LA of respective motion detection areas, and corrects the area in which the number of consecutive areas belonging to the same layer is less than a prescribed number to the layer matched to its periphery. For example, in FIG. 26B, for the area AR4-g at an Fp+4 frame or the area AR6-h at an Fp−2 frame, no area belonging to the same layer is consecutive thereto. Therefore, the classification correction unit 465 corrects each of the areas to the area matched to its periphery as shown in FIG. 26C, and supplies to the information generation unit 47 the layer classification information LB indicating which one of the layers includes any one of the areas.

Whereas, when there is observed a passing vehicle, not only the layers of the foregoing distant-view, intermediate-view, and close-view, but also the backward motion layer including the image of a passing vehicle as shown in FIG. 26D are formed. Herein, the passing vehicle is opposite in vector direction of the moving vector MVE to the distant-view, intermediate-view, and close-view images. Accordingly, the time axis direction of the backward motion layer is formed so as to be opposite to the direction for other layers.

Figure 27:
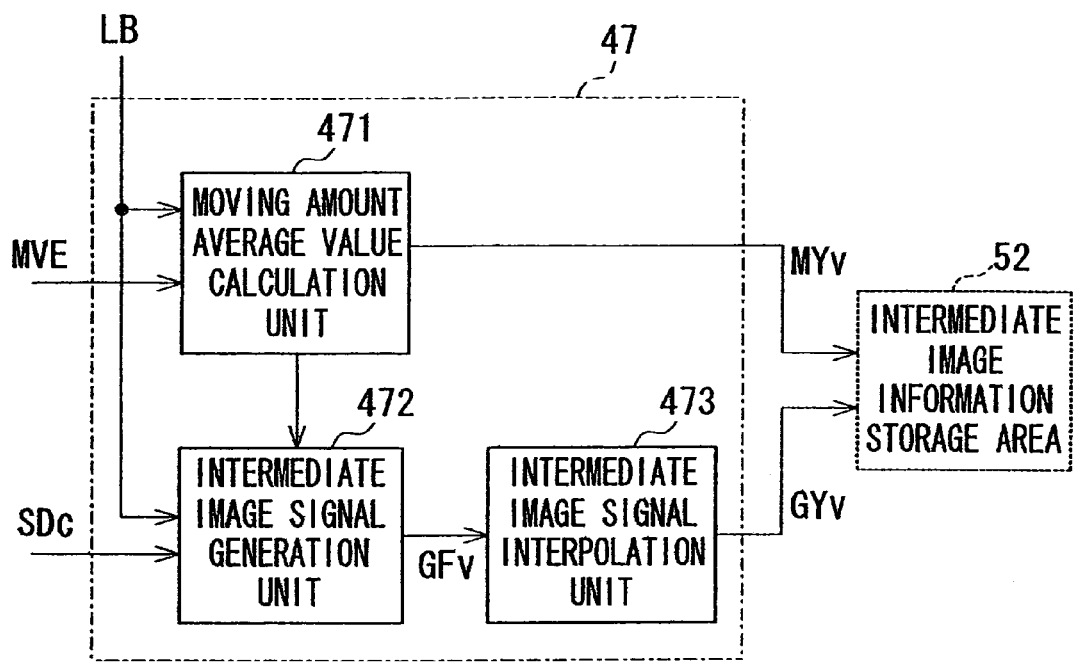
FIG. 27 is a chart showing a configuration of an information generation unit.

FIG. 27 shows a configuration of the information generation unit 47. The layer classification information LB received from the layer classification unit 46 is supplied to a moving amount average value calculation unit 471 and an intermediate image signal generation unit 472.

The moving amount average value calculation unit 471 calculates the average value of the moving amounts of each layer using the moving amounts of respective motion detection areas. For example, when there are ny motion detection areas identified as being belonged to the distant-view layer in an Fe frame, the moving amount average value calculation unit 471 calculates the average value using the moving amounts of the ny motion detection areas, and supplies it to the intermediate image signal generation unit 472. In addition, the calculated moving amount MYv is stored in the intermediate image information storage area 52 of the storage unit 50 as intermediate image information.

The intermediate image signal generation unit 472 extracts the image signal SDC, layer by layer, according to the moving amount MYv calculated at the moving amount average value calculation unit 471 from the side edge based on the layer classification information LB supplied from the layer classification unit 46, generates an intermediate image signal GFv of each layer, and supplies it to an intermediate image signal interpolation unit 473.

Figure 28A:
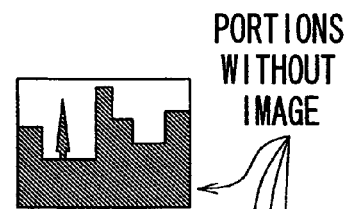
FIGS. 28A to 28C are diagrams each for showing an intermediate image of each layer.
Figure 28B:
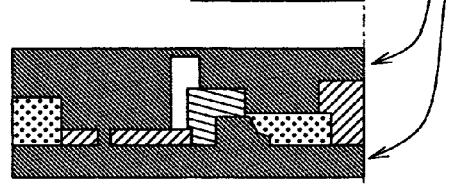

The intermediate image signal interpolation unit 473 reads the image signal SDC from the side edge by the signal amount corresponding to the moving amount MYv of each layer, and generates each intermediate image signal. For example, the images based on the intermediate image signals are the respective ones shown in FIGS. 28A to 28C. Incidentally, FIG. 28A shows an image based on the intermediate image signal of the distant-view layer; FIG. 28B, an image based on the intermediate image signal of the intermediate-view layer; and FIG. 28C, an image based on the intermediate image signal of the close-view layer. The portions filled in with oblique lines are the areas without image.

Figure 28C:
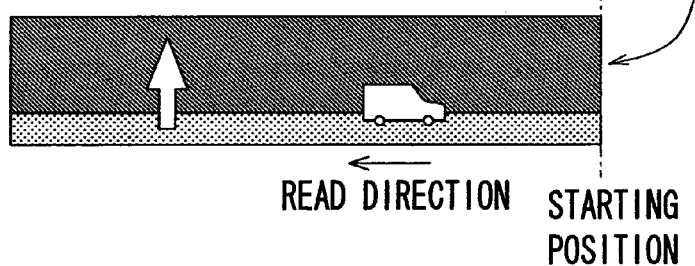
Figure 29A:
FIGS. 29A to 29C are diagrams each for showing an intermediate image of each layer after interpolation processing.
Figure 29B:
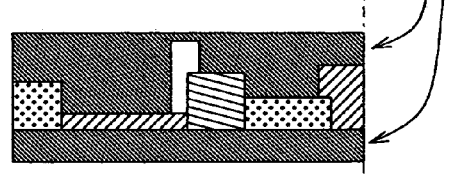
Figure 29C:
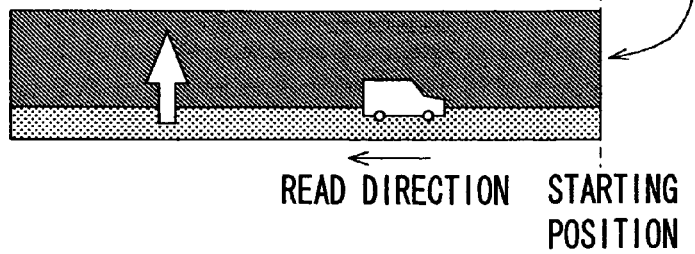

The intermediate image signal interpolation unit 473 corrects the intermediate image signal GFv in order that an area without image will not occur when image synthesis is carried out by superimposing the images of respective layers mutually different in moving amount MYv in the order of the distant-view, intermediate-view, and close-view one on another. Then, the corrected signals are stored in the intermediate image information storage area 52 as the intermediate image signals GYv. For the correction of the intermediate image signals, if the whole is interpolated on the layer closer to the foreground, the inner layers will be hidden. Therefore, the intermediate image signal interpolation unit 473 is configured to interpolate the whole gap on the innermost layer. For the intermediately situated layer, the interpolation processing using horizontally adjacent signals is performed on only the gaps generated by the area belonging to the layer closer to the foreground than this layer. Thus, the image signals of the gap areas without image are developed to be superimposed on the intermediate image signals. For example, when the intermediately situated layer is the intermediate-view layer of FIG. 28B, and the layer closer to the foreground is the close-view layer of FIG. 28C, the gaps are the areas of the tree and the car in the intermediate-view layer. By performing the interpolation processing in this manner, the portion without image (the area filled in with oblique lines) is interpolated using the horizontally adjacent signals, so that the image shown in FIG. 28A based on the intermediate image signal GFv becomes the image shown in FIG. 29A. Similarly, the image shown in FIG. 28B based on the intermediate image signal GFv becomes the image corrected as shown in FIG. 29B. Incidentally, for example, when the close-view layer shown in FIG. 28C is the layer situated closest to the foreground, areas without image will not occur in the layer situated closest to the foreground. This eliminates the necessity of the interpolation processing on the layer situated closest to the foreground. Therefore, the close-view layer shown in FIG. 29C is equal to FIG. 28C.

The intermediate image information storage area 52 of the storage unit 50 relates the moving amount MYv of each layer generated at the layering processing block 45 to the intermediate image signal GYv of each layer also generated at the layering processing block 45 on a frame-by-frame basis, and stores them as the intermediate image information. Herein, the intermediate image signal of the distant-view layer stored in the intermediate image information storage area 52 has a small moving amount, resulting in a small signal amount of the image signal as shown in FIG. 29A. Whereas, the intermediate image signal of the close-view layer has a large moving amount, resulting in a large signal amount as shown in FIG. 29C. Further, the intermediate-view layer has a signal amount which falls in the range between those of the distant-view and the intermediate-view as shown in FIG. 29B. Incidentally, for the backward motion layer, the moving direction is opposite. Accordingly, the frame direction is opposite to that of FIGS. 29A to 29C for the intermediate image signal of the backward motion layer.

When the intermediate image information storage area 52 is instructed to form the horizontal motion layer based on the layer pattern information LP, it sets the image signal of the motion detection area of which the direction of the moving vector is the horizontal direction as the intermediate image signal of the horizontal motion layer. Herein, in the horizontally moving image, there occur an image moving outwardly and an image moving inwardly from the front moving image. For example, for a right turn, an image comes in from the right edge of the front moving image, and the image comes out from the left edge thereof. Therefore, the horizontal motion layer of the outwardly moving image is made equal in time axis direction to the distant-view layer, and the like. Whereas, the horizontal motion layer of the image coming inwardly is set to be opposite in time axis direction to the distant-view layer, and the like as with the backward motion layer.

Thus, the intermediate image information storage area 52 generates the intermediate image signals of respective layers of distant-view, intermediate-view, and close-view, and the intermediate image signals of the backward motion layer and the horizontal motion layer according to their respective moving amounts, and stores them. Further, it also stores the moving amounts of the respective layers together.

Then, a description will be given to the case where the peripheral image signal SDR of the right side image is generated using the intermediate image information stored in the intermediate image information storage area 52 of the storage unit 50.

When the peripheral image signal SDR is generated, the peripheral image signal generation block 60 reads the moving amounts MYv stored as the intermediate image information from the intermediate image information storage area 52, and determines the signal amount of the intermediate image signal GYv to be read of each layer based on each moving amount MYv. Further, the intermediate image signals each having a signal amount corresponding to the moving amount MYv are used layer by layer, and superimposed one on another in the order of the distant-view layer, the intermediate-view layer, and the close-view layer to perform image synthesis. Further, when a different layer from the distant-view, intermediate-view, and close-view layers is disposed, the image synthesis processing of this layer is also performed. Thus, it is possible to generate the peripheral image signal SDR. By supplying the generated peripheral image signal SDR to the projector 12R in accordance with the output timing of the image signal SDC of the front moving image, it is possible to continuously display not only the front moving image but also the right side image.

FIG. 30 shows a configuration of the peripheral image signal generation block 60 for reading the intermediate image information stored in the intermediate image information storage area 52, and generating a peripheral image signal. An image generation control unit 61 of the peripheral image signal generation block 60 reads the moving amounts MYv each of its respective layers stored as the intermediate image information in the intermediate image information storage area 52 in the order of frame sequence, and identifies the amount of the intermediate image signal to be read of each layer based on each of the read moving amounts MYv. Further, the image generation control unit 61 reads the intermediate image signals GYv from the intermediate image information storage area 52, layer by layer, based on the identified read amounts, and supplies them to synthesis units 621-1 to 621-5 of respective layers disposed in a signal extraction unit 62.

Herein, the intermediate image signal of the horizontal motion layer in which the image moves in the horizontal direction upon a right turn or left turn is supplied to the synthesis unit 621-1. Whereas, the intermediate image signal of the distant-view layer is supplied to the synthesis unit 621-2, and the intermediate image signal of the intermediate-view layer and the intermediate image signal of the close-view layer are supplied to the synthesis units 621-3 and 621-4, respectively. Further, the intermediate image signal of the backward motion layer including the image of a passing vehicle is supplied to the synthesis unit 621-5.

To the synthesis unit 621-1, an image shift unit 623-1 described later is connected. Thus, the synthesis unit 621-1 superimposes, on the image signal supplied from the image shift unit 623-1, the image signal of the corresponding layer read out of the intermediate image information storage area 52, thereby performing image synthesis. The image signal of the horizontal motion layer obtained by performing image synthesis with the synthesis unit 621-1 is supplied to a delay unit 622-1 and a distant-view synthesis unit 641 of an image signal generation unit 44.

The delay unit 622-1 delays the image signal received from the synthesis unit 621-1 by one frame, and supplies the delayed signal to the image shift unit 623-1. The image shift unit 623-1 moves the image based on the image signal supplied from the delay unit 622-1 in the horizontal direction based on the moving amount MYv of the horizontal motion layer supplied from the image generation control unit 61. Further, it supplies the image signal of the image moved in the horizontal direction to the synthesis unit 621-1. The synthesis unit 621-1 superimposes, on the image moved in the horizontal direction, the image based on the intermediate image signal GYv read by the moving amount MYv of each layer from the intermediate image information storage area 52, thereby performing image synthesis. Thus, it generates the image signal of the sequentially moving image.

Similarly, delay units 622-2 to 622-5 respectively generate image signals each delayed by one frame. In addition, image shift units 623-2 to 623-5 move their respective image signals each delayed by one frame in the horizontal direction based on the moving amounts MYv of respective layers supplied from the image generation control unit 61. Further, each of synthesis units 621-2 to 621-5 superimposes, on each image moved in the horizontal direction, the image based on the intermediate image signal GYv read by the moving amount of each layer from the intermediate image information storage area 52, thereby performing image synthesis. Thus, it generates the image signal of the sequentially moving image for each layer.

Whereas, the intermediate image signal is the signal read out of the front moving image signal. Therefore, the image based on the intermediate image signal becomes the image on the same plane as that of the screen 10C. However, the screen 10R for displaying the peripheral image is disposed at a tilt with respect to the front screen 10C. Accordingly, if the image signals of the layers in each of which the direction of the moving vector is the direction toward the image reference position CP or the opposite direction thereto like the distant-view, intermediate-view, and close-view layer, and the backward motion layer are used, and the images of the respective layers are superimposed one on another, thereby performing image synthesis, so that the peripheral image signal SDR is generated to perform image display, the image displayed on the screen 10R will not have a proper shape due to the tilt of the screen 10R with respect to the screen 10C. For this reason, the image signals of the layers in each of which the direction of the moving vector is the direction toward the image reference position CP or the opposite direction thereto are supplied to respective transformation units 631 to 634 of a projection transformation unit 63. Then, the projection transformation is carried out so that when the images of the respective layers are displayed on the screens 10L and 10R, the images properly move in the vector directions of respective moving vectors MVE. Whereas, for the image of the horizontal motion layer, the vector direction of the moving vector MVE is the horizontal direction. Therefore, the projection transformation as with the distant-view, intermediate-view, or close-view layer, or the backward motion layer will not be performed.

The transformation units 631 to 634 of the projection transformation unit 63 perform projection transformations on their respective image signals supplied from the synthesis units 621-2 to 621-5 so as to provide an image having a shape adaptable to the orientation of the screen 10R. Herein, the images are sequentially read out of the front moving image. The display plane 10CR of the read image and the screen 10R are not the same plane as shown in FIGS. 14A and 14B described above. Therefore, when the image read out of the front moving image is displayed on the screen 10R, there arises the image obtained by projecting the image on the display plane 10CR as it is on the plane of the screen 10R, so that the proper shape is not achieved.

Therefore, the transformation units 631 to 634 perform projection transformations for performing scale-up by the scaling factor proportional to the distance from the center Czm of zoom-in or zoom-out along the perpendicular direction of the image, and for performing scale-up by a scaling factor such that the speed is proportional to the distance from the center Czm of zoom-in or zoom-out along the horizontal direction of the image. With this processing, as described above, the position (x, y) of the image read out of the front image end as it is and the position (X, Y) after transformation processing such that image display can be properly performed on the right side moving image are in the relationship of the foregoing equation (5) for the vertical direction, and in the relationship of the foregoing equation (4) for the horizontal direction. Therefore, as shown in FIG. 14D, by using the signal of the position (x, y) satisfying the equations (5) and (6) for the image signal of (X, Y) on the screen 10R, it is possible to properly display the right side moving image on the screen 10R as shown in FIG. 14E.

The image signal of the distant-view layer after projection transformation obtained at this transformation unit 631 is supplied to the distant-view synthesis unit 641 of an image signal synthesis unit 64. Whereas, the image signal of the intermediate-view layer after projection transformation obtained at the transformation unit 632 is supplied to an intermediate-view synthesis unit 642, and the image signal of the close-view layer after projection transformation obtained at the transformation unit 633 is supplied to a close-view synthesis unit 643. Further, the image signal of the backward motion layer obtained at the transformation unit 634 is supplied to a scale-down image synthesis unit 644.

The distant-view synthesis unit 641 superimposes the image of the distant-view layer on the image of the horizontal motion layer based on the image signals respectively supplied from the synthesis unit 621 and the transformation unit 631, thereby performing image synthesis. As a result, the distant-view synthesis unit 641 generates an image signal, and supplies it to the intermediate-view synthesis unit 642.

The intermediate-view synthesis unit 642 superimposes the image of the intermediate-view layer on the image resulting from superimposition of the image of the distant-view layer based on the image signals respectively supplied from the transformation unit 632 and the distant-view synthesis unit 641, thereby performing image synthesis. As a result, the intermediate-view synthesis unit 642 generates an image signal, and supplies it to the close-view synthesis unit 643.

The close-view synthesis unit 643 superimposes the image of the close-view layer on the image resulting from superimposition of the image of the intermediate-view layer based on the image signals respectively supplied from the transformation unit 633 and the intermediate-view synthesis unit 642, thereby performing image synthesis. As a result, the close-view synthesis unit 643 generates an image signal, and supplies it to the scale-down image synthesis unit 644.

The scale-down image synthesis unit 644 superimposes the image of the backward motion layer in which the image shrinks with time on the image resulting from superimposition of the image of the close-view layer based on the image signals respectively supplied from the transformation unit 634 and the close-view synthesis unit 643, thereby performing image synthesis. As a result, it generates an image signal. The image signal generated at the scale-down image synthesis unit 644 becomes the image signal of the side moving image obtained by performing the image synthesis of superimposing respective layers from the horizontal motion layer to the scale-down layer one on another.

Thus, the peripheral image signal generation block 60 supplies the image signal generated at the scale-down image synthesis unit 644 to the projector 12R as the peripheral image signal SDR. In consequence, it is possible to display the right side image continuous with the front moving image on the screen 10R by the projector 12R.

Further, when no processing for interpolating the portion without image is performed on the intermediate image signals stored in the intermediate image information storage area 52, or when there occurs a portion without image in the image signal generated at the scale-down image synthesis unit 644, an interpolation unit, although not shown, is disposed in the image signal synthesis unit 64. The interpolation unit identifies what layers of images have been superimposed one on another in the areas adjacent to the portion without image. Then, it performs an interpolation processing using a large-depth layer image. For example, when a portion without image has occurred in the portion horizontally adjacent to the area in which the images of the intermediate-view layer and the close-view layer are superimposed one on another, the interpolation unit performs an interpolation processing using the image of a large-depth intermediate-view layer. In consequence, it is possible to generate a good peripheral image signal SDR without an image loss.

Further, the peripheral image signal generation block 60 generates the peripheral image signal SDL in the same manner as with the peripheral image signal SDR, and supplies it to the projector 12L. As a result, it is possible to display the left side image continuous with the front moving image on the screen 10L by the projector 12L.

Further, the storage unit 50 stores the intermediate image information. The intermediate image information is the moving amount and the intermediate image signal of each layer. Therefore, the amount of information stored in the storage unit 50 becomes less as compared with the case where the image signal of the peripheral image is stored. Whereas, the image processing apparatus 15B is capable of performing image display at a wide angle of view without using a large-capacity recording medium, or the like.

Further, it is also acceptable that the foregoing processing to be performed at the respective blocks are implemented by software. The configuration in this case is the same as the case of FIG. 15 described above, and a description thereon is omitted.

Figure 31:
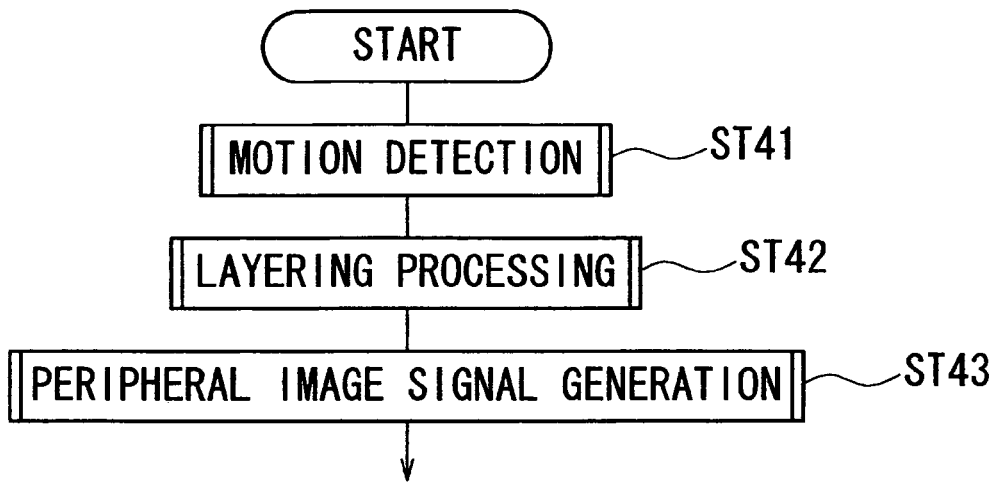
FIG. 31 is a flowchart showing an overall configuration of an image-processing program in the second embodiment.

FIG. 31 is a flowchart showing an overall configuration of an image processing program in a second embodiment. In the chart, at a step ST41, a motion detection processing is performed so that the moving vector of an image is detected.

Subsequently, at a step ST42, with an intermediate image information generation processing, the intermediate image information indicative of the image information of each layer, for example, each of the distant-view layer, the intermediate-view layer, and the close-view layer, and the moving amount of each layer is generated based on the moving vector. At a step ST43, a peripheral image generation processing is performed to synthesize a peripheral image based on the intermediate image information.

Figure 32:
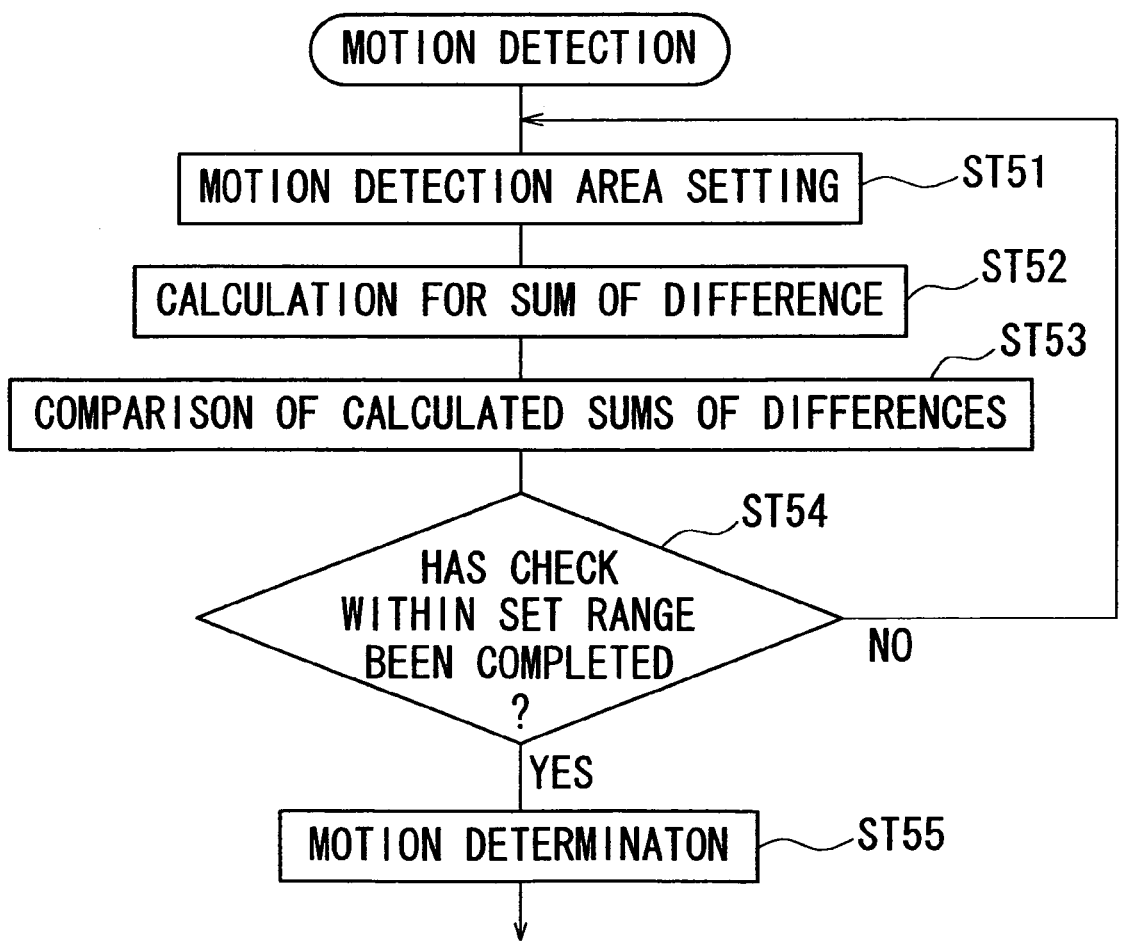
FIG. 32 is a flowchart showing motion detection in the second embodiment.

FIG. 32 is a flowchart showing the motion detection processing in the step ST41 of FIG. 31. In a step ST51, the motion detection areas are set on the front moving image, and the process proceeds to a step ST52. In the step ST52, scaling down the image of each detection area and changing the position thereof are performed, thereby calculating the sum of differences, and the process proceeds to a step ST53. In the step ST53, the already calculated sums of differences are compared with the image position providing a smaller sum of differences being detected, and the process proceeds to a step ST54. In the step 54, whether the check within a range of the preset image size and position has been competed or not is identified. If not completed, the process returns to the step ST51. If completed, the process proceeds to a step ST55. At the step ST55, the moving vector indicative of the motion of the motion detection area is determined based on the image position providing the minimum value in the sum of differences.

Figure 33:
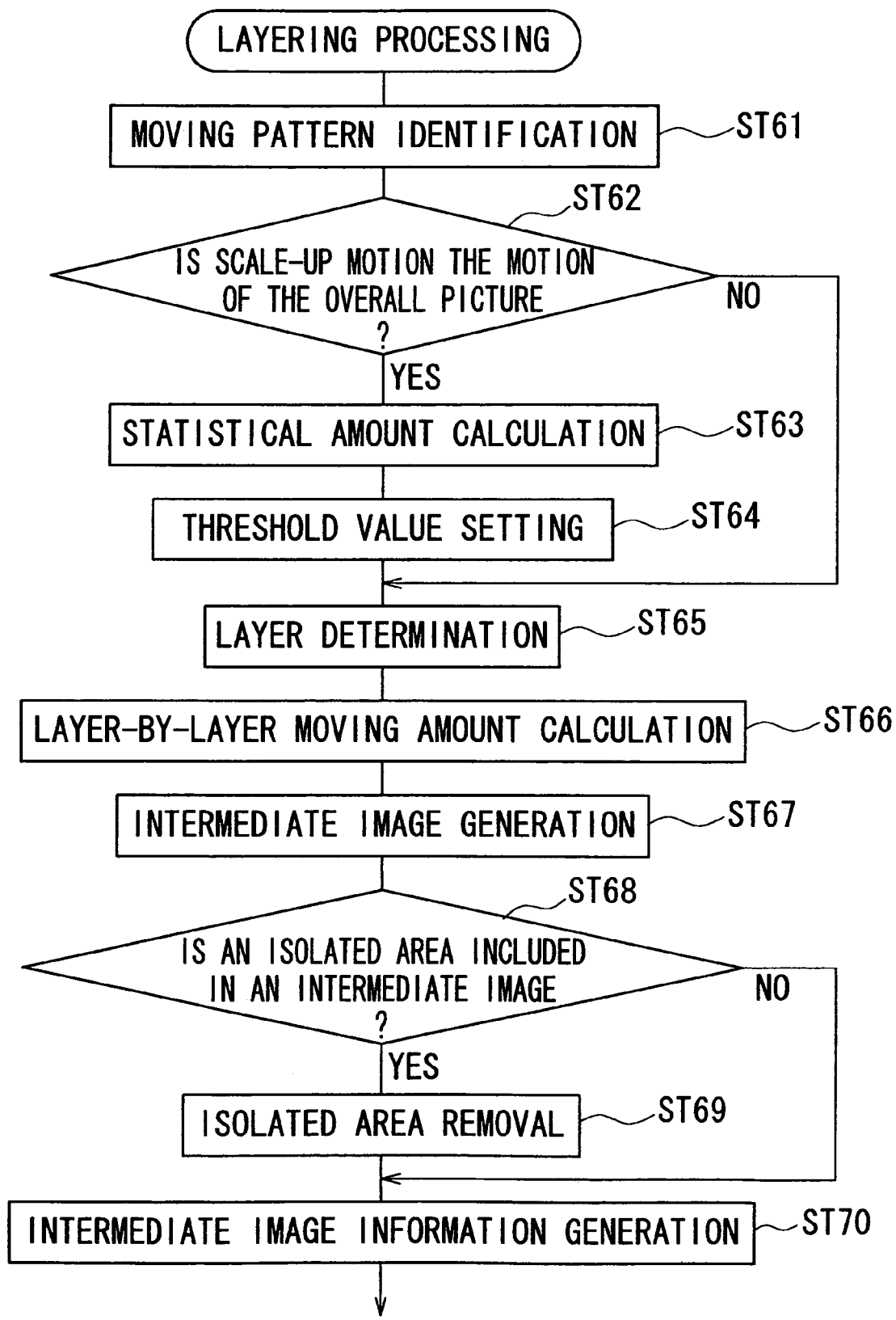
FIG. 33 is a flowchart showing a layering processing in the second embodiment.

FIG. 33 is a flowchart showing the intermediate image information generation processing in the step ST42 of FIG. 31. In a step ST61, identification of the moving pattern, for example, whether the moving pattern is a straight forward motion or a backward motion, or which moving pattern of a right turn, left turn motion or the like, is performed based on the moving vector detected with the motion detection processing in the step ST41. Then, the layer pattern information indicating what layer is provided is generated. In a step ST62, whether the identified moving pattern shows that the scale-up motion is the motion of the overall picture or not is identified. Herein, if it shows the scale-up motion, the process proceeds to a step ST63. Whereas, if it is not the scale-up motion, the process proceeds to a step ST65. In the step ST63, the statistical information, for example, the average value is calculated using the moving amount of the moving vector, and then, the process proceeds to a step ST64. In the step ST64, threshold values for dividing the image into layers of, for example, a distant-view, an intermediate-view, and a close-view are set based on the statistical information. In the step ST65, the set threshold values are compared with the moving amounts so that it is capable of generating the layer information indicating which one of layers includes the motion detection area. Further, when the whole picture does not show the scale-up motion, the layer information is generated by setting each motion detection area as the layer corresponding to its moving pattern.

In a step ST66, the moving amount of each layer is calculated based on the moving amounts of the motion detection areas included in the layer. In a step ST67, images are extracted layer by layer from the front moving image based on the layer information and the moving amount of each layer so that the intermediate image is generated. In a step ST68, whether the intermediate image includes an isolated area or not is identified. If it includes the isolated area, the process proceeds to a step ST69. Whereas, if it includes no isolated area, the process proceeds to a step ST70. In the step ST69, performing an interpolation processing removes the isolated area and then, the process proceeds to the step 70. In the step ST70, the intermediate image information including the intermediate image of each layer with no isolated area and the moving amount of each layer is generated.

Figure 34:
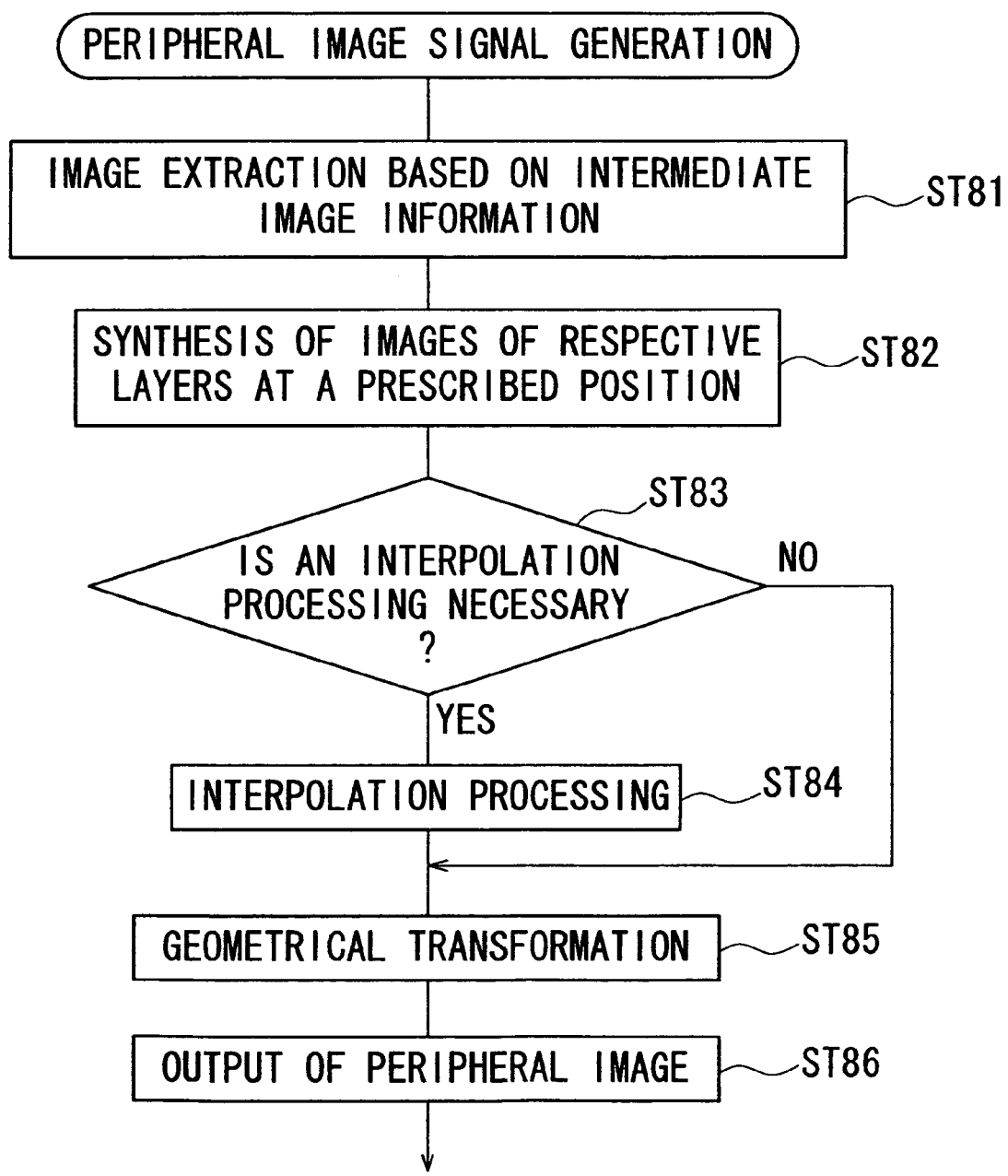
FIG. 34 is a flowchart showing peripheral image signal generation in the second embodiment.

FIG. 34 is a flowchart showing the peripheral image generation processing in the step ST43 of FIG. 31. In a step ST81, images are extracted layer by layer from the intermediate images of respective layers based on the moving amounts of respective layers indicated by the intermediate image information. In a step ST82, the syntheses of the extracted images of respective layers are generated at a prescribed position. In a step ST83, it is identified whether the interpolation processing for supplying the image of a portion without image is required or not when the portion has occurred upon performing the image synthesis. Herein, when the portion without image occurs, the process proceeds to a step ST84. Whereas, when no portion without image occurs, the process proceeds to a step ST85. In the step ST84, the interpolation processing is performed, and then the process proceeds to the step ST85. For example, the peripheral images around the portion without image are extended for the interpolation. In the step ST85, a geometrical transformation processing is performed in accordance with the orientation of the screen onto which the synthesized image is projected. Then, the image signal of the image subjected to the geometrical transformation is outputted as the image signal of the peripheral image at a step ST86.

It is also acceptable that such an image processing program is, as described above, recorded on a removable information recording transmission medium, or transmitted via an information recording transmission medium.

Further, in the foregoing second embodiment, when the image processing program has been executed to generate the intermediate image information, the intermediate image information is recorded, for example, in the hard disk drive 304, or a recording medium mounted in the recording medium drive 312. Further, when a request for the output of the image signal of the peripheral image occurs, the intermediate image information is read so that the peripheral image signals SDL and SDR of the left and right side moving images is generated. In addition, the peripheral image signals SDL and SDR are outputted in accordance with the timing of the image signal SDC of the front moving image. Therefore, it is possible to display wide view angle continuous images using the front and left and right screens.

Incidentally, the foregoing second embodiment was configured as follows. Based on the motion vectors MVE of the motion detection areas disposed closer to the side edges of the front moving image, division of the images into layers of a distant-view, an intermediate-view, a close-view, and the like, identification of each moving amount, and the like are performed. In consequence, the intermediate image information is generated, and stored in the intermediate image information storage area 52. In addition, for displaying the peripheral images, by using the intermediate image information stored in the intermediate image information storage area 52, each intermediate image signal GYv is read according to the moving amount MYv of each layer and the images are superimposed one on another. In consequence, each peripheral image signal is generated. However, it is also possible to generate the peripheral image signal without using the moving vector MVE.

Then, an image processing apparatus of a third embodiment of this invention will be described. The image processing apparatus 15C generates the peripheral image signal without using the moving vector MVE.

The image processing apparatus 15C generates sideward projection images based on the front moving image by geometrical transformation. It subjects each projection image to an integration processing to generate an integration image. In addition, it divides the image into layers using the integration image, and generates the moving amount MYs of each layer and the intermediate image signal of each layer, and stores them in the intermediate image information storage area 52 as the intermediate image information.

Figure 35:
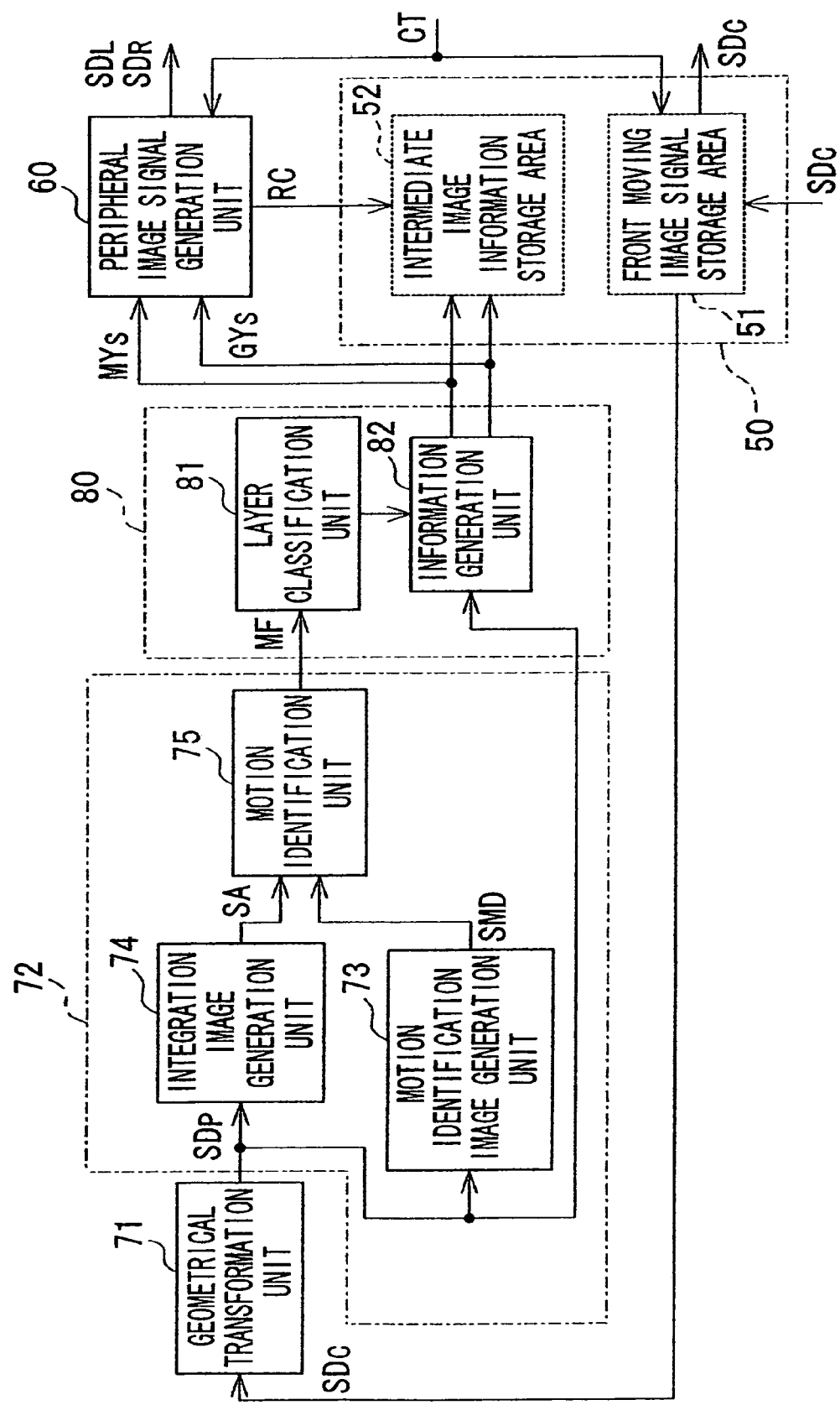
FIG. 35 is a chart showing an image processing apparatus according to a third embodiment of this invention.

FIG. 35 shows a configuration of the image processing apparatus 15C. The image signal SDC of the front moving image is supplied to a geometrical transformation unit 71. The geometrical transformation unit 71 generates a projection image signal SDP of an image by a geometrical transformation processing, the image being obtained by displaying the front moving image on the projection plane, which is the plane along the direction of advance, using the image signal SDC of the front moving image. The projection image signal SDP generated by the geometrical transformation unit 71 is supplied to a motion identification image generation unit 73 and an integration image generation unit 74 of a motion detection block 72, and an information generation unit 82 of a layering processing block 80.

The motion identification image generation unit 73 extracts the projection image signals SDP within a prescribed range from the edge side in contact with the front moving image on a frame-by-frame basis using the projection image signal SDP supplied from the geometrical transformation unit 71, and sequentially superimposes them to perform image synthesis. Thus, a motion identification image signal SMD is generated. The motion identification image signal SMD is supplied to a motion identification unit 75.

The integration image generation unit 74 sums up, and averages the projection image signals SDP for ms frames while shifting the position in the horizontal direction, thereby generating one integration image signal. Further, ns integration image signals are generated based on ns different position shift amounts. The ns integration image signals SA generated at the integration image generation unit 74 are supplied to the motion identification unit 75.

The motion identification unit 75 compares the ns integration image signals SA with the motion identification image signal SMD. Then, it detects the image based on the integration image signal SA matching the image based on the motion identification image signal SMD. Further, the motion identification unit 75 identifies the moving amount of a prescribed position of an objective frame based on the detection result thereof. Herein, the integration image relates to the object occurring as an image when the position shift amount and the amount of movement of the image are in agreement with each other. Further, only ns integration images are generated by setting different shift amounts, so that ns images having different moving amounts are shown by the integration image signals SA. For this reason, the motion identification unit 75 identifies the correlation between the ns integration image signals SA and the motion identification image signal SMD. Then, it identifies the amount of movement of the object making up the motion identification image, i.e., the moving amount of the prescribed position of the objective frame, based on the identification results. Herein, when the image of the object is a distant-view, the amount of movement is small. Whereas, when the image of the object is a close-view, the amount of movement is large. Namely, the amount of movement denotes the depth of the image of the object. Thus, the motion identification unit 75 identifies the moving amount of each position of the projection image. In addition, it generates moving amount information MF indicative of the identification result, and supplies it to a layer classification unit 81 and the information generation unit 82 of the layering processing block 80.

The layer classification unit 81 generates the layer classification information LB indicating which one of a plurality of the layers includes the prescribed position of the objective frame based on the supplied moving amount information MF, and supplies it to the information generation unit 82.

The information generation unit 82 determines the average value using the amounts of movement of the preceding and succeeding frames for each frame in each layer, and supplies it as the moving amount MYs of the concerned frame of each layer to the intermediate image information storage area 52 of the storage unit 51. Further, the information generation unit 82 classifies the image signal SDP supplied from the geometrical transformation unit 71 on a layer-by-layer basis based on the determined moving amount Mys of each layer and the layer classification information LB supplied from the layer classification unit 81, and generates intermediate image signals GFs. Namely, the information generation unit 82 reads the image signals in the horizontal direction by the moving amounts, and sequentially superimposes them one on another for each of the concerned layers, thereby performing image synthesis. As a result, the same intermediate image signals GFs of respective layers as those of FIGS. 28A to 28C are generated.

Further, if the direction of motions of the images of the distant-view layer, the intermediate-view layer, and the close-view layer is assumed to be a reference, the direction of motion of the backward motion layer becomes the opposite direction thereto. Therefore, the information generation unit 82 reads projection plane image signals by the amount of the absolute value of the moving amount from the edge side in contact with the front moving image, laterally reverses them, and superimposes them to perform image synthesis. As a result, the intermediate image signal of the backward motion layer is generated.

Further, the information generation unit 82 performs an interpolation processing so as to prevent the formation of an area without image on the formed intermediate image signal GFs of each layer, thereby filling up the portion without image. The intermediate image signal GYs of each layer obtained by execution of the interpolation processing by the information generation unit 82 is related to the moving amount MYs of each layer, and stored as the intermediate image information in the intermediate image information storage area 52.

The peripheral image signal generation block 60 reads the intermediate image information from the intermediate image information storage area 52 to perform processing in the same manner as described above. As a result, it is possible to generate the peripheral image signal of the right side moving image.

Figures 36A, 36B:
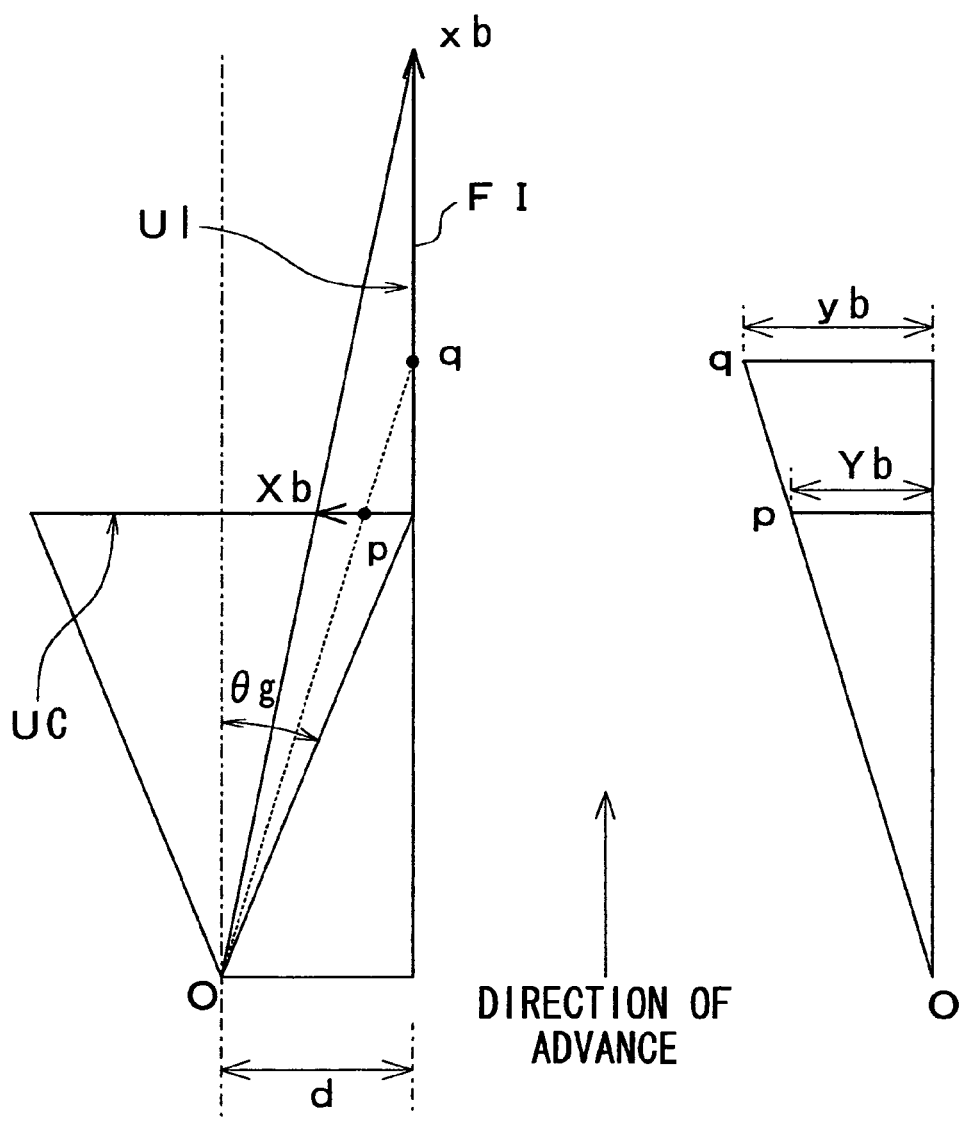
FIGS. 36A and 36B are diagrams each for illustrating a geometrical transformation processing.

Then, respective blocks and the like will be described in detail. FIGS. 36A and 36B are diagrams each for illustrating the geometrical transformation processing at the geometrical transformation unit 71. In FIGS. 36A and 36B, a position O is the position for photographing the front moving image UC. Ideally, it is desirable that the photographing position and the viewer position are set at the same position. Herein, the photographing position and the viewer position are assumed to be the same position. The geometrical transformation unit 71 projects the image at a position p of the front moving image onto a position q on a projection plane FI parallel to the direction of advance to generate a projection image UI based on the front moving image. Herein, the relationship between a position xb in the direction of advance on the projection plane and a horizontal position Xb on the front moving image becomes the one as expressed by the following equation (7). Whereas, the relationship between a position yb in the direction of height on the projection plane and a vertical position Yb on the front moving image becomes the one as expressed by the following equation (8).

$$Xb = \frac{xb \cdot d}{xb + \frac{d}{\tan(\theta g)}} \quad (7)$$

$$Yb = \frac{\sqrt{(d-xb)^2 + \frac{d}{\tan(\theta g)}}}{\sqrt{\left[\frac{d}{\tan(\theta g)} + xb\right]^2 + d^2}} \quad (8)$$

Incidentally, in the equations (7) and (8), "fÆg" denotes the angle obtained by halving the horizontal view angle of the front moving image. When the horizontal view angle of the camera which has photographed the front moving image is apparent, the angle which is one-half of the horizontal view angle is referred to as "fÆg". Whereas, when the horizontal view angle of the camera is not apparent, the value preset according to the focal length of the used lens is to be used. A reference character "d" denotes the value obtained by halving the length along the horizontal direction of the front moving image (the length along the horizontal direction of the image frame).

Thus, by using the equations (7) and (8), the geometrical transformation unit 71 can generate the image signals of the left and right projection images on a frame-by-frame basis based on the image signal of each frame of the front moving image. Further, when the input image is the front moving image resulting from a forward motion in a car-mounted state, the left and right projection images are side images. The moving amount of each of the projection images is proportional to the car speed. Further, the moving amount of the projection image is inversely proportional to the depth. For this reason, if the projection image is a distant-view image and has a large depth, the moving amount is small. Whereas, if the projection image is a close-view image and has a small depth, the moving amount is large. The size of the projection image may be desirably sufficiently large for the respective subsequent processing. For example, the same size as that of the peripheral image to be presented is desirable.

Figures 37A, 37B:
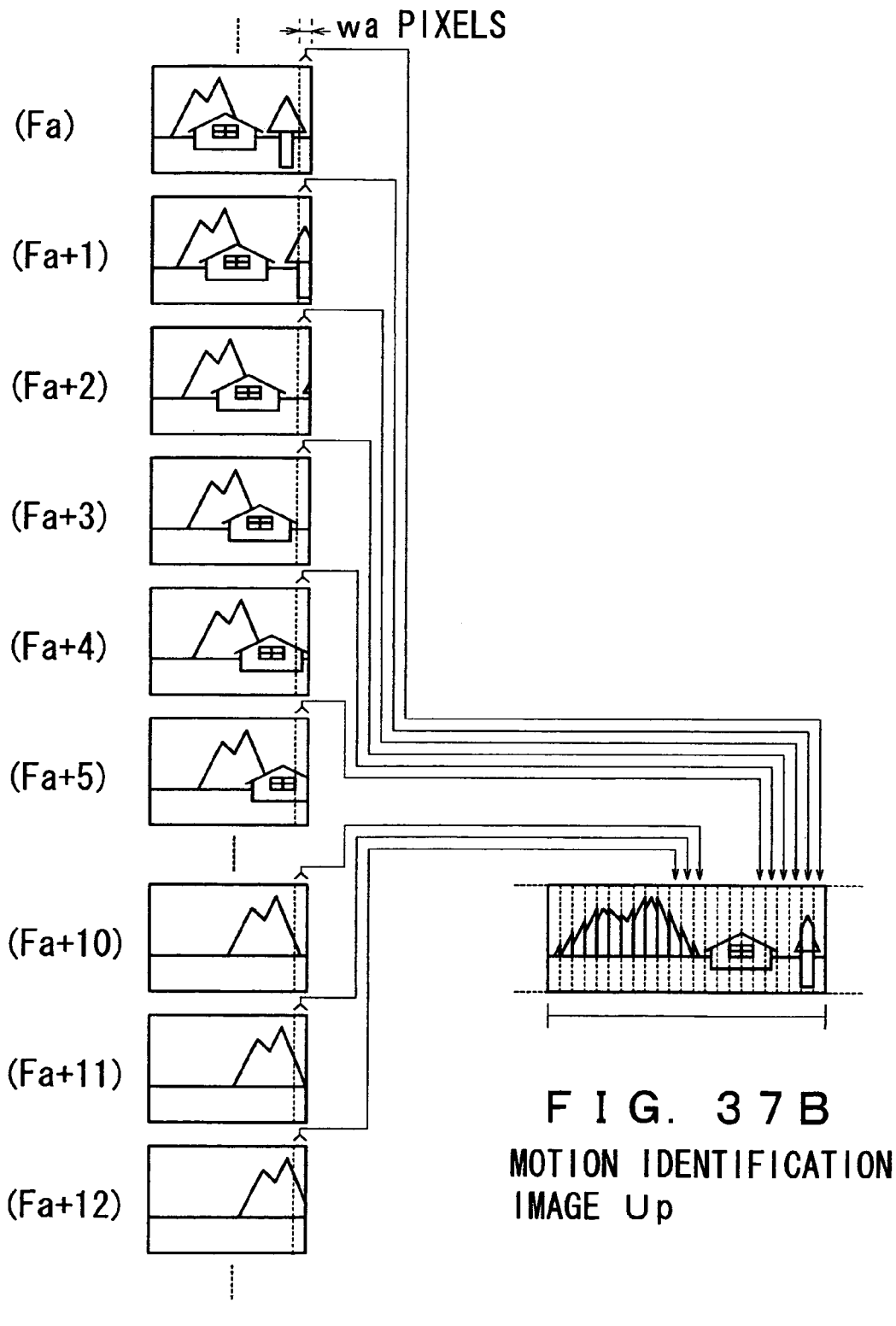
FIGS. 37A and 37B are diagrams each for illustrating the operation of a motion identification image generation unit.

FIGS. 37A and 37B are diagrams each for illustrating the operation of the motion identification image generation unit 73. The motion identification image generation unit 73 cuts, as shown in FIG. 37A, an image signal by a width of a prescribed number wa of pixels (ex. 4 pixels) along the horizontal direction from the front moving image side edge of the projection plane image (the right side edge for the right side projection plane image) on a frame-by-frame basis. In addition, it superimposes the cut image signals, as shown in FIG. 37B, one on another in the order of frame sequence by prescribed frames to perform image synthesis, thereby generating the motion identification image signal SMD of a motion identification image Up. Incidentally, for the motion identification image Up, when the moving amount of an object is wa pixels/frame in the horizontal direction, and is equal to the number wa of cut pixels of the image signal (a house in FIGS. 37A and 37B), the image of the object becomes a continuous image having no discontinuous points. As for the image of an object showing a slower motion than that of cutting out of the image signals (a mountain in FIGS. 37A and 37B), a portion repeatedly cut out arises, and hence the discontinuity of images occurs at the connection part between the cut out image signals. Further, for the image of an object showing a faster motion than that of the cutting out of the image signals (a tree in FIGS. 37A and 37B), a portion not to be cut out arises because of its fast motion, and hence the discontinuity of images occurs at the connection part.

The integration image generation unit 74 generates the integration image signal SA used for identifying the moving amount of each pixel of the motion identification image. Herein, the principle of the identification operation of the moving amount will be described by reference to FIGS. 38A to 38E. For example, if an object Ja moving rightward and another object Jb moving rightward at a speed twice that of the object Ja are photographed, the photographed images are as shown in FIG. 38A. Herein, with respect to the first frame F1, the image of a next frame F2 is shifted by the pixel amount dx of the object Ja in the opposite direction to the direction of movement of the object Ja. Further, similarly, the image of the subsequent frame F3 is also shifted with respect to the frame F2 by the pixel amount dx of the object Ja in the opposite direction to the direction of movement of the object Ja. Thus, if an average value image Um obtained by adding and averaging the images of respective frames which have been shifted by a given amount between respective frames is used, the position of the object Ja is constant, and the position of the object Jb moves. Accordingly, the signal level of the image signal of the object Jb is smaller as compared with that of the object Ja. As a result, it is possible to extract only the object Ja by the average value image Um as shown in FIG. 38C.

Further, as shown in FIG. 38D, when the shift amount of the image of each frame is doubled (2dx) and an average value image Um is generated, the position of the object Jb becomes constant, and the position of the object Ja moves. As a result, it is possible to extract only the object Jb by the average value image Um as shown in FIG. 38E.

Thus, the average value image obtained by shifting the images of respective frames each by a prescribed amount, and adding and averaging them is generated. In addition, the shift amount of the images of respective frames is changed so that a plurality of average value images is generated. Then, by identifying which one of the average value images indicates the object properly, it is possible to identify the moving amount of each object using the average value image even if objects showing mutually different moving amounts are included in one image. Herein, the integration image generation unit 74 cuts out, as with the motion identification image generation unit 73, the image signal for a prescribed number of pixels in the horizontal direction on a frame-by-frame basis based on a plurality of average value images to generate integration images. In addition, it compares the integration images with the motion identification image, and identifies which one of the integration images indicates the image equal to the object constituting the motion identification image, thereby identifying the moving amount of a prescribed position of each frame.

Figure 39:
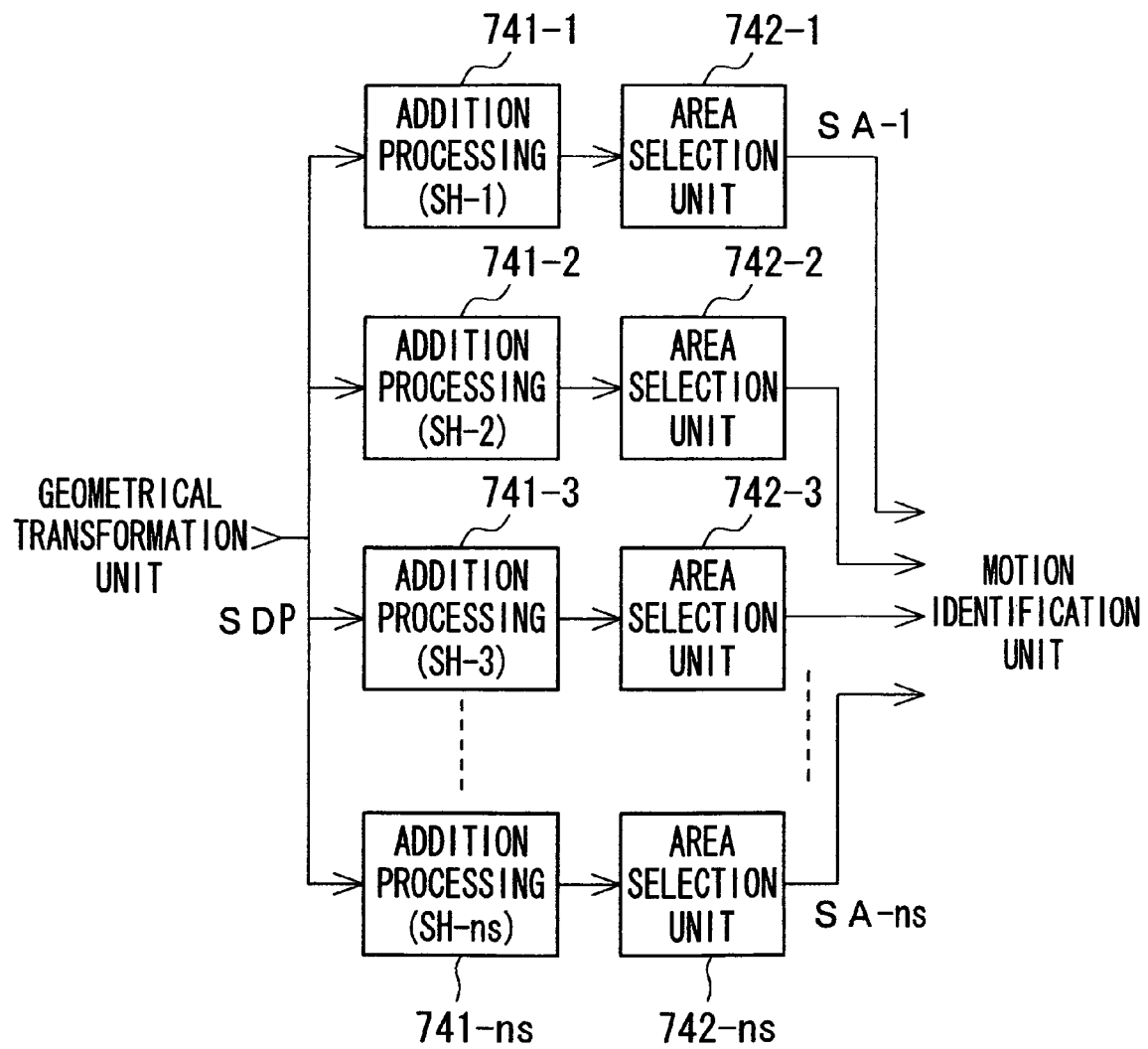
FIG. 39 is a chart for showing a configuration of an integration image generation unit.

FIG. 39 is a diagram showing a configuration of the integration image generation unit 74. The projection image signal SDP supplied from the geometrical transformation unit 71 is supplied to addition processing units 741-1 to 741-ns of the integration image generation unit 74.

The addition processing unit 741-1 adds thereto the projection plane image signals each shifted with respect to its preceding frame by a preset SH-1 number of pixels in the horizontal direction for ms frames (for example, for 10 frames) to sequentially calculate the addition signals. Further, the addition processing unit 741-1 multiplies the addition signal by 1/m, and supplies the image signal of the average value image to an area selection unit 742-1.

The area selection unit 742-1 cuts out the image signals each for a prescribed wb number of pixels from the front moving image side edge (the right edge for the right projection plane image) in the horizontal direction on a frame-by-frame basis from the image signal of the supplied average value image. Then, it sequentially superimposes the cut-out image signals one on another, thereby outputting the superimposed signal as an integration image signal SA-1 to the motion identification unit 75. The integration image signal SA-1 outputted from the area selection unit 742-1 becomes the image signal showing an object with the moving amount corresponding to a preset SH-1 number of pixels.

As with the addition processing unit 741-1, the addition processing units 741-2 to 741-ns also add the projection plane image signals each shifted with respect to its preceding frame in the horizontal direction by a preset SH-2 to SH-ns numbers of pixels, respectively, for ms frames to sequentially calculate the addition signals. Further, the addition processing units 741-2 to 741-ns multiply their respective addition signals by 1/m for averaging, and then supply the resulting image signals to the area selection units 742-2 to 742-ns, respectively. Further, the area selection units 742-2 to 742-ns cut out the signals each for a prescribed wb number of pixels from their respective supplied image signals, sequentially superimpose their respective signals, and output the resulting signals as the integration image signals to the motion identification unit 75. The integration image signals SA-2 to SA-ns outputted from the area selection units 742-2 to 742-ns become the image signals respectively showing the objects with the moving amounts respectively corresponding to preset SH-2 to SH-3 numbers of pixels.

Herein, if the numbers of pixels cut out at the motion identification image generation unit 73 and the area selection unit 742 of the integration generation unit 74 are assumed to be equal to each other (wa=wb), it is possible to ensure matching of the positions of the objects in the motion identification image and the integration image.

FIGS. 40A to 40H and 40J are diagrams each showing the operations of the integration image generation unit 74. The integration image generation unit 74 shifts the image by a SH-r (<wb) number of pixels, wherein the image shift amount is the SH-r number of pixels, on a frame-by-frame basis as shown in FIG. 40A, and adds up the shifted images. At this step, the added image becomes the one showing the image of a mountain as shown in FIG. 40B. Whereas, when the image shift amount is set to be a SH-s (=wb) number of pixels larger than the SH-r number of pixels, as shown in FIG. 40C, the unit 74 shifts the images each by the SH-t number of pixels on a frame-by-frame basis, and adds up the shifted images. At this step, the added image becomes the one showing the image of a house whose moving amount is larger than that of the mountain as shown in FIG. 40D. Whereas, when the image shift amount is set to be a SH-t (>wb) number of pixels larger than the SH-s number of pixels, as shown in FIG. 40E, the unit 74 shifts the images each by the SH-t number of pixels on a frame-by-frame basis, and adds up the shifted images. At this step, the added image becomes the one showing the image of a house whose moving amount is larger than that of the tree as shown in FIG. 40F.

Herein, the integration image generation unit 74 starts cutting out based on a frame Fa which has been cut out first when generating the motion identification image at the motion identification image generation unit 73. In addition, it performs the cutting out of the images by the same cut-out amount (wa=wb) and the same number of frames as those of the motion identification image to generate an integration image. At this step, the integration image and the motion identification image become equal to each other in length of the image along the horizontal direction, and the integration image and the motion detection image are in agreement with each other in terms of the phase of the object.

Whereas, for the motion identification image, the object has a discontinuous form when the cut-out amount and the moving amount are not equal. Similarly, for the integration image, cutting out of images is performed in an overlapping manner when the SH-r number of pixels is less than the wb number of pixels. For this reason, the integration image Ub-r becomes the discontinuous image according to the moving amount as shown in FIG. 40G. Further, when the SH-s number of pixels is equal to the wb number of pixels, the integration image Ub-s becomes the continuous image corresponding to the moving amount as shown in FIG. 40H. Further, when the SH-t number of pixels is more than the wb number of pixels, a loss portion occurs upon cutting out the images, so that the integration image Ub-t becomes a discontinuous image corresponding to the moving amount as shown in FIG. 40J. Therefore, the motion identification unit 75 described below performs matching between the motion identification image and the integration image. Then, it identifies the moving amount of the object based on the SH number of pixels, which are the image shift amount of the integration image identified as being matched.

The motion identification unit 75 determines the correlation value between each pixel of the motion identification image and the integration image of each image shift amount. Then, it identifies which one of the integration images is equal to each pixel of the motion identification image based on the correlation value. Thus, it identifies the moving amount of each pixel of the motion identification image based on the identification result.

In calculating the correlation value, when the correlation value between the pixel of the image A and the image B is calculated, a prescribed range centering on the objective pixel of the image A (the pixel for calculating the correlation value) is set, and the correlation value of the objective pixel is determined using the image signal within the prescribed range. For example, the rectangular range of □} mvc pixels in the x direction by □} nvc pixels in the y direction (the rectangular range of, for example, 31 pixels along the horizontal direction by 5 pixels along the vertical direction, centering on the objective pixel) is set so that the correlation value VC is calculated based on the following equation (9):

$$V_c = \frac{\sum (DAi - DAav)(DBi - DBav)}{\sqrt{\sum (DAi - DAav)^2} \sqrt{\sum (DBi - DBav)^2}} \quad (9)$$

Incidentally, in the equation (9), it is assumed that DAi (i=1 to (mvc□~nvc)) denotes the signal level of each pixel in the rectangular range of the image A; DBi (i=1 to (mvc□~nvc)) denotes the signal level of each pixel in the rectangular range of the image B; and DAav and DBav each denote the average value of the signal levels of respective pixels within the rectangular range.

Figure 41A:
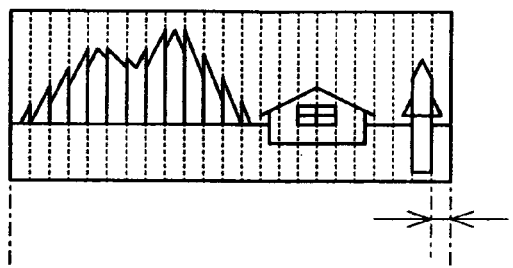
FIGS. 41A to 41D are diagrams each for illustrating the operation of a moving amount identification unit.
Figure 41B:
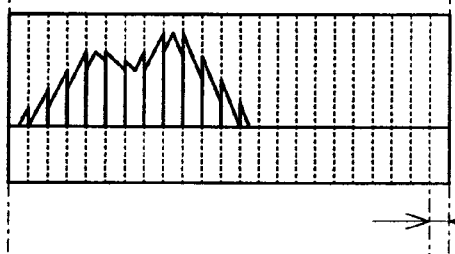

For example, when the motion identification unit 75 has identified that the image of the mountain in the motion identification image shown in FIG. 41A matches the integration image shown in FIG. 41B based on the equation (9), it identifies that the moving amount of each pixel constituting the image of the mountain is the moving amount corresponding to the SH-r number of pixels. Whereas, when it has identified that the image of the house in the motion identification image shown in FIG. 41A matches the integration image shown in FIG. 41C, it identifies that the moving amount of each pixel constituting the image of the house is the moving amount corresponding to the SH-s number of pixels. Further, when it has identified that the image of the tree in the motion identification image shown in FIG. 41A matches the integration image shown in FIG. 41D, it identifies that the moving amount of each pixel constituting the image of the tree is the moving amount corresponding to the SH-t number of pixels. Thus, the motion identification unit 75 identifies the moving amount for each pixel. In addition, the motion identification unit 75 generates the moving amount information MF indicative of the identification result, and supplies it to the layer classification unit 81 and the information generation processing unit 82.

Figure 41C:
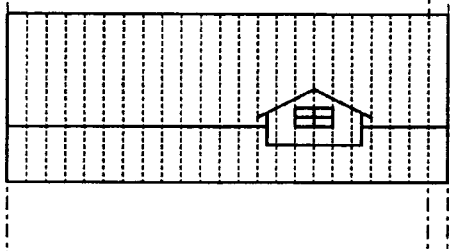
Figure 41D:
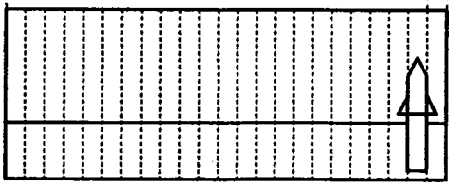

Incidentally, although not shown, the integration image generation unit 74 sets the directions in which the image is to be shifted so that the directions also include the opposite direction to that of FIGS. 41B, 41C, and 41D (for example, the image shift amount SH is set to be 48 pixels to −24 pixels). As a result, it is possible to extract images such as a passing vehicle moving in the opposite direction to the images of tree, house, and mountain. Further, in order to identify the moving amount of the image whose moving direction is the opposite direction to that of the distant-view layer, or the like, as shown in FIG. 42A, cutting out of images is performed from the images of respective frames. Then, the images are laterally reversed, and then superimposed, thereby generating a motion identification image Up shown in FIG. 42B. In this case, in the motion identification image Up shown in FIG. 42B, the image whose moving direction is the opposite direction, like a passing vehicle is properly displayed with the same orientation as that of the distant-view layer, intermediate-view layer, and close-view layer. Incidentally, FIG. 42C shows a motion identification image Up when the images have been superimposed without lateral reversal. Thus, by comparing the image signal of the integration image of which the image shift direction has been the opposite direction, with the image signal SMD of the motion identification image generated by reversing the cut-out images, and superimposing them, sequentially from the frame serving as a reference, it is possible to identify the moving amount of the object moving in the opposite direction.

The layer classification unit 81 layers respective pixels of the motion identification image in the direction of depth based on the moving amount information MF. For example, it is assumed that the depths are previously layered into four layers of three layers of distant-view, intermediate-view, and close-view, and the layer having a motion in the opposite direction. Thus, layer classification for identifying which one of the layers includes each pixel is performed.

The layer classification unit 81 sets the threshold values in the same manner as that of the foregoing threshold value setting unit 464. In addition, it compares the threshold values with the moving amount of each pixel, and identifies which one of the layers includes each pixel, thereby generating the layer classification information LB corresponding to each pixel. The generated layer classification information LB is supplied to the information generation processing unit 82.

Figure 43:
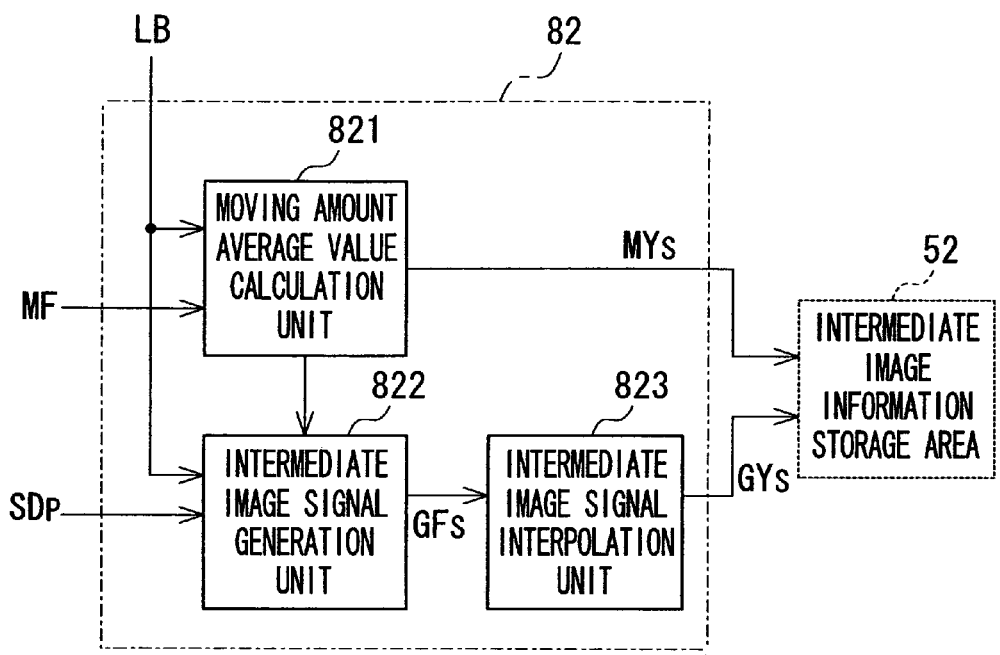
FIG. 43 is a chart showing a configuration of an information generation unit.

FIG. 43 shows a configuration of the information generation processing unit 82. A moving amount average value calculation unit 821 of the information generation processing unit 82 determines the average value of the moving amounts of the preceding and succeeding nz frames for every objective frame in respective layers based on the moving amount information MF from the motion identification unit 75, and the layer classification information LB supplied from the layer classification unit 81, and sets it as the speed of the objective frame of the layer. The calculated moving amount Mys of each frame for each layer is supplied to an intermediate image signal generation unit 822 and stored in the intermediate image information storage area 52.

The intermediate image signal generation unit 822 extracts the signals layer by layer according to the moving amounts MYs calculated at the moving amount average value calculation unit 821 from the image signal SDP of the projection image based on the layer classification information LB to generate the intermediate image signals GFs of respective layers. The intermediate image signals GFs are supplied to an intermediate image signal interpolation unit 823. At this step, since the moving amount of the distant-view layer is small and the moving amount of the close-view layer is large, as with FIGS. 28A to 28C described above, the intermediate image of the distant-view layer is short in length along the horizontal direction, and the intermediate image of the close-view layer is long therein. Further, for the backward motion layer, the motion is in the opposite direction. Therefore, the intermediate image signal generation unit 822 reads the image from the side moving images by the absolute value of the moving amount, and laterally reverses and superimposes them, thereby forming the intermediate image of the backward motion layer.

As with the intermediate image signal interpolation unit 473, the intermediate image signal interpolation unit 823 performs correction on the intermediate image signals GFs so that an area without image will not occur irrespective of the difference in moving amount even if image synthesis is performed by superimposing the images of respective layers having different moving amounts MYs in the order of the distant-view, the intermediate-view, and the close-view. Then, it stores the corrected signals as the intermediate image signals GYs in the intermediate image information storage area 52.

Further, the intermediate image signal interpolation unit 823 will not perform an interpolation processing when a backward motion layer of a passing vehicle or the like is present because the backward motion layer is the layer before the close-view layer. Whereas, it performs an interpolation processing in the same manner as with the distant-view layer when the horizontal motion layer indicative of a building, and the like occurring in the distant-view upon a right turn or a left turn is provided. Incidentally, the identification of the object of the backward motion layer or the horizontal motion layer can be accomplished in the following manner. Namely, the moving pattern is identified in the same manner as with FIGS. 25A to 25E based on the direction of movement of each motion identification image of the right side projection image and the left side projection image. Then, the identification can be accomplished based on the identified moving pattern. For example, when the directions of the motions at the upper part of the screen of the left side image and the upper part of the screen of the right side image indicate different directions, it is possible to identify the state during the right or left turn motion. Whereas, when the directions of the motions of the upper parts of the screens of the left side image and the right side image indicate the same direction, the object moving in the opposite direction thereto can be identified to be included in the backward motion layer.

Then, the operation for generating the peripheral images using the intermediate image information of each layer will be described. For the generation of the peripheral images, the peripheral image signals can be generated in the same manner as with the foregoing peripheral image signal generation block 60. Namely, the images of respective layers are read by their respective moving amounts, and superimposed in the order of the distant-view layer, the intermediate-view layer, and the close-view layer, thereby performing image synthesis. Further, also when the horizontal motion layer or the backward motion layer is set, it is possible to generate the peripheral image signals in the same manner as with the peripheral image signal generation block 60.

Figure 44:
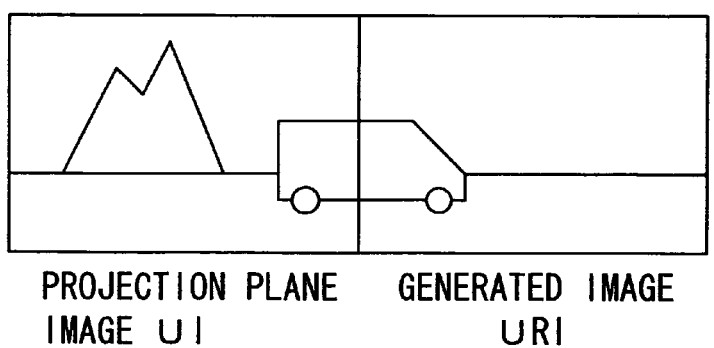
FIG. 44 is a diagram showing a projection plane image and a generated side moving image.

Further, for image synthesis, for example, when the right side moving image is generated as the peripheral image, the images are superimposed so that the same frame portions of respective layers overlap at the left end of the resulting right side moving image, thereby performing image synthesis. Further, the right end of the projection image obtained first by transforming the front moving image is made equal to the left end of the generated side moving image. Thereafter, the images are moved layer by layer based on their respective moving amounts of respective layers. To the moved image, the subsequent image is superimposed layer by layer, thereby performing image synthesis. As a result, it is possible to generate the side image URI continuous with the projection plane image UI as shown in FIG. 44.

Figure 45:
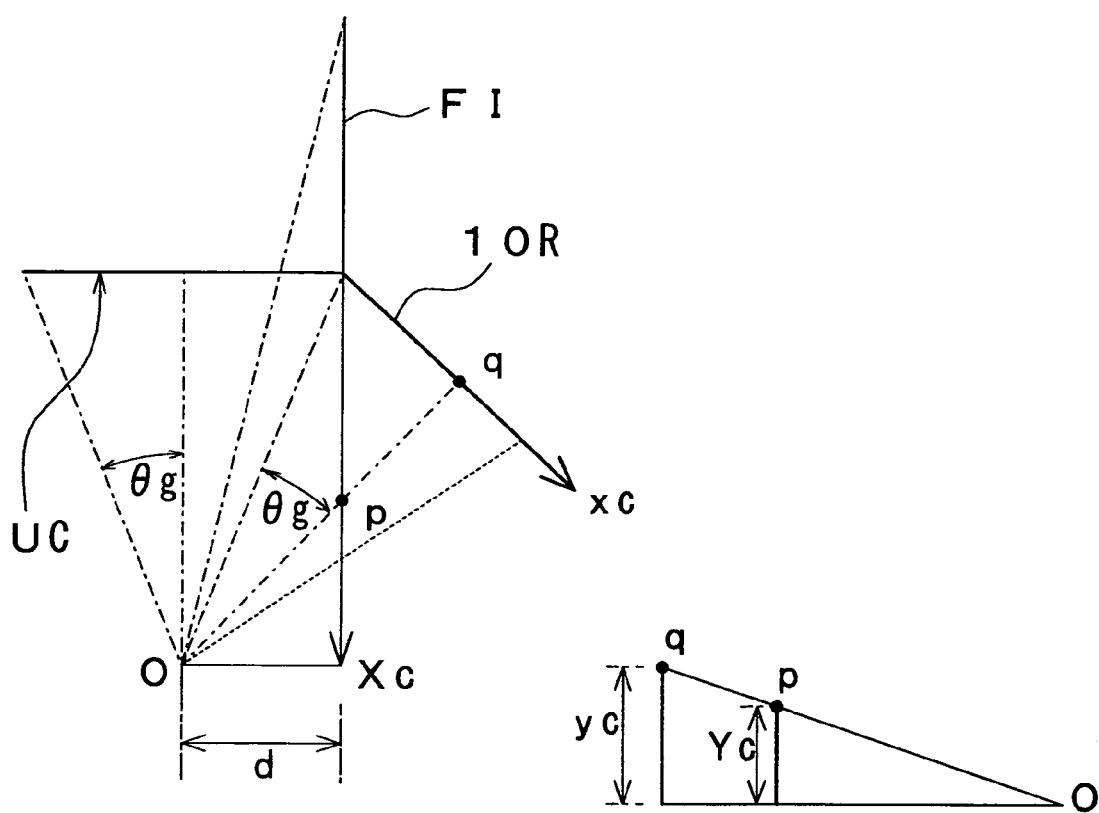
FIGS. 45A and 45B are diagrams each for illustrating an image transformation processing for properly performing image display on a screen.

Incidentally, the image generated by superimposing the intermediate images of respective layers using the intermediate image information is the image on the plane equal to the projection plane FI as shown in FIGS. 45A and 45B. On the other hand, the screen 10R on which the peripheral image is to be displayed is mounted at a tilt with respect to the projection plane FI. For this reason, a transformation processing of the image is performed so that the image moves in its proper form when displayed on the screen 10R by superimposing the images of respective layers, and thereby performing image synthesis.

Herein, a consideration will be given to the case where one-half of the length along the horizontal direction of the front moving image UC is assumed to be a distance d, and the screen 10R is mounted in a tilted manner so that the position O which is the position for photographing the front moving image is on the normal from the center of the screen 10R as shown in FIGS. 45A and 45B. In this case, for the image signal of the position (Xc, Yc) on the screen 10R, the image signal of the position (xc, yc) on the image URI before transformation calculated based on the following equations (10) and (11) is extracted. As a result, it is possible to generate the peripheral image signal SDR of the right side moving image after projection transformation with ease. Further, by displaying the right side moving image on the screen 10R using the peripheral image signal SDR, it is possible to display a high-reality right side moving image.

$$Xc = \frac{d}{2\sin(\theta g)\cos(\theta g)} - \frac{d}{\tan(\theta g)} \cdot \frac{(\tan^2(\theta g)+1)^2(d-xc)}{2(\tan^2(\theta g)-1)(d-xc)+4d} \quad (10)$$

$$Yc = \frac{d}{xc \cdot \cos(2\theta g)+d} yc \quad (11)$$

Incidentally, as a matter of course, it is also possible to generate the peripheral image signal SDL in the same manner as with the peripheral image signal SDR.

Further, it is also acceptable that the foregoing processing performed in the respective blocks are implemented by not only hardware but also software. In this case, the configuration shown in FIG. 15 described above is adopted.

Figure 46:
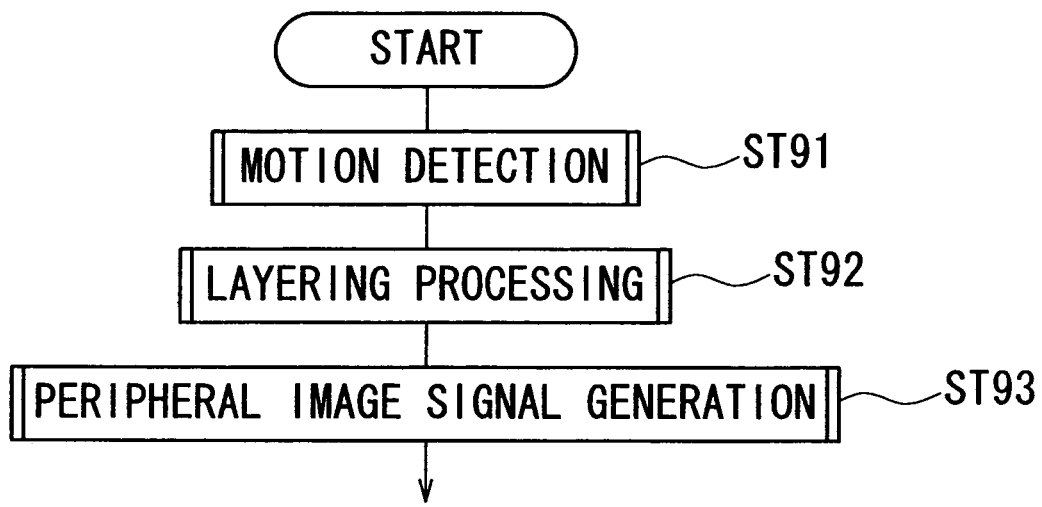
FIG. 46 is a flowchart showing an overall configuration of an image processing program according to a third embodiment of this invention.

FIG. 46 is a flowchart showing the overall configuration of an image processing program in a third embodiment. In the chart, in a step ST91, a motion detection processing is performed to generate a projection plane image and detect the moving amount of each pixel of the projection plane image. Then, in a step ST92, layer division of the pixel is performed based on the moving amount and the intermediate image information indicative of the moving amount of each layer is generated. In a step ST93, a peripheral image generation processing is performed to synthesize the peripheral images based on the intermediate image information.

Figure 47:
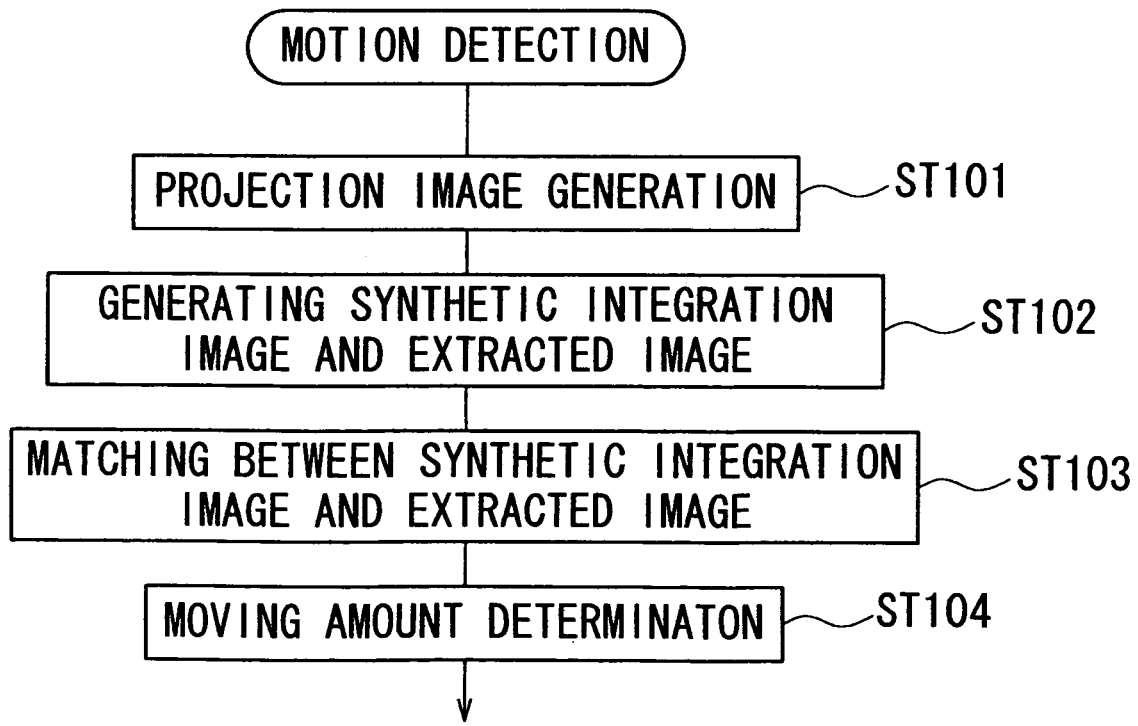
FIG. 47 is a flowchart showing a motion detection processing in the third embodiment.

FIG. 47 is a flowchart showing the motion detection processing in the step ST91 of FIG. 46. In a step ST101, the side projection image is generated based on the front moving image through geometrical transformation. In a step ST102, the integration images of respective moving amounts are generated based on the projection image. In addition, extracting the images from the projection image is performed to form extracted images. In a step ST103, matching between the integration image for each moving amount and the extracted image is performed. In a step ST104, the integration image showing the highest correlation value is detected based on the result of matching, thereby determining the moving amount of each pixel.

Figure 48:
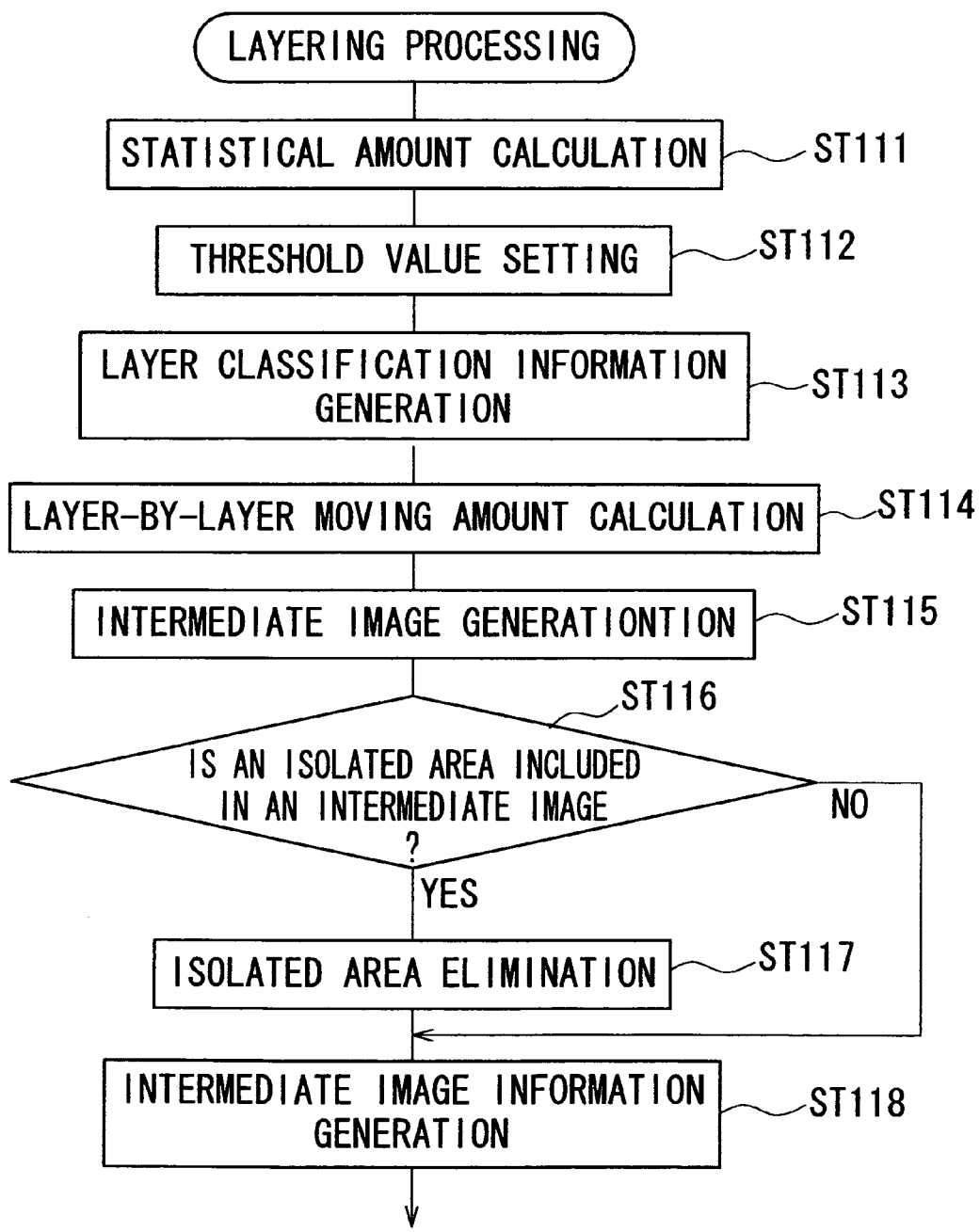
FIG. 48 is a flowchart showing a layering processing in the third embodiment.

FIG. 48 is a flowchart showing the intermediate image information generation processing in the step ST92 of FIG. 46. In a step ST111, the statistical amount of the moving amounts is calculated based on the moving amounts of pixels detected by the motion detection processing in the step ST101. In a step ST112, threshold values for performing layer division based on the statistical amount are set. In a step ST113, the set threshold values are compared with the moving amount so that the layer classification information indicating which one of the layers includes each pixel of the projection image is generated. In a step ST114, the moving amounts of respective layers are calculated based on the moving amounts of pixels included in the layers. In a step ST115, images are extracted layer by layer from the projection image based on the layer classification information and the moving amount of each layer so that the intermediate images are generated. In a step ST116, whether an isolated area is present or not in each of the intermediate images is determined. When the isolated area is present therein, the process proceeds to a step ST117. Whereas, when no isolated area is present, the process proceeds to a step ST118. In the step ST117, an interpolation processing is performed to eliminate the isolated area. Then, the process proceeds to the step ST118. In the step ST118, the intermediate image information including the intermediate image of each layer wherein no isolated area is present and the moving amount of each layer is generated.

Figure 49:
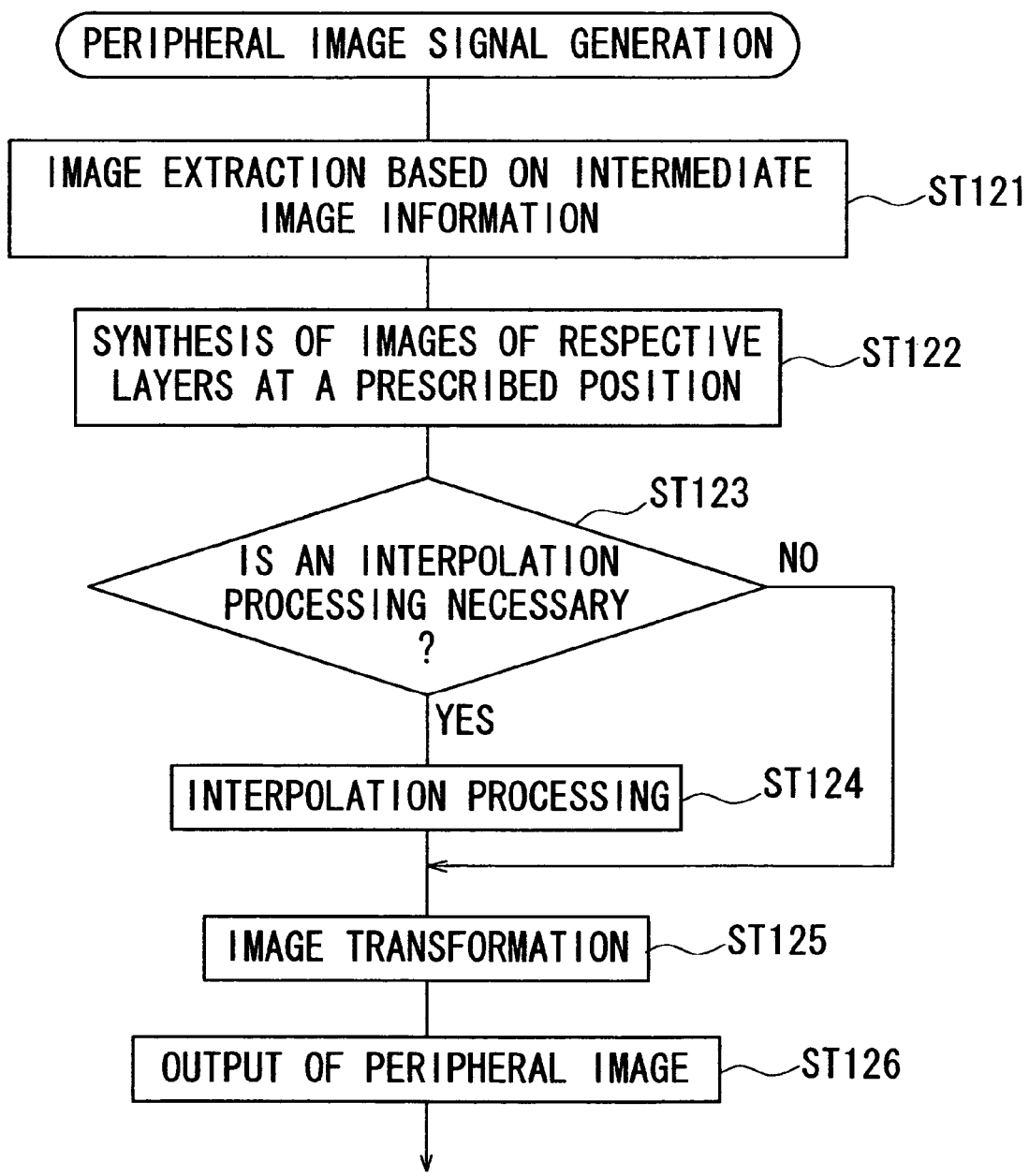
FIG. 49 is a flowchart showing peripheral image signal generation in the third embodiment.

FIG. 49 is a flowchart showing the peripheral image generation processing in the step ST93 of FIG. 46. In a step ST121, images are extracted layer by layer using the intermediate images of their respective layers based on the moving amounts of respective layers indicated by the intermediate image information. In a step ST122, the synthesis of the extracted images of respective layers is performed at a prescribed position. In a step ST123, it is identified whether the interpolation processing for supplying the image of a portion without image is required or not when the portion has occurred upon performing the image synthesis. Herein, when the portion without image occurs, the process proceeds to a step ST124. Whereas, when no portion without image occurs, the process proceeds to a step ST125. In the step ST124, the interpolation processing is performed, and then the process proceeds to the step ST125. For example, the peripheral images around the portion without image are extended for interpolation. In the step ST125, an image transformation processing is performed in accordance with the orientation of the screen onto which the image is projected because the synthesized image is the image on the plane equal to the projection plane. Then, the image signal subjected to the image transformation is outputted as the image signal of the peripheral image at a step ST126.

It is also acceptable that such an image processing program is, as described above, recorded on a removable information recording transmission medium, or transmitted via an information recording transmission medium.

Further, in the foregoing third embodiment, when the image processing program has been executed to generate the intermediate image information, the intermediate image information is recorded, for example, in the hard disk drive 304, or a recording medium mounted in the recording medium drive 312. Further, when a request for the output of the image signal of the peripheral image occurs, the intermediate image information is read so that the peripheral image signals SDL and SDR of the left and right side moving images are generated. In addition, the peripheral image signals SDL and SDR are outputted in accordance with the timing of the image signal SDC of the front moving image. Therefore, it is possible to display continuous wide view angle images using the front and left and right screens.

Incidentally, in the foregoing respective embodiments, a description was given to the case where the image signals of the peripheral images are generated using the image signals obtained by a car-mounted camera. However, even if the image signals to be used are the image signals of the scenic moving image photographed from above a moving ship or the moving image photographed by a walking person, it is possible to generate the image signals of the peripheral images by performing processing in the same manner.

Thus, according to the foregoing first to third embodiments, it is possible to identify the motion of the front moving image, and to generate peripheral images in different directions based on the identified motion. For this reason, it is possible to generate moving images in the same time series and different directions based on the front moving image photographed by a video camera, or the like. Therefore, it is possible to present a high-reality wide-view-angle multi-screen images.

Whereas, it is possible to generate images in different directions based on one input image. Therefore, a plurality of video cameras, a camera using a wide-angle lens, and the like are not required to be used. As a result, it is possible to readily perform photographing.

Further, images in different directions are formed using a real picture image. Therefore, it is possible to display a more real and higher realistic images than the images in the three-dimensional virtual space by a computer graphics. In addition, the depth is expressed as a two-dimensional plane hierarchy. This eliminates the necessity of a three-dimensional operational processing. The signal processing is also easy.

Whereas, the image processing apparatus and the computer are capable of displaying the images coming in the front moving image with time as the peripheral images prior to being displayed as the front moving image by using the stored signals as the input image signals. Thus, it is possible to display the image which cannot be displayed when real-time image signals are used, as the peripheral image. Accordingly, it is possible to display a more real and highly realistic wide view angle image. Further, by inputting an enormous amount of already existing image sources into the image processing apparatus of this invention and the computer for executing the image signal generation method, it is also possible to enjoy these images with high reality and at a wide view angle.

Incidentally, in the foregoing embodiments, a plurality of motion detection areas has been provided at the side edges of the front moving image so that the moving vector for every motion detection area is detected. Further, the motion identification image has been generated using the projection image, and compared with the integration images. In consequence, the motion of a prescribed position of the objective frame has been identified so that the intermediate image information is generated. Then, the peripheral image signals have been generated utilizing the intermediate image information. However, as a matter of course, any motion detection procedures are acceptable so long as they are capable of identifying the motion of the prescribed position of the objective frame.

INDUSTRIAL APPLICABILITY

According to this invention, it is possible to generate an image signal of a peripheral image which occurs at the same time as an objective frame in input image signals, and is different in view angle from the image of the objective frame based on the input image signals of a plurality of frames using an image processing apparatus and a computer. Therefore, it is possible to generate the peripheral images in different directions based on one input image without using a plurality of video cameras or a video camera using a special lens. Further, each of the peripheral images undergoes hierarchization along the direction of depth according to the motions. As a result, it is possible to present an image three-dimensionally without carrying out a three-dimensional processing. This is suitable for presenting an image with a wide view angle and high reality.

The invention claimed is:

1. An image processing apparatus, comprising:
projection transformation means for generating image signal of a projection image by projection-transforming input image signal of a plurality of frames onto a specific plane;
motion detection means for detecting each motion of prescribed areas within the projection image using the image signals of the projection image;
layering processing means for determining the layer of each of the prescribed areas based on each motion detected by the motion detection means, and generating layer information; and
peripheral image signal generation means for synthesizing the image signal of the projection image of the plurality of the frames, layer by layer, using the layer information generated by said layer processing means and the image signal of said projection image, and generating an image signal of a peripheral image which occurs at the same time as the objective frame in said input image signal, and is different in view angle from the image of said objective frame.

2. The image processing apparatus according to claim 1, wherein said specific plane is a different plane from the plane intended for said input image signals.

3. The image processing apparatus according to claim 1, wherein the motion detection means includes:
   motion identification image generation means for extracting image signals of each of the prescribed areas, frame by frame, and generating an image signal of a motion identification image;
   integration image signal generation means for sequentially generating average value image signal of a prescribed number of frames, frame by frame, using the image signal obtained by shifting the position of said projection image, extracting the image signal, frame by frame, from the average value image signal to generate an image signal of an integration image, then changing the shift amount of said projection image, and generating a plurality of the image signals of the integration image; and
   moving amount identification means for detecting the correlation between the image signal of said motion identification image generated by said motion identification image generation means and an image signal of a component image generated by said integration image signal generation means, and identifying the moving amount of each of the prescribed areas from the shift amount when the image signal of the integration image detected to have the highest correlation with said prescribed position has been generated.

4. The image processing apparatus according to claim 1, wherein said layering processing means has determination means for comparing a threshold value with the moving amount of each of said prescribed areas, and determining the layer.

5. The image processing apparatus according to claim 4, wherein said layering processing means has threshold value setting means for setting said threshold value based on the moving amount of each of said prescribed areas in a plurality of frames.

6. The image processing apparatus according to claim 5, wherein said threshold value setting means sets, based on an occurrence frequency distribution of said moving amount, the value of the moving amount which is minimum on the occurrence frequency distribution as the threshold value.

7. The image processing apparatus according to claim 5, wherein said threshold value setting means allows the occurrence range of the moving amount of each of said prescribed areas in the plurality of the frames to be divided into (n−1) equal parts when the n threshold values are set.

8. The image processing apparatus according to claim 1, wherein said layering processing means calculates a typical moving amount for each of said layers based on each motion detected by said motion detection means, and generates said layer information using said typical amount and the layer determination result.

9. The image processing apparatus according to claim 1, wherein said typical amount is the average value of the moving amounts of each of the prescribed areas corresponding to said layer.

10. The image processing apparatus according to claim 1, wherein said layering processing means includes a motion type detection means for detecting the type of the motion of the image of said objective frame based on the directions of motions of a plurality of said prescribed areas provided in said objective frame; and
    wherein said layering processing means generates said layer information using information indicative of the type of each motion detected by said motion type detection means.

11. The image processing apparatus according to claim 1, wherein said layering processing means includes a layer image generation means for calculating a typical moving amount for each of said layers based on each motion detected by the motion detection means, and generating an image signal of each of said layers based on the layer determination result, said typical moving amount and the image signal of said projection image of each of said prescribed areas; and
    wherein said layering processing means generates said layer information using the typical moving amount of each of said layers and the image signal of each of said layers.

12. The image processing apparatus according to claim 11, wherein said layer image generation means extracts image signals of said projection image, layer by layer, based on the typical moving amount corresponding to said layer, and synthesizes the extracted image signals, thereby generating the image signal of each of said layers.

13. The image processing apparatus according to claim 12, wherein said layer image generation means extracts said image signal of the projection image, layer by layer, based on said typical moving amount corresponding to said layer when an already existing image signal of each layer is present, shifts the already existing image signal of each layer by said typical moving amount corresponding to said layer, and synthesizes the extracted image signals of the projection image to an area without image occurred due to the shift, thereby generating another image signal of each of said layers.

14. The image processing apparatus according to claim 11, wherein said peripheral image signal generation means includes:
    signal extraction means for extracting the image signal of each layer from the layer information based on the typical moving amount of each layer of said layer information; and
    image synthesis means for synthesizing the image signal of each layer extracted by said extraction means in a prescribed order, thereby generating the image signal of said peripheral image.

15. The image processing apparatus according to claim 14, wherein with said image synthesis means, when an image signal of an already existing peripheral image is present, the image signal of the already existing peripheral image is shifted by the corresponding typical moving amount, layer by layer, and the extracted image signal is synthesized to the image signal of the shifted peripheral image on a layer-by-layer basis.

16. The image processing apparatus according to claim 14, wherein said image synthesis means has interpolation means for performing, when a gap area without image has occurred upon synthesizing the image signals of each layer in the prescribed order, an interpolation processing using an image signal in the periphery of said gap area, and generating an image signal of said gap area.

17. The image processing apparatus according to claim 16, wherein said interpolation means performs said interpolation processing by extending the image signal in the periphery of the gap area in the layer situated closer to the back of the gap area to the position of said gap area.

18. The image processing apparatus according to claim 16, wherein said interpolation means performs the interpolation processing by shifting the image signal in the periphery of said gap area in the layer situated closer to the back of the gap area to the position of said gap area.

19. The image processing apparatus according to claim 16, wherein said interpolation means performs the interpolation processing by an weighted mean of the distance using the image signal in the periphery of said gap area in the layer situated closer to the back of said gap area.

20. The image processing apparatus according to claim 14, wherein with said image synthesis means, the image signal of each layer is synthesized sequentially from the layer closer to the back.

21. The image processing apparatus according to claim 14, wherein with said image synthesis means, the image signal of each layer is synthesized sequentially from the layer having a larger moving amount.

22. The image processing apparatus according to claim 1, wherein with said layering processing means, said layer denotes any one of a depth, a parall motion, and a backward motion.

23. The image processing apparatus according to claim 1, wherein the peripheral image signal generation means has a transformation means for transforming the shape of the peripheral image according the positional relationship between the image display plane of the image based on said input peripheral image signal and the image display plane of said peripheral image.

24. An image signal generation method, comprising the steps of:
   generating image signal of a projection image by projection-transforming input image signal of a plurality of frames onto a specific plane;
   detecting motions of prescribed areas within the projection image using the image signal of said projection image;
   determining the layer of each of said prescribed areas based on said detected motions, and generating layer information; and
   synthesizing the image signal of the projection image of the plurality of the frames, layer by layer, using said generated layer information and the image signal of said projection image, and generating an image signal of a peripheral image which occurs at the same time as the objective frame in the input image signal, and is different in view angle from the image of said objective frame.

25. The image signal generation method according to claim 24, wherein said specific plane is a different plane from the plane intended for said input image signal.

26. The image signal generation method according to claim 24, wherein image signal of each of said prescribed areas is extracted, frame by frame, thereby generating an image signal of a motion identification image;
   wherein average value image signal of a prescribed number of frames is sequentially generated using the image signal obtained by shifting the position of said projection image, frame by frame, and the image signal is extracted, frame by frame, from the average value image signal to generate an image signal of an integration image, and then the shift amount of said projection image is changed to generate a plurality of the image signals of said integration image; and
   wherein the correlation between the image signal of said motion identification image and said plurality of the integration image signals is detected, and the moving amount of each of said prescribed areas is identified from the shift amount when the image signal of the integration image detected to have the highest correlation with said prescribed position has been generated.

27. The image signal generation method according to claim 24, wherein a threshold value and said moving amount of each of said prescribed areas are compared to determine the layer.

28. The image signal generation method according to claim 27, wherein the threshold value is set based on the moving amount of each of said prescribed areas in a plurality of frames.

29. The image signal generation method according to claim 28, wherein as the threshold value, based on an occurrence frequency distribution of said moving amount, the value of the moving amount which is minimum on the occurrence frequency distribution is used.

30. The image signal generation method according to claim 28, wherein the occurrence range of the moving amount of each of said prescribed areas in the plurality of frames is divided into (n−1) equal parts when the n threshold values are set.

31. The image signal generation method according to claim 24, wherein a typical moving amount is calculated for each of said layers based on the detected motions, and said layer information is generated using the typical amount and the layer determination result.

32. The image signal generation method according to claim 24, wherein said typical moving amount is the average value of the moving amounts of each of said prescribed areas corresponding to said layer.

33. The image signal generation method according to claim 24, wherein the type of the motion of the objective frame is detected based on the directions of motions of said plurality of the prescribed areas provided in said objective frame; and
   wherein said layer information is generated using information indicative of the type of each of said detected motions.

34. The image signal generation method according to claim 24, wherein a typical moving amount is calculated for each of said layers based on the detected motions, and an image signal of each of said layers is generated based on the layer determination result, said typical moving amount, and the image signals of said projection image of each of said prescribed areas; and
   wherein said layer information is generated using the typical moving amount of each of said layers and the image signal of each of said layers.

35. The image signal generation method according to claim 34, wherein said image signal of said projection image are extracted, layer by layer, based on said typical moving amount corresponding to said layer, and the extracted image signal is synthesized, thereby generating the image signal of each of said layers.

36. The image signal generation method according to claim 34, wherein said image signal of the projection image is extracted, layer by layer, based on said typical moving amount corresponding to said layer when an already existing image signal of each layer is present, and the already existing image signal of each layer is shifted by said typical moving amount corresponding to said layer, and said extracted image signal of the projection image are synthesized to an area without image occurred due to the shift, thereby generating another image signal of each of said layers.

37. The image signal generation according to claim 34, wherein the image signal of each layer is extracted from said layer information based on the typical moving amount of each layer of said layer information; and
   wherein the extracted image signal of each layer is synthesized in a prescribed order, thereby generating the image signal of said peripheral image.

38. The image signal generation method according to claim 37, wherein when an image signal of an already existing peripheral image is present, the image signal of said already existing peripheral image is shifted by the corresponding typical moving amount, layer by layer, and the extracted image signal is synthesized to the image signal of the shifted peripheral image on a layer-by-layer basis.

39. The image signal generation method according to claim 37, wherein when a gap area without image has occurred upon synthesizing the image signal of each layer in the prescribed order, an interpolation processing is performed using an image signal in the periphery of said gap area, thereby generating an image signal of said gap area.

40. The image signal generation method according to claim 39, wherein in said interpolation processing, the image signal in the periphery of the gap area in the layer situated closer to the back of the gap area is extended to the position of said gap area.

41. The image signal generation method according to claim 39, wherein in said interpolation processing, the image signal in the periphery of said gap area in the layer situated closer to the back of said gap area is shifted to the position of said gap area.

42. The image signal generation method according to claim 39, wherein said interpolation processing is performed by an weighted mean of the distance using the image signal in the periphery of said gap area in the layer situated closer to the back of said gap area.

43. The image signal generation method according to claim 37, wherein the image signal of each layer is synthesized sequentially from the layer closer to the back.

44. The image signal generation method according to claim 37, wherein the image signal of each layer is synthesized sequentially from the layer having a larger moving amount.

45. The image signal generation method according to claim 24, wherein said layer denotes any one of a depth, a parallel motion, and a backward motion.

46. The image signal generation method according to claim 24, wherein the shape of said peripheral image is transformed according to the position relationship between the image display plane of the image based on said input peripheral image signal and the image display plane of said peripheral image.

47. A computer-readable medium encoded with an image processing program to execute:
   a processing of generating image signal of a projection image by projection-transforming input image signal of a plurality of frames onto a specific plane;
   a processing of detecting motions of prescribed areas within the projection image using the image signal of said projection image;
   a processing of determining the layer of each of said prescribed areas based on said detected motions, and generating layer information; and
   a processing of synthesizing the image signal of the projection image of said plurality of the frames, layer by layer, using said generated layer information and said image signal of the projection image, and generating an image signal of a peripheral image which occurs at the same time as the objective frame in the input, image signal, and is different in view angle from the image of said objective frame.

* * * * *